US010552546B2

(12) United States Patent
Nelson et al.

(10) Patent No.: US 10,552,546 B2
(45) Date of Patent: Feb. 4, 2020

(54) SPEECH-TO-TEXT CONVERSION FOR INTERACTIVE WHITEBOARD APPLIANCES IN MULTI-LANGUAGE ELECTRONIC MEETINGS

(71) Applicants: Steven Nelson, San Jose, CA (US); Hiroshi Kitada, Tuckahoe, NY (US); Lana Wong, Randolph, NJ (US)

(72) Inventors: Steven Nelson, San Jose, CA (US); Hiroshi Kitada, Tuckahoe, NY (US); Lana Wong, Randolph, NJ (US)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 15/728,368

(22) Filed: Oct. 9, 2017

(65) Prior Publication Data
US 2019/0108221 A1 Apr. 11, 2019

(51) Int. Cl.
G06F 17/28 (2006.01)
G10L 15/26 (2006.01)

(52) U.S. Cl.
CPC ............ G06F 17/289 (2013.01); G10L 15/26 (2013.01)

(58) Field of Classification Search
CPC ...................................................... G06F 17/28
(Continued)

(56) References Cited

U.S. PATENT DOCUMENTS 5,572,728 A 11/1996 Tada et al.
5,907,324 A 5/1999 Larson et al.
(Continued)

FOREIGN PATENT DOCUMENTS

JP 07-182365 7/1995
JP 07-191690 7/1995
(Continued)

OTHER PUBLICATIONS

U.S. Appl. No. 14/992,273, filed Jan. 11, 2016, Office Action, dated Jul. 29, 2016.
(Continued)

*Primary Examiner* — Jesse S Pullias
(74) *Attorney, Agent, or Firm* — Hickman Palermo Becker Bingham LLP; Edward A. Becker

(57) ABSTRACT

Artificial intelligence is introduced into an electronic meeting context to perform various tasks before, during, and/or after electronic meetings. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings. Embodiments include improved approaches for translation and transcription using multiple translation/transcription services. Embodiments also include using sensors in conjunction with interactive whiteboard appliances to perform person detection, person identification, attendance tracking, and improved meeting start. Embodiments further include improvements to the presentation of content on interactive whiteboard appliances, providing meeting services for meeting attendees, agenda extraction, and learning to aid in creating new electronic meetings.

20 Claims, 45 Drawing Sheets

(58) Field of Classification Search
USPC .................................................... 704/2–8
See application file for complete search history.

(56) References Cited

U.S. PATENT DOCUMENTS

| | | | |
|---|---|---|---|
| 6,377,288 B1 | 4/2002 | Moran | |
| 6,501,463 B1 | 12/2002 | Dahley | |
| 6,789,064 B2 | 9/2004 | Koh | |
| 7,634,546 B1 | 12/2009 | Strickholm et al. | |
| 7,693,736 B1 | 4/2010 | Chu | |
| 8,060,563 B2 | 11/2011 | Whynot | |
| 8,090,707 B1 | 1/2012 | Orttung | |
| 8,266,209 B2 | 9/2012 | Pegg | |
| 8,368,738 B2 | 2/2013 | Schindler | |
| 8,400,489 B2 | 3/2013 | Le Goff | |
| 8,578,463 B2 | 11/2013 | Kee | |
| 8,676,273 B1 | 3/2014 | Fujlsaki | |
| 9,204,098 B1 | 12/2015 | Cunico | |
| 9,450,758 B1 | 9/2016 | Allen | |
| 9,478,702 B2 | 10/2016 | Hwang | |
| 9,769,139 B2 | 9/2017 | Chizhov | |
| 10,009,393 B2 | 6/2018 | Tondepu | |
| 10,409,919 B2 | 9/2019 | Rubin | |
| 2003/0018659 A1 | 1/2003 | Fuks | |
| 2003/0191643 A1* | 10/2003 | Belenger | G10L 15/005 704/254 |
| 2003/0204474 A1 | 10/2003 | Capek | |
| 2004/0044556 A1 | 3/2004 | Brady | |
| 2004/0230651 A1 | 11/2004 | Ivashin | |
| 2005/0027800 A1 | 2/2005 | Erickson | |
| 2005/0209848 A1 | 9/2005 | Ishii | |
| 2006/0031326 A1 | 2/2006 | Ovenden | |
| 2006/0106872 A1 | 5/2006 | Leban | |
| 2006/0161446 A1 | 7/2006 | Fyfe | |
| 2006/0224430 A1 | 10/2006 | Butt | |
| 2006/0282266 A1 | 12/2006 | Lopez-Barquilla | |
| 2007/0106724 A1 | 5/2007 | Gorti et al. | |
| 2007/0106931 A1 | 5/2007 | Vartiainen | |
| 2007/0177062 A1 | 8/2007 | Sakon | |
| 2008/0015860 A1 | 1/2008 | Lane | |
| 2008/0022209 A1 | 1/2008 | Lyle | |
| 2008/0040187 A1 | 2/2008 | Carraher | |
| 2008/0320583 A1 | 12/2008 | Sharma | |
| 2009/0006161 A1 | 1/2009 | Chen | |
| 2009/0094088 A1 | 4/2009 | Chen | |
| 2009/0199113 A1 | 8/2009 | McWhinnie | |
| 2009/0271438 A1 | 10/2009 | Agapi | |
| 2009/0298417 A1 | 12/2009 | Phillips | |
| 2010/0085415 A1 | 4/2010 | Rahman | |
| 2010/0198644 A1 | 8/2010 | Renfro | |
| 2010/0220172 A1 | 9/2010 | Michaelis | |
| 2010/0268534 A1 | 10/2010 | Kishan et al. | |
| 2010/0268656 A1 | 10/2010 | Teicher | |
| 2010/0318399 A1 | 12/2010 | Li et al. | |
| 2011/0087491 A1* | 4/2011 | Wittenstein | G10L 15/26 704/235 |
| 2011/0246172 A1 | 10/2011 | Liberman | |
| 2011/0282648 A1* | 11/2011 | Sarikaya | G06F 17/2818 704/7 |
| 2012/0050197 A1 | 3/2012 | Kemmochi | |
| 2012/0102409 A1 | 4/2012 | Fan | |
| 2012/0166532 A1 | 6/2012 | Juan | |
| 2012/0268553 A1 | 10/2012 | Talukder | |
| 2012/0271676 A1 | 10/2012 | Aravamudan | |
| 2012/0296914 A1 | 11/2012 | Romanov | |
| 2013/0006693 A1 | 1/2013 | Haynes | |
| 2013/0007773 A1 | 1/2013 | Guilford | |
| 2013/0036117 A1 | 2/2013 | Fisher | |
| 2013/0063542 A1 | 3/2013 | Bhay et al. | |
| 2013/0073329 A1 | 3/2013 | Shoham | |
| 2013/0132480 A1 | 5/2013 | Tsuji | |
| 2013/0144603 A1 | 6/2013 | Lord | |
| 2013/0182007 A1 | 7/2013 | Syed-Mahmood et al. | |
| 2013/0226557 A1 | 8/2013 | Uszkoreit | |
| 2013/0275164 A1 | 10/2013 | Gruber | |
| 2013/0282421 A1 | 10/2013 | Graff | |
| 2013/0325972 A1 | 12/2013 | Boston et al. | |
| 2014/0012926 A1 | 1/2014 | Narayanan | |
| 2014/0067390 A1* | 3/2014 | Webb | H04M 3/53333 704/235 |
| 2014/0082100 A1 | 3/2014 | Sammon et al. | |
| 2014/0139426 A1 | 5/2014 | Kryze | |
| 2014/0149492 A1 | 5/2014 | Ananthanarayanan | |
| 2014/0149494 A1 | 5/2014 | Markley | |
| 2014/0164476 A1 | 6/2014 | Thomson | |
| 2014/0223334 A1 | 8/2014 | Jensen et al. | |
| 2014/0278377 A1 | 9/2014 | Peters et al. | |
| 2014/0320586 A1 | 10/2014 | Tan | |
| 2014/0365203 A1 | 12/2014 | Waibel | |
| 2014/0365918 A1 | 12/2014 | Caldwell et al. | |
| 2015/0006144 A1 | 1/2015 | Uszkoreit | |
| 2015/0066505 A1* | 3/2015 | Baker | G10L 15/08 704/235 |
| 2015/0067047 A1 | 3/2015 | Fu | |
| 2015/0091940 A1 | 4/2015 | Emori | |
| 2015/0106146 A1 | 4/2015 | Higaki | |
| 2015/0120278 A1 | 4/2015 | Waibel | |
| 2015/0121466 A1 | 4/2015 | Brands | |
| 2015/0149182 A1 | 5/2015 | Kalns | |
| 2015/0154183 A1 | 6/2015 | Kristajansson | |
| 2015/0154291 A1 | 6/2015 | Shepherd | |
| 2015/0170051 A1 | 6/2015 | Bufe, III et al. | |
| 2015/0179186 A1 | 6/2015 | Swierk | |
| 2015/0181020 A1 | 6/2015 | Fitzsimmons | |
| 2016/0071065 A1 | 3/2016 | Ohashi | |
| 2016/0085604 A1 | 3/2016 | Rajagopalan | |
| 2016/0092578 A1 | 3/2016 | Ganani | |
| 2016/0117624 A1 | 4/2016 | Flores | |
| 2016/0203127 A1 | 7/2016 | Uszkoreit | |
| 2016/0249096 A1 | 8/2016 | Ortiz | |
| 2016/0283473 A1 | 9/2016 | Heinze et al. | |
| 2016/0283676 A1 | 9/2016 | Lyon | |
| 2016/0307063 A1 | 10/2016 | Bright et al. | |
| 2017/0099361 A1 | 4/2017 | Digilov | |
| 2017/0116185 A1 | 4/2017 | Erickson | |
| 2017/0132518 A1* | 5/2017 | Kitada | G06F 16/9535 |
| 2017/0134446 A1 | 5/2017 | Kitada | |
| 2017/0213192 A1 | 7/2017 | Kitada | |
| 2017/0213193 A1 | 7/2017 | Kitada | |
| 2017/0255446 A1 | 9/2017 | Malatesha | |
| 2017/0357643 A1 | 12/2017 | Kristjansson | |
| 2018/0095951 A1 | 4/2018 | Takamiya | |
| 2018/0101281 A1 | 4/2018 | Nelson | |
| 2018/0101760 A1 | 4/2018 | Nelson | |
| 2018/0101761 A1 | 4/2018 | Nelson | |
| 2018/0101823 A1 | 4/2018 | Nelson | |
| 2018/0101824 A1 | 4/2018 | Nelson | |
| 2018/0176207 A1 | 6/2018 | Malatesha | |
| 2018/0176267 A1 | 6/2018 | Malatesha | |
| 2018/0176268 A1 | 6/2018 | Malatesha | |
| 2018/0182052 A1 | 6/2018 | Panagos | |
| 2018/0285059 A1 | 10/2018 | Zurek | |
| 2018/0365657 A1 | 12/2018 | Kitada | |
| 2019/0108492 A1 | 4/2019 | Nelson | |
| 2019/0108493 A1 | 4/2019 | Nelson | |
| 2019/0108494 A1 | 4/2019 | Nelson | |
| 2019/0108834 A1 | 4/2019 | Nelson | |
| 2019/0273767 A1 | 9/2019 | Nelson | |

FOREIGN PATENT DOCUMENTS

| | | |
|---|---|---|
| JP | 08-316953 | 11/1996 |
| JP | H10-269232 | 10/1998 |
| JP | 2001175720 A | 6/2001 |
| JP | 2002-207753 | 7/2002 |
| JP | 2004112518 A | 4/2004 |
| JP | 2004-112518 | 8/2004 |
| JP | 2005-277462 | 10/2005 |
| JP | 2005346515 A | 12/2005 |
| JP | 2006-085440 | 3/2006 |
| JP | 2007-336344 | 12/2007 |
| JP | 2008-099330 | 4/2008 |
| JP | 2008-152527 | 7/2008 |
| JP | 2014-143668 | 8/2014 |

(56) References Cited

FOREIGN PATENT DOCUMENTS

| JP | 2015-154315 | | 8/2015 |
|---|---|---|---|
| JP | 2015535635 | A | 12/2015 |
| JP | 2016173646 | A | 9/2016 |
| WO | WO01/91033 | A2 | 11/2001 |
| WO | WO 2016/00010 | A1 | 1/2016 |

OTHER PUBLICATIONS

Kitada, U.S. Appl. No. 14/992,273, filed Dec. 27, 2016, Notice of Allowance, dated Dec. 27, 2016.

Tur et al., "The Calo Meeting Assistant System", IEEE Transactions on Audio, Speech and Language Processing, vol. 18, No. 6, dated Aug. 2010, 11pages.

Malatesha, U.S. Appl. No. 15/384,187, filed Dec. 19, 2016, Office Action, dated Aug. 10, 2018.

Malatesha, U.S. Appl. No. 15/384,184, filed Dec. 19, 2016, Notice of Allowance, dated Oct. 4, 2018.

Kitada, U.S. Appl. No. 15/477,276, filed Apr. 3, 2017, Office Action, dated Aug. 29, 2018.

Kitada, U.S. Appl. No. 14/992,278, filed Jan. 11, 2016, Office Action, dated Aug. 27, 2018.

Nelson, U.S. Appl. No. 15/290,860, filed Oct. 11, 2016, Office Action, dated Nov. 16, 2018.

Nelson, U.S. Appl. No. 15/290,856, filed Oct. 11, 2016, Final Office Action, dated Nov. 20, 2018.

Nelson, U.S. Appl. No. 15/290,855, filed Oct. 11, 2016, Office Action, dated Oct. 18, 2018.

Malatesha, U.S. Appl. No. 15/384,181, filed Dec. 19, 2016, Office Action, dated Nov. 2, 2018.

Kitada, U.S. Appl. No. 15/477,276, filed Apr. 3, 2017, Notice of Allowance, dated Dec. 5, 2018.

Wikipedia, the Free Encyclopedia, "Watson (Computer", https://en.wikipedia.org/wiki/Watson_(computer), last viewed on Feb. 23, 2016, 16 pages.

European Patent Office, "Search Report" in application No. 16196514.0-1871, dated Jan. 30, 2017, 6 pages.

European Patent Office, "Search Report" in application No. 16194599.3-1502, dated Apr. 3, 2017, 7 pages.

European Patent Office, "Search Report", in application No. 17206719.1-1224, dated May 4, 2018, 9 pages.

Nelson, U.S. Appl. No. 15/290,856, filed Oct. 11, 2016, Office Action, dated May 31, 2018.

Kitada, U.S. Appl. No. 15/477,276, filed Apr. 3, 2017, Ex Parte Quaye, Apr. 20, 2018.

Kitada, U.S. Appl. No. 15/477,240, filed Apr. 3, 2018, Notice of Allowance, dated May 1, 2018.

Harrer et al., "The Scalable Adapter Design Pattern: Enabling Interoperability Between Educational Interoperability Between Educational Software Tools", IEEE, vol. 1, No. 2, Apr. 1, 2008, 14 pages.

Gamma et al., "Design Patterns" Design Patterns, dated Jan. 1, 1995, 7 pages.

European Patent Office, "Search Report" in application No. 17194726.0-1222, dated Jan. 16, 2018, 7 pages.

European Patent Office, "Search Report" in applicatio No. 17207179.7-1222, dated Jan. 25, 2018, 9 pages.

Kitada, U.S. Appl. No. 15/477,276, filed Apr. 3, 2017, Office Action, dated Dec. 1, 2017.

Kitada, U.S. Appl. No. 15/477,240, filed Apr. 3, 2017, Office Action, dated Dec. 1, 2017.

European Patent Office, "Search Report" in application No. 17192809.6-1958, dated Dec. 6, 2017, 9 pages.

Malatesha, U.S. Appl. No. 15/348,181, filed Dec. 19, 2016, Notice of Allowance, dated Mar. 21, 2019.

European Patent Office, "Search Report" in application No. 18196734.0-1230, dated Feb. 21, 2019, 9 pages.

The State Intellectual Property Office of P.R. China, "The Notification of the First Office Action", in application No. 2016109747584, dated Jul. 3, 2019, 17 pages.

Nelson, U.S. Appl. No. 15/920,856, filed Oct. 11, 2016, Office Aciton, dated Aug. 21, 2019.

Kitada, U.S. Appl. No. 14/992,278, filed Jan. 11, 2016, Office Action, dated Jul. 30, 2019.

Nelson, U.S. Appl. No. 15/728,367, filed Oct. 9, 2017, Final Office Action, dated May 3, 2019.

Nelson, U.S. Appl. No. 15/728,367, filed Oct. 9, 2017, Advisory Action, dated May 17, 2019.

Nelson, U.S. Appl. No. 15/290,860, filed Oct. 11, 2016, Notice of Allowance, dated May 21, 2019.

Nelson, U.S. Appl. No. 15/290,858, filed Oct. 11, 2016, Office Action, dated May 1, 2019.

Nelson, U.S. Appl. No. 15/290,855, filed Oct. 11, 2016, Advisory Action, dated Jun. 20, 2019.

Nelosn, U.S. Appl. No. 15/290,855, filed Oct. 11, 2016, Final Office Action, dated May 1, 2019.

Kitada, U.S. Appl. No. 16/112,361, filed Aug. 24, 2018, Notice of Allowance, dated Jun. 7, 2019.

Nelson, U.S. Appl. No. 15/728,367, filed Oct. 9, 2017, Office Action, dated Jan. 24, 2019.

Malatesha, U.S. Appl. No. 15/384,187, filed Dec. 19, 2016, Notice of Allowance, dated Jan. 4, 2019.

Kitada, U.S. Appl. No. 16/112,361, filed Aug. 24, 2018, Office Action, dated Jan. 28, 2019.

Kitada, U.S. Appl. No. 14/992,278, filed Jan. 11, 2016, Final Office Action, dated Jan. 15, 2019.

Nelson, U.S. Appl. No. 15/910,878, filed Mar. 2, 2018, Office Action, dated Oct. 3, 2019.

Nelson, U.S. Appl. No. 15/728,367, filed Oct. 9, 2017, Notice of Allowance, dated Sep. 6, 2019.

Nelson, U.S. Appl. No. 15/290,855, filed Oct. 11, 2016, Notice of Allowance, dated Sep. 6, 2019.

The State Intellectual Property Office of P.R. China, "Search Report" in application No. 2016109782056, dated Aug. 28, 2019, 34 pages.

Olli Korjus, "Meeting Scheduling Assistant: Automatic Scheduling Between Heterogeneous Calendar Systems", dated Sep. 2012, pp. 1-115.

\* cited by examiner

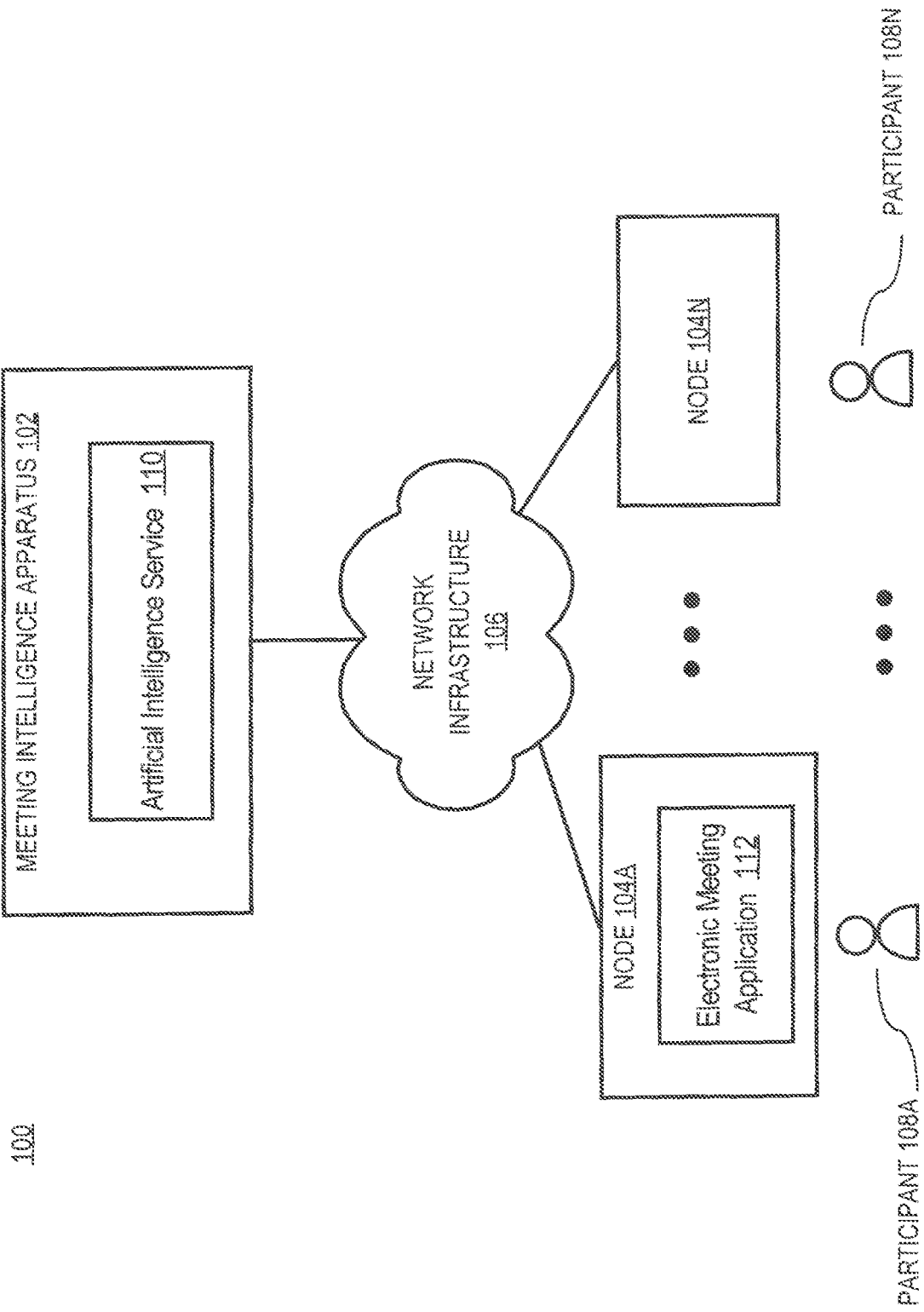

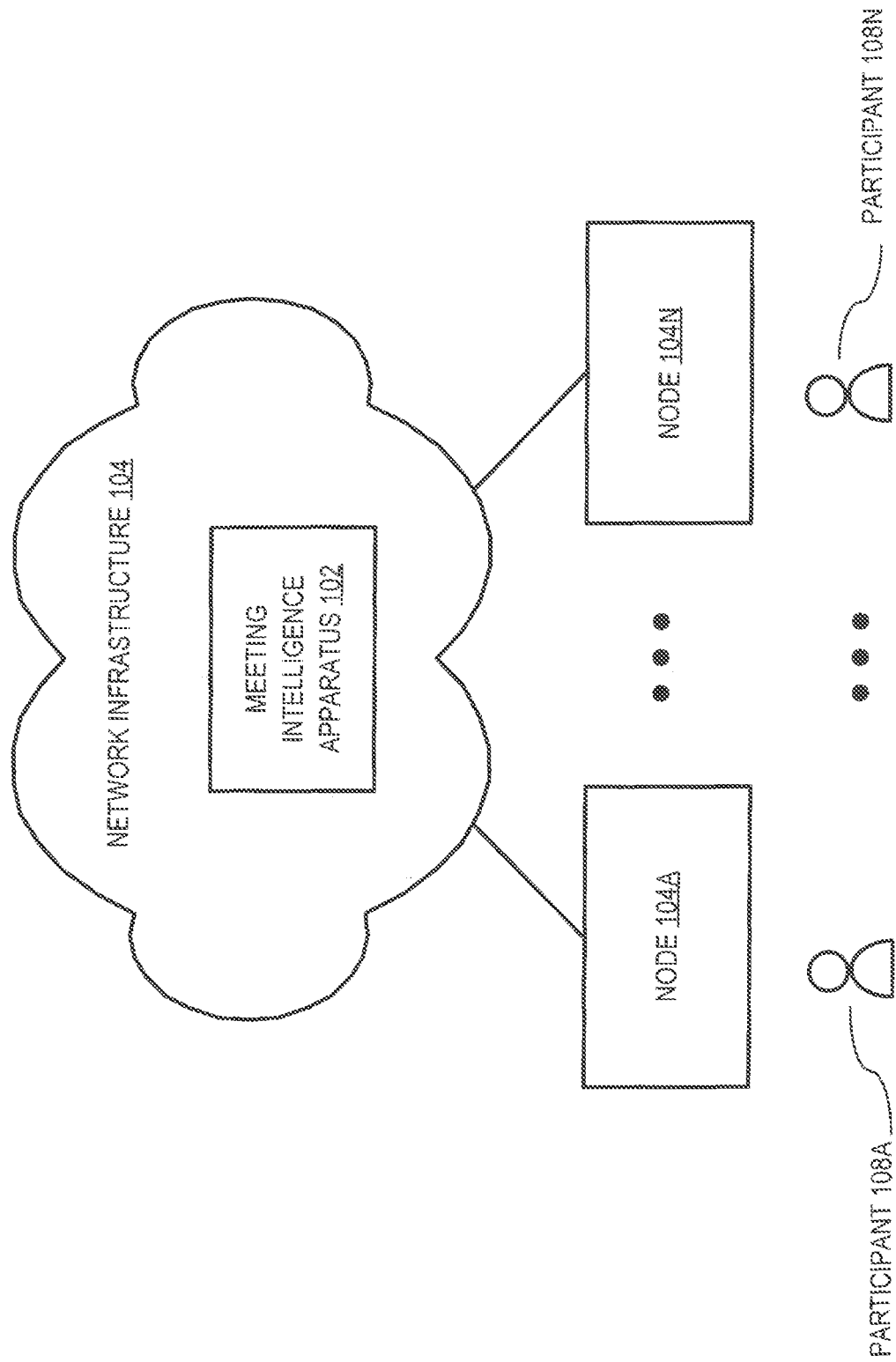

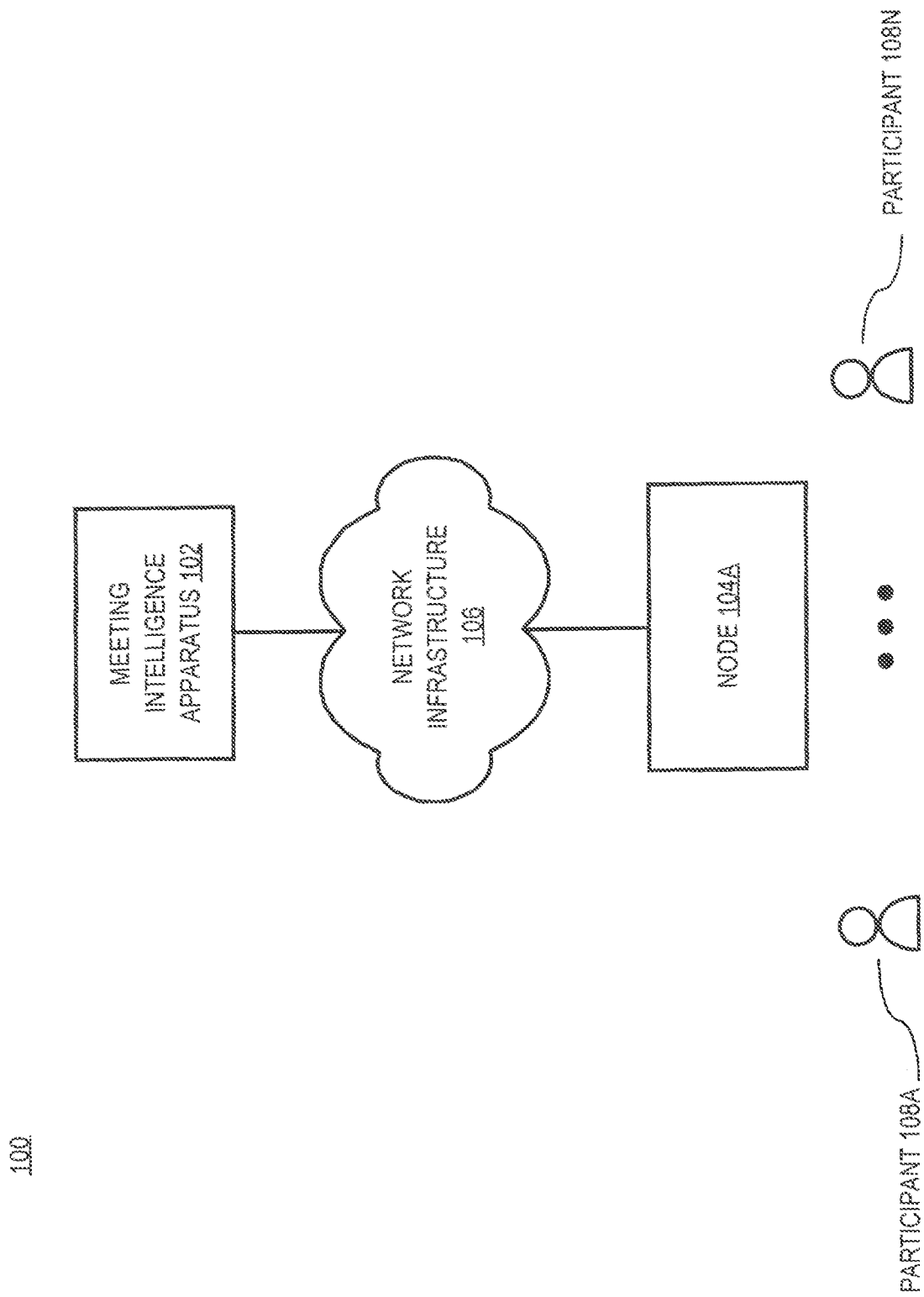

FIG. 2B

Meeting Rules Templates Screen 204

Select a Meeting Rules Template:

By Department:
Legal
  -Compliance
  -Litigation
  -Open Source Licensing
  -Standards
Engineering
  -Requirements Review
  -Preliminary Design Specification Review
  -Detailed Design Specification Review
  -Code Review
  -Integration Planning
  -Test Review
Software Quality Assurance (SQA)
  -Code Review
  -Test Verification
Finance
  -Quarter End Meeting
  -Year-End Meeting
Management
  -Board of Directors By Topic:
Code Review - Engineering
Code Review - SQA
Compliance
Detailed Design Specification Review
Board of Directors
Financial Review
Integration Planning
Litigation
Open Source Licensing
Preliminary Design Specification Review
PX350 - Product Release
Quarter End Meeting
Requirements Review
Standards
Test Review
Test Verification
Year End Meeting Search for a Meeting Rules Template: [         ] — 208

206 —

[ Edit ] [ Delete ] [ New ] [ Back ]

FIG. 2C

Meeting Rules Templates Screen 204

Board of Directors Meeting Rules

Maximum Number of Meeting Participants: 10   Data Inputs: Q4 Financials
                                                          Sales Projections Report Minimum Number of Board Members Required: 4

Designated Decision Maker Required: Yes

Required Agenda Items: Yes
  Action Items from Prior Meeting: Yes
  Financial Review: Yes
  Short Term Strategic Planning: Yes
  Long Term Strategic Planning: Yes Maximum Amount of Time Per Topic: 15 minutes Procedural Rules for Meeting: Roberts Rules of Order Meeting Minutes Required: Yes
  Specify Start and End Time: Yes
  Identify Board Members in Meeting: Yes
  Record Voting Results for All Motions: Yes

[ Add ]  [ Edit ]  [ Delete ]  [ Save ]  [ Back ]

Electronic Meeting Management Screen 230

New Meeting: 234

| Meeting Name: | Second Code Review Meeting |
| Meeting Owner: | |
| Meeting Subject: | Pluto Project |
| Meeting Type: | Code Review |
| Select Meeting Rules Template: | Engineering: Code Review |
| Date & Time: | 10am, 10/1/2016 |
| Duration: | 1 hr |
| Location: | Venus Conference Room |

Meeting Agenda 236

Meeting Participants 238

Save     Cancel

Existing Meetings: 232

Pluto Project:
- Detailed Design Review 9/1/16    View  Join
- First Code Review Meeting 10/1/16   View  Join
- Integration Testing Meeting 10/10/16  View  Join

Legal Department:
- Litigation Team Meeting 9/1/16   View  Join
- Compliance Review Meeting 9/3/16   View  Join

Finance Department:
- Q2 Review Meeting 8/25/16   View  Join
- Q3 Planning Meeting 9/1/16   View  Join

Management:
- Q2 Board Meeting 9/5/16   View  Join

Back

FIG. 2G

Electronic Meeting Screen 230

New Meeting: 234

| Meeting Name: | Second Code Review Meeting |
| Meeting Owner: | |
| Meeting Subject: | Pluto Project |
| Meeting Type: | Code Review |
| Select Meeting Rules Template: | Engineering: Code Review |
| Date & Time: | 10am, 10/1/2016 |
| Duration: | 1 hr |
| Location: | Venus Conference Room |

Create Meeting Agenda 236   Select Meeting Participants 238

Save   Cancel

---

Suggestions for Meeting Owner: 239

Accept  Reject  Suggestion:        Additional Information:
 ☐       ☐      Bob H. (98%)       Owner of prior code review
                                    meeting for the Pluto project
 ☐       ☐      Susan G. (87%)     Member of Pluto project team
                                    and owner of code review
                                    meetings for other projects Continue   Back

FIG. 2H

Meeting Name: Second Code Review Meeting

Agenda Creation Screen 250

Agenda Information 252

User-Specified Agenda Items: 254

-Additional Software Requirements from Vendor

-Graphical User Interface Update

-Software Integration Planning

Suggested Agenda Items: 256

☐ Uncompleted Agenda Items From Prior Meeting(s)

☐ Action Items from Prior Meeting(s)

☐ Agenda Items Based Upon Meeting Rules Template

☐ Other

258

Save  Back

FIG. 21

Agenda Creation Screen 250

Meeting Name: Second Code Review Meeting

Agenda Information

User-Specified Agenda Items: 254

- Additional Software Requirements from Vendor
- Graphical User Interface Update
- Software Integration Planning Suggested Agenda Items: 256

☒ Uncompleted Agenda Items From Prior Meeting(s)
☐ Driver code for DMA board (99%)
☐ Software Testing Schedule (99%)

☒ Action Items from Prior Meeting(s)
☐ Verify requirements for Sat link - John E. (99%)
☐ Investigate problems with DMA board - Susan R. (99%)

☒ Agenda Items Based Upon Meeting Rules Template
☐ Milestones Status Review (99%)

☒ Other
☐ Software Testing Schedule (92%)

258

Save    Back

FIG. 2J

Meeting Name: Second Code Review Meeting

Participant Selection Screen 260

Participant Information

Suggested Meeting Participants: 268

| Participant | Additional Information |
|---|---|
| ☐ Taryn K. (98%) | Attended First Code Review Meeting and was designated decision maker |
| ☐ Alex J. (88%) | Attended First Code Review meeting |
| ☐ John E. (88%) | Subject Matter Expert (SME) in encryption <more> |
| ☐ Jake S. (72%) | Lead software developer on Pluto project |
| ☐ Charles W. (68%) | Member of software quality assurance team |

User-Specified Meeting Participants: 264

Add Contacts 266

☐ Joe B.
☐ Susan R.
☐ Taryn K.
☐ Alex J.
☐ John E.
☐ Jake S.
☐ Charles W.

270

[ Save ]  [ Back ]

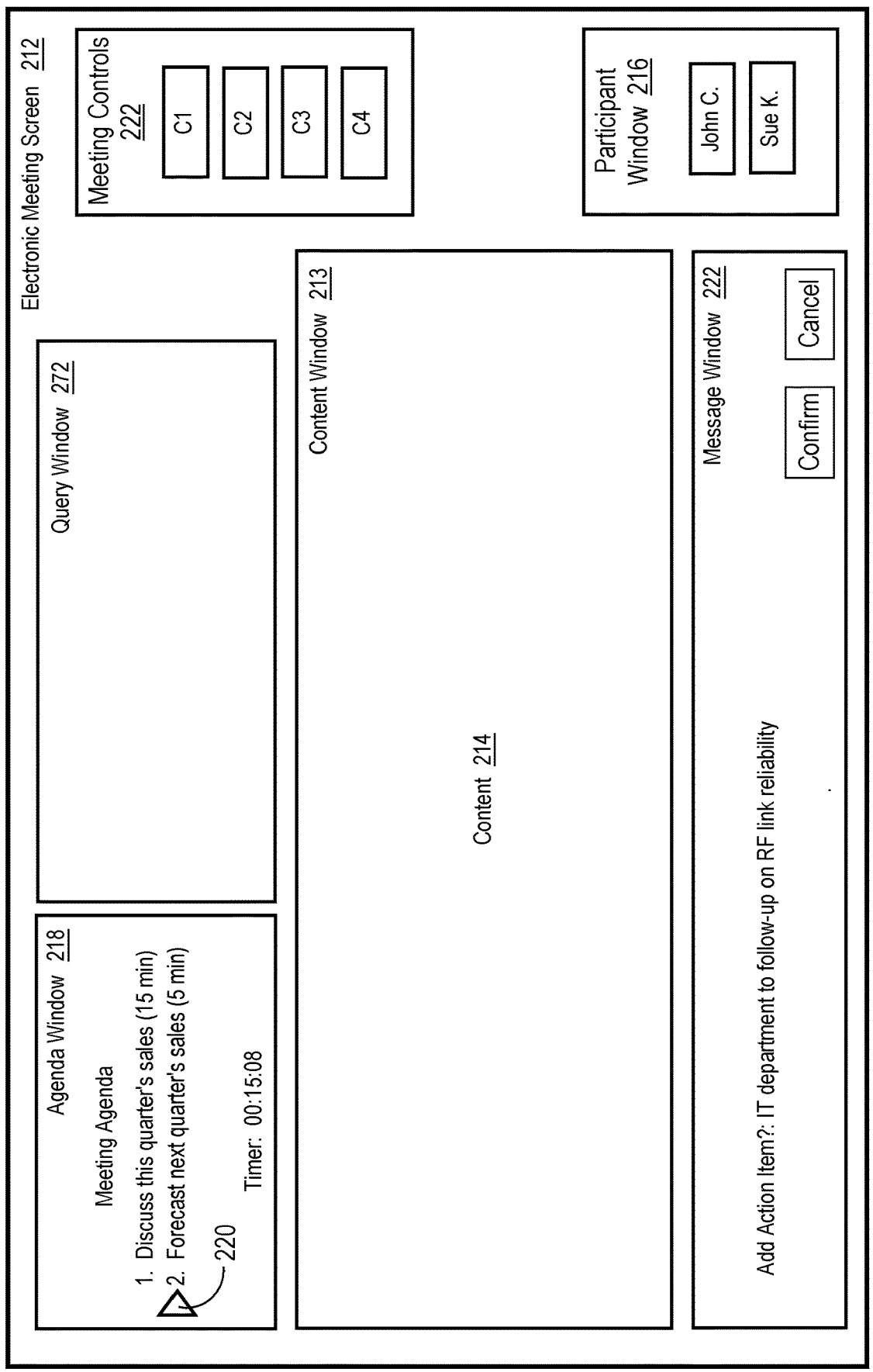

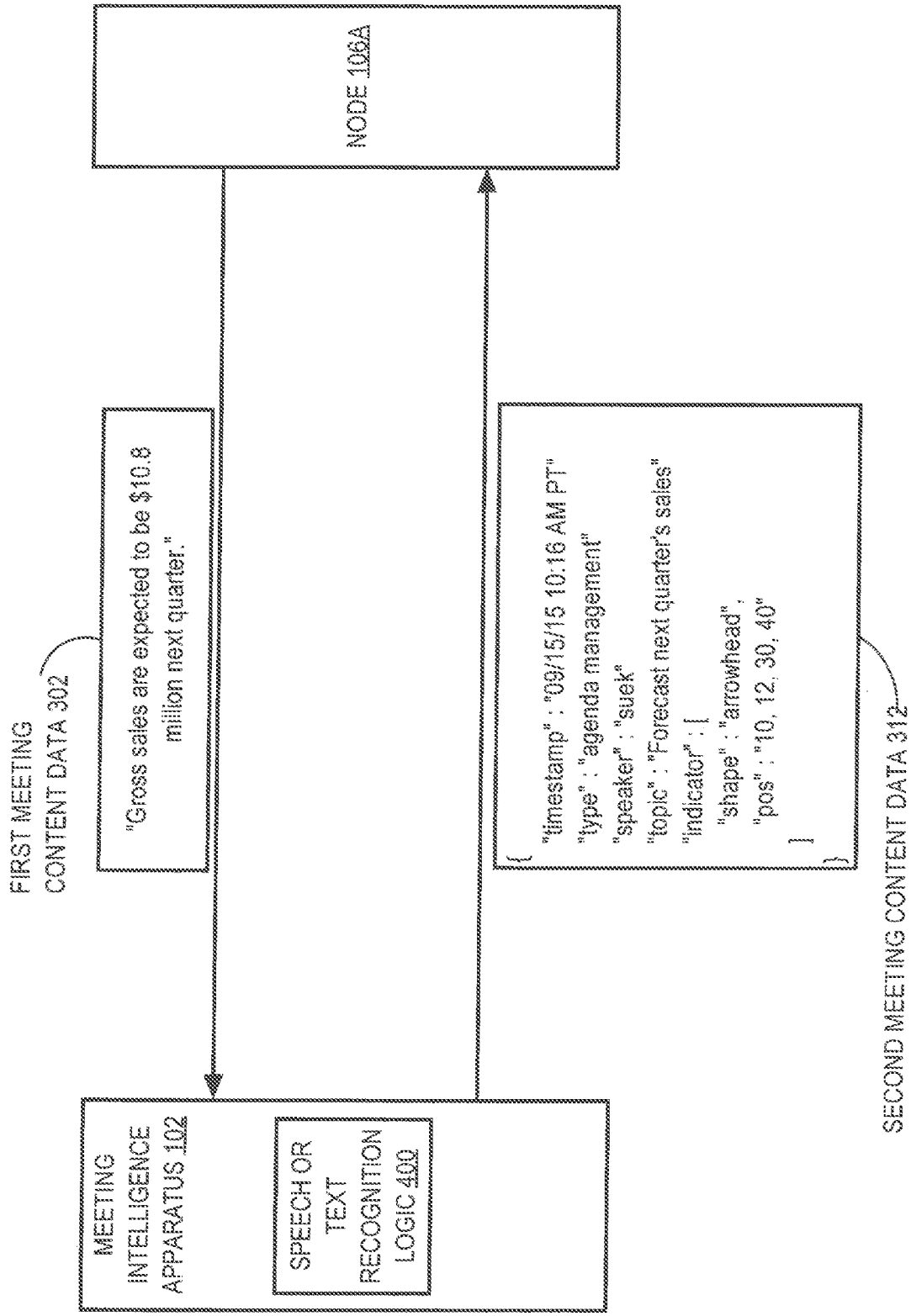

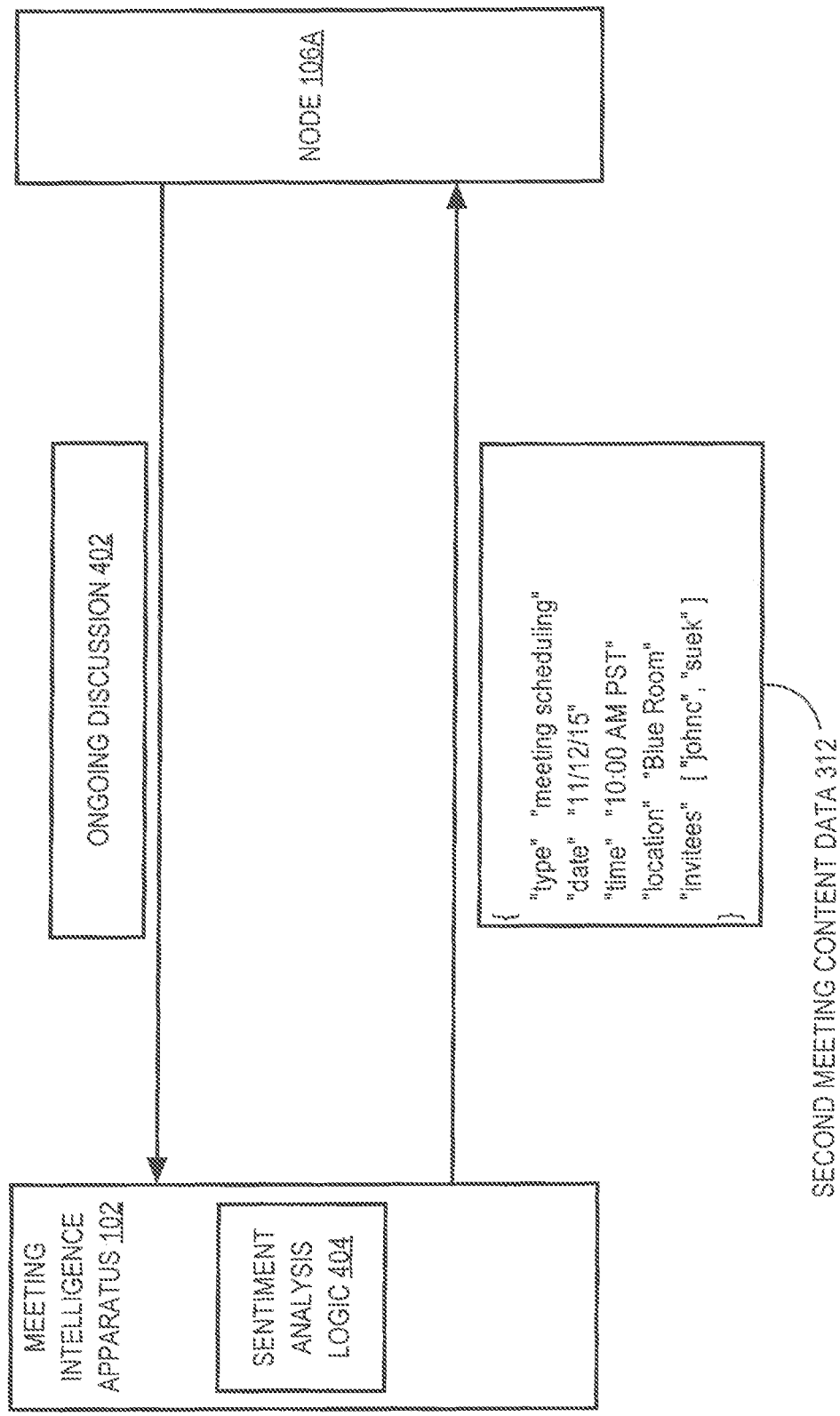

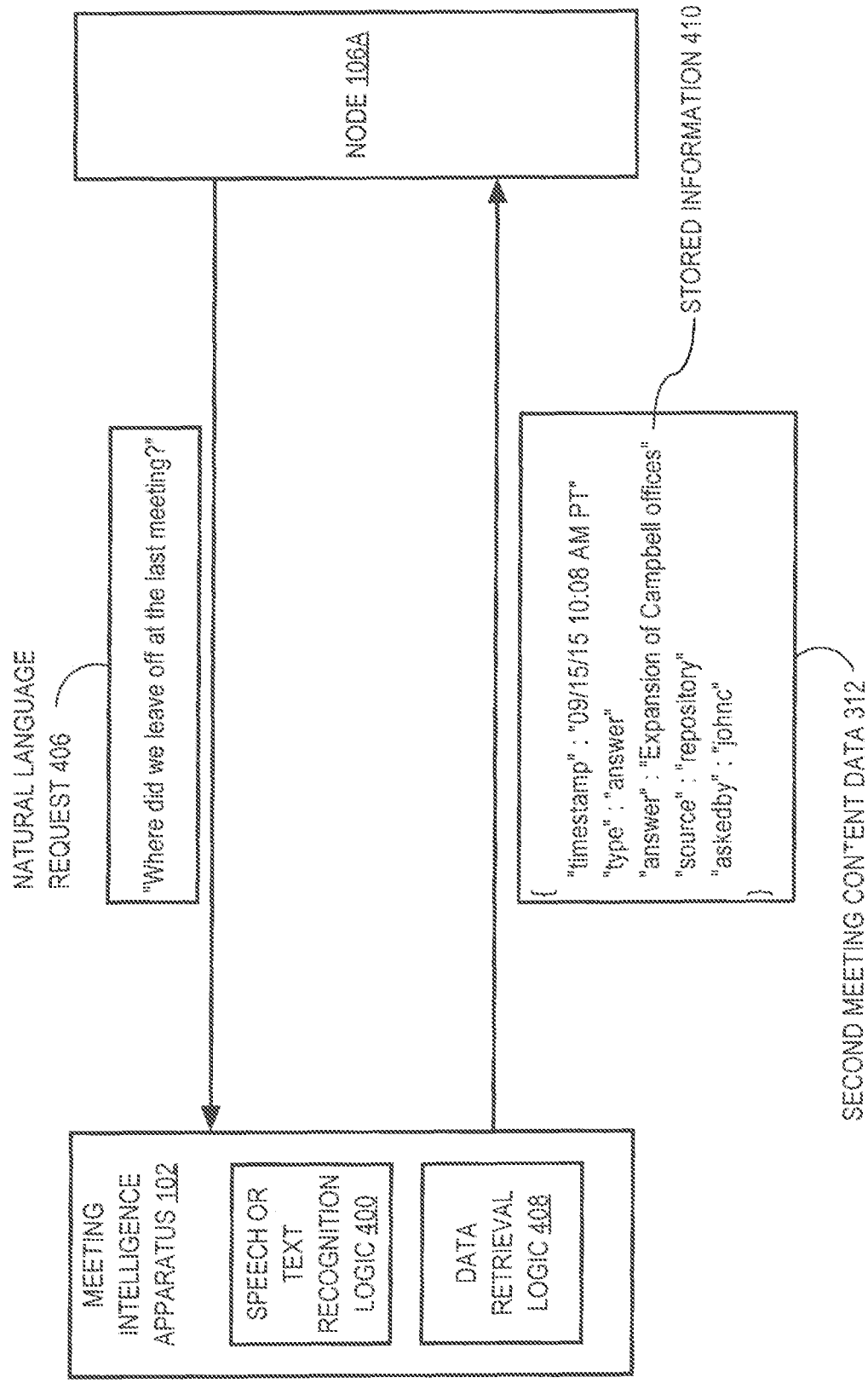

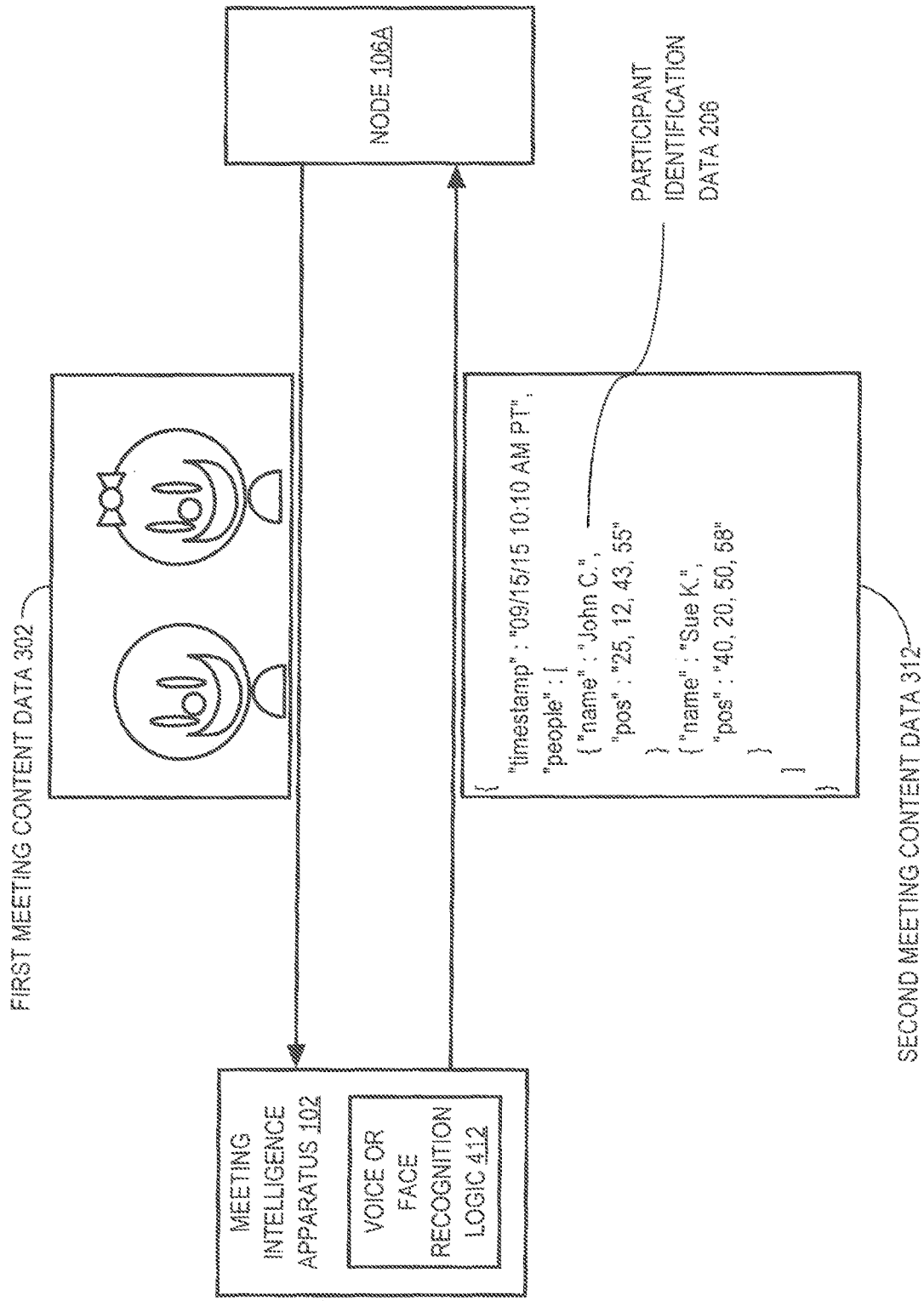

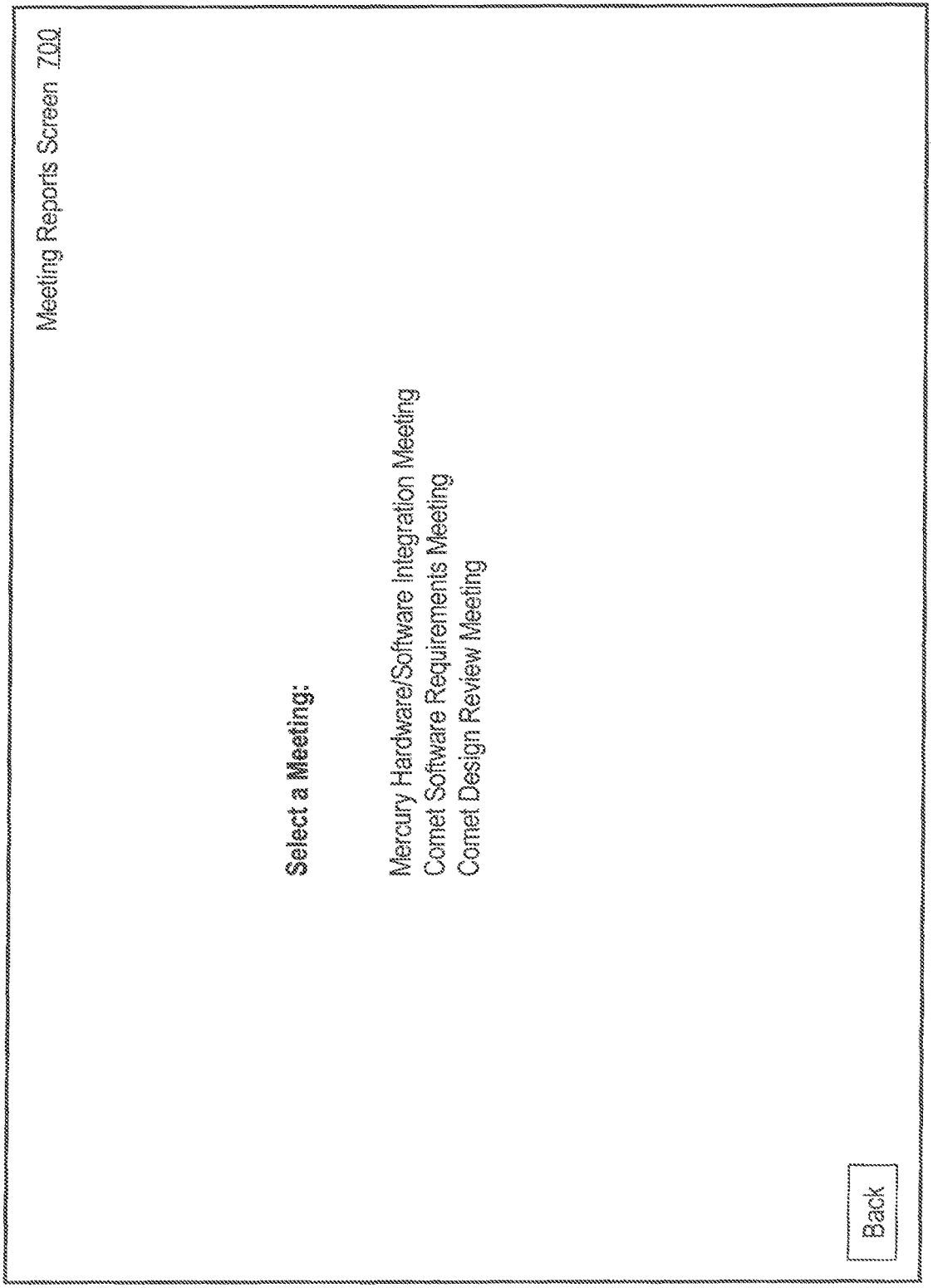

FIG. 7C

Meeting Participant Profile for: Sue K.

Select a Meeting:

+ Mercury Hardware/Software Integration Meeting
+ Comet Software Requirements Meeting
− Comet Design Review Meeting
    Date: September 15, 2015
    Total Participation Time: 00:12:38
        Agenda Item: "Create schedule by Tuesday": 00:09:21
        Agenda Item: "Get feedback from Marketing": 00:03:17
    Participation Index: 63/100
    Action Item Completion Rate: 1/2
    Role: Active Presenter
    Sentiments:
        Cheerful    89
        Confused    24
        Defensive    87
        Argumentative    84
        Pensive    48
        Confident    27

Participant Analysis Report 720

Aggregate Statistics for Sue K.: 722
  Number of Meetings: 12
  Participation Index: 48/100
  Action Item Completion Rate: 8/11
  Sentiment Scores: (0-100)
    Cheerful    98
    Confused    12
    Defensive    92
    Argumentative    89
    Pensive    50
    Confident    29

Aggregate Statistics for All Participants: 724

By Participation Rate:
  James W.  99
  Lucy J.  92
  ...
  Sue K.  48
  David R.  21
  ...

By Action Item Completion Rate:
  Richard B.  98
  Sally R.  94
  ...
  Sue K.  73
  ...
  Arden U.  12

Back

FIG. 12

| Context 1210 | S1 | S2 | S3 |
|---|---|---|---|
| Medical | X | | |
| Scientific | | X | X |
| Sports | X | X | |
| Business | X | X | X |

| Speaker 1220 | S1 | S2 | S3 |
|---|---|---|---|
| Speaker A | X | X | |
| Speaker B | X | X | X |
| Speaker C | | X | |
| Speaker D | | | X |

| Compliance 1230 | S1 | S2 | S3 |
|---|---|---|---|
| A | X | X | X |
| B | | X | |
| C | | | X |
| D | X | | |

| Location 1240 | S1 | S2 | S3 |
|---|---|---|---|
| Location A | | | X |
| Location B | X | | |
| Location C | | X | |
| Location D | | X | X |

| Language 1250 | Target Language | | | |
|---|---|---|---|---|
| Source Language | English | Japanese | French | German |
| English | | S1 | S3 | S2 |
| Japanese | S1 | | S1, S3 | S1 |
| French | S2, S3 | S3 | | S3 |
| German | S2 | S1 | S2, S3 | |

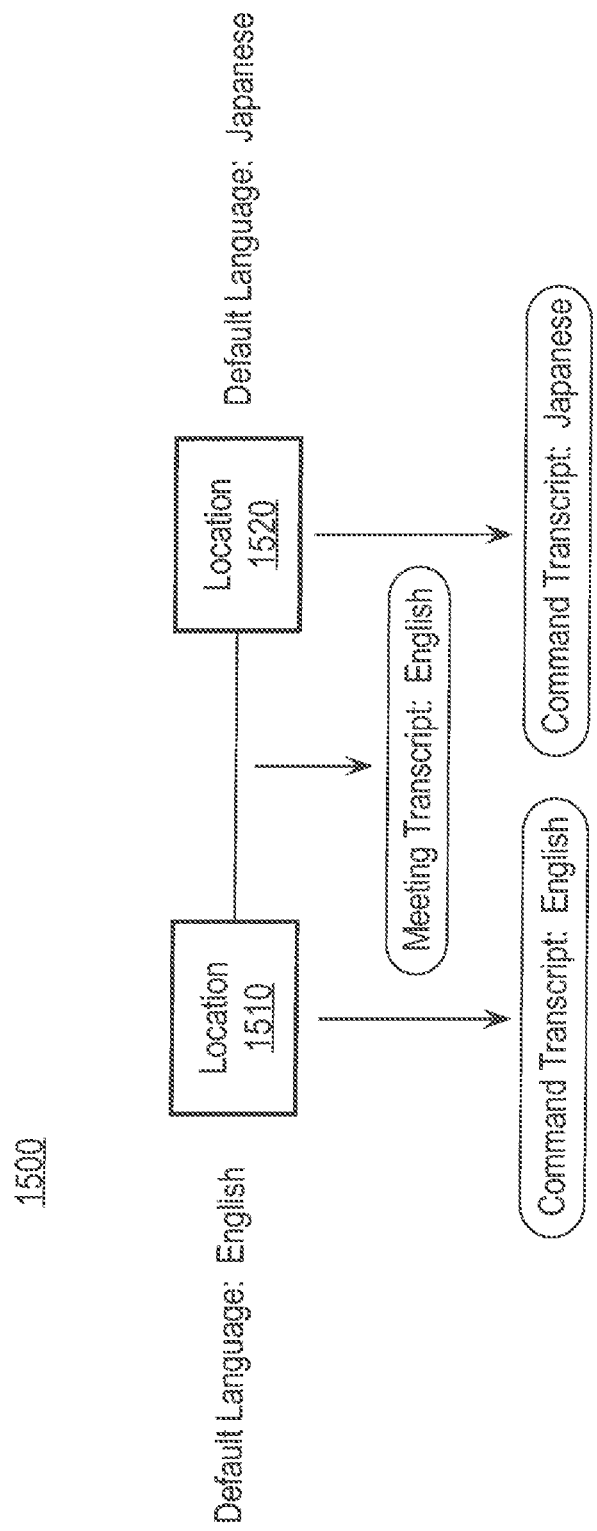

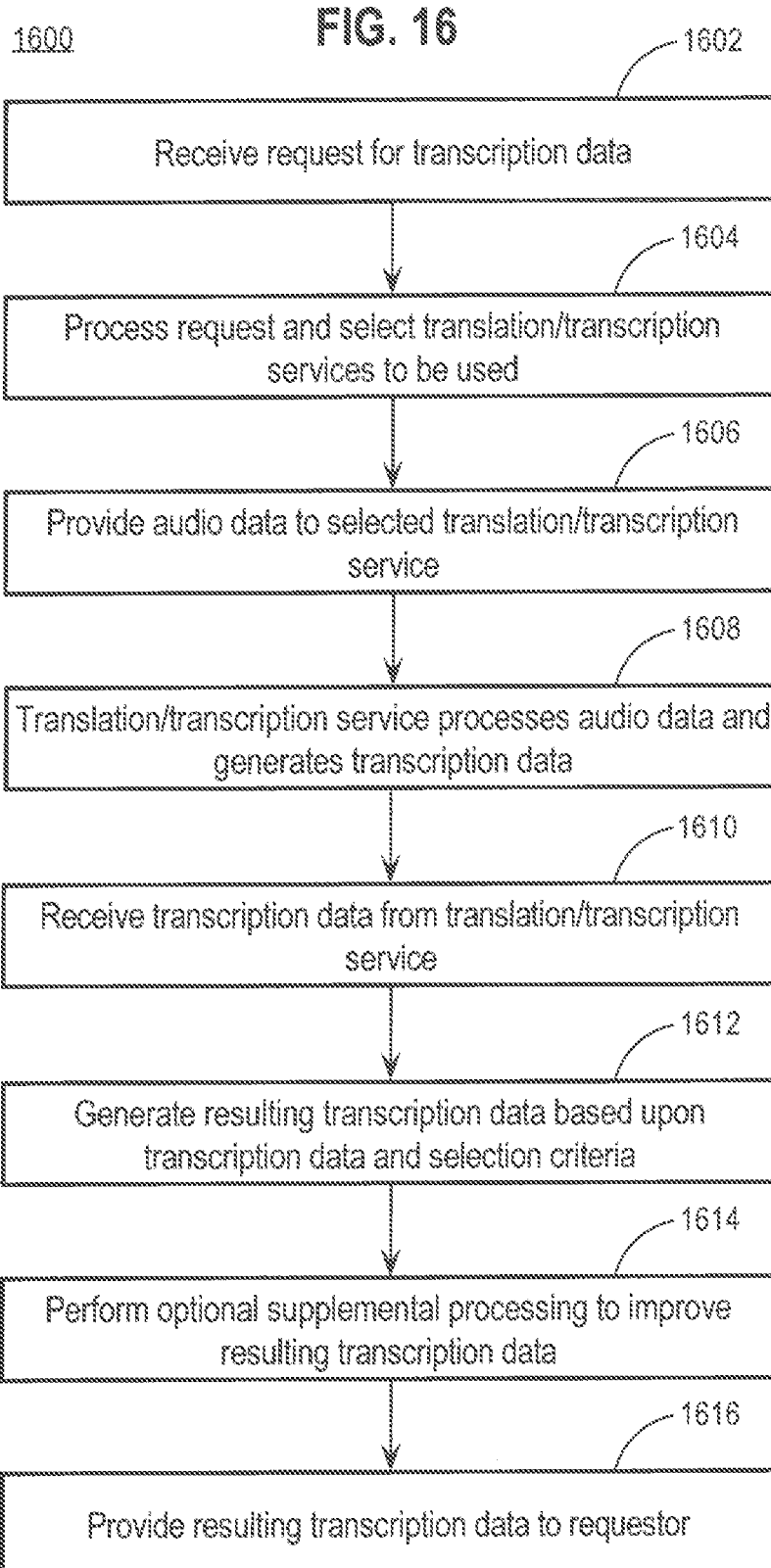

FIG. 17C

Meeting Information 1732

| Meeting ID | Meeting Name | Location | Date/Time | Participants | Other Information |
|---|---|---|---|---|---|
| Meeting #1 | X1 Design Review | D5 | 1/17: 10am | Tom J, Jake, Carley | Meeting Content |
| Meeting #2 | X1 Integration Plan | E7 | 1/17: 2pm | Carley, Tom J, Lisa | Action Items |
| Meeting #3 | X1 Hardware Testing | F4, D5 | 1/18: 11am | Lorie, Tom J, Jake | Test Schedule |
| Meeting #4 | X1 Design Review | D5 | 1/18: 2pm | Tom J, Jake, Carley | Content Identifiers |
| Meeting #5 | X1 As-Built Spec | K4, J1 | 1/19: 11am | Jamie, Carley, Jake | To-Do List |

Identity Information 1734

| User ID | Name | Image Data | Voice Data | Other Information |
|---|---|---|---|---|
| User #1 | Tom J | I3487 | V3487 | |
| User #2 | Carley | I3488 | V3488 | |
| User #3 | Jake | I9832 | V9832 | |
| User #4 | Lorie | I3182 | V3182 | |
| User #5 | Jamie | I1901 | V1901 | |

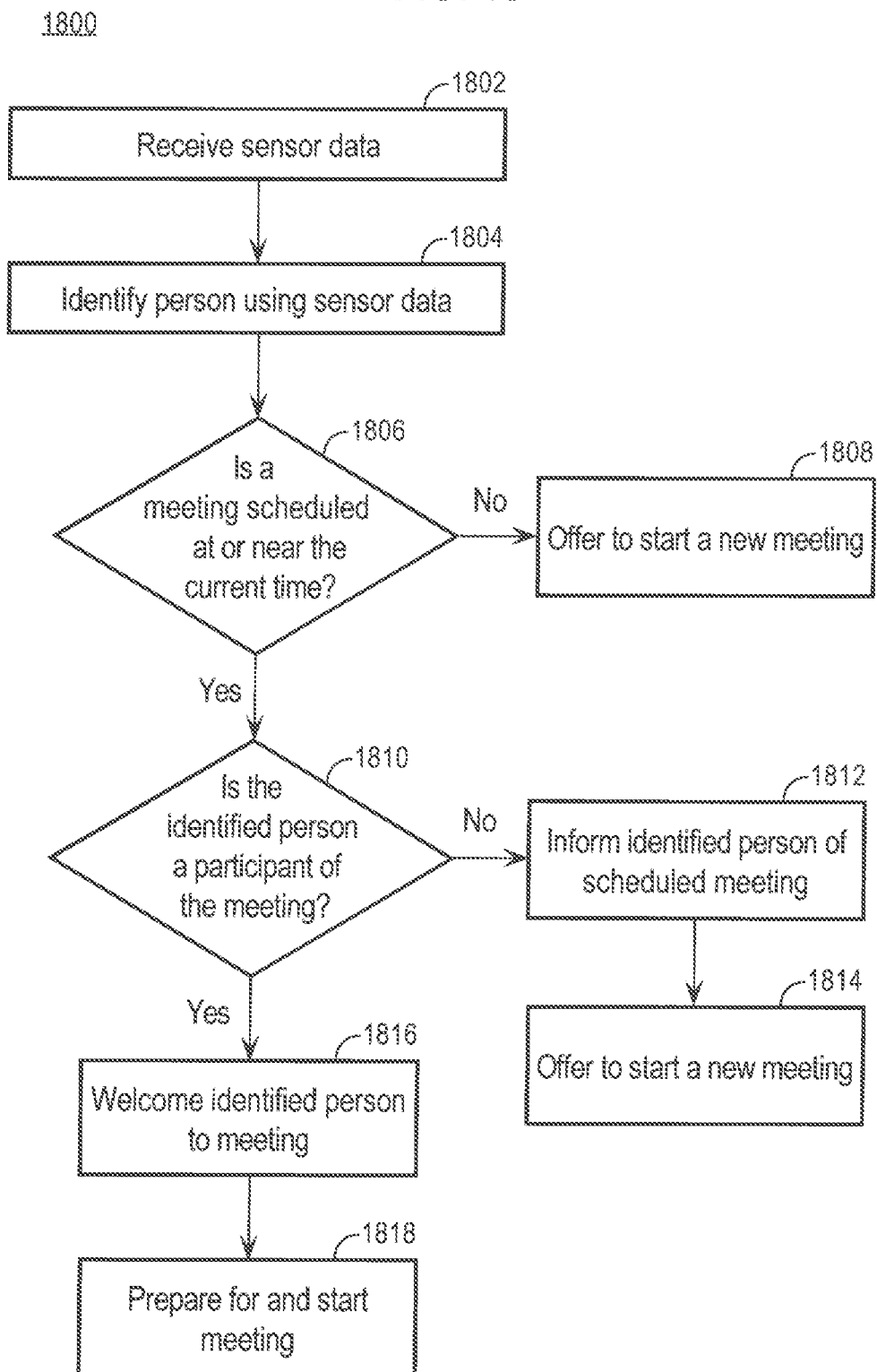

FIG. 19

Tom J.

| Attendance Tracking Information 1766 | | | | |
|---|---|---|---|---|
| Meeting ID | Meeting Name | Location | Date/Time | Participation Time(s) |
| Meeting #1 | X1 Design Review | D5 | 1/17; 10am | 10:00-10:48am |
| Meeting #2 | X1 Integration Plan | E7 | 1/17; 2pm | 2:03-2:33pm |
| Meeting #3 | X1 Hardware Testing | F4, D5 | 1/18; 11am | 10:58-12:04pm |
| Meeting #4 | X1 Design Review | D5 | 1/18; 2pm | 1:58-2:16; 2:20-2:48pm |
| Meeting #5 | X1 As-Built Spec | K4, J1 | 1/19; 11am | 11:15-11:35am |

SPEECH-TO-TEXT CONVERSION FOR INTERACTIVE WHITEBOARD APPLIANCES IN MULTI-LANGUAGE ELECTRONIC MEETINGS

This application is related to U.S. patent application Ser. No. 14/992,273 entitled "Electronic Meeting Intelligence", filed Jan. 11, 2016, and 14/992,278 entitled "Electronic Meeting Intelligence", filed Jan. 11, 2016, and U.S. patent application Ser. No. 5/384,181 entitled "Approach For Accessing Third-Party Content Collaboration Services on Interactive Whiteboard Appliances Using A Wallpaper", filed Dec. 19, 2016, and U.S. patent application Ser. No. 15/384,184 entitled "Approach For Accessing Third-Party Content Collaboration Services on Interactive Whiteboard Appliances Using Cross-License Authentication", filed Dec. 19, 2016, and U.S. patent application Ser. No. 15/384,187 entitled "Approach For Accessing Third-Party Content Collaboration Services on Interactive Whiteboard Appliances By An Application Using a Wrapper Application Program Interface", filed Dec. 19, 2016, and U.S. patent application Ser. No. 15/290,855 entitled "Managing Electronic Meetings Using Artificial Intelligence and Meeting Rules Templates", filed 15/290,856, and U.S. patent application Ser. No. 15/290,856 entitled "Creating Agendas for Electronic Meetings Using Artificial Intelligence", filed Oct. 11, 2016, and U.S. patent application Ser. No. 15/290,858 entitled "Selecting Meeting Participants for Electronic Meetings Using Artificial Intelligence", filed Oct. 11, 2016, and U.S. patent application Ser. No. 15/290,860 entitled "Real-Time (Intra-Meeting) Processing Using Artificial Intelligence", filed Oct. 11, 2016, and U.S. patent application Ser. No. 15/290,861 entitled "Post-Meeting Processing Using Artificial Intelligence", filed Oct. 11, 2016, and U.S. patent application Ser. No. 15/477,240 entitled "Electronic Meeting Intelligence", filed Apr. 3, 2017, and U.S. patent application Ser. No. 15/477,276 entitled "Electronic Meeting Intelligence", filed Apr. 3, 2017 and U.S. patent application Ser. No. 15/728,360 entitled "Person Detection, Person Identification and Meeting Start for Interactive Whiteboard Appliances", filed Oct. 9, 2017, and U.S. patent application Ser. No. 15/728,367 entitled "Speech-to-Text Conversion for Interactive Whiteboard Appliances Using Multiple Services", filed Oct. 9, 2017, and U.S. patent application Ser. No. 15/728,372 entitled "Attendance Tracking, Presentation Files, Meeting Services and Agenda Extraction for Interactive Whiteboard Appliances", filed Oct. 9, 2017, and U.S. patent application Ser. No. 15/728,376 entitled "Interactive Whiteboard Appliances With Learning Capabilities", filed Oct. 9, 2017, the contents all of which are incorporated by reference in their entirety for all purposes as if fully set forth herein.

FIELD

Embodiments relate to interactive whiteboard appliances (IWBs) for conducting electronic meetings. SUGGESTED GROUP ART UNIT: 2653; SUGGESTED CLASSIFICATION: 348.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A meeting is typically an effective vehicle for coordinating the successful accomplishment of a common goal shared by multiple people. However, a meeting can also devolve into a counterproductive use of time in the absence of proper organization of the meeting itself. For example, too much time may be devoted to a particular topic that involves a small subset of meeting attendees, and this may result in wasted time for the remaining attendees. Such circumstances may be avoided through the use of a person serving as a meeting moderator, but personal biases may affect the neutrality of the person serving as the meeting moderator. Such circumstances may also be avoided through adequate preparation for the meeting, but it may be impossible to foresee all the possible issues that may arise during the meeting.

Another way for a meeting to result in wasted time is by failing to fully reap the benefits provided by the meeting. For example, transcribing the meeting, scheduling an additional meeting, analyzing meeting participation, and/or researching an issue that was contended during the meeting may be tedious follow-up actions that are neglected after the meeting. Even if the follow-up actions are performed, the process of performing them may be slow and cost-prohibitive.

Thus, it is desirable and beneficial to perform the administrative duties related to a meeting using an approach without the aforementioned shortcomings.

SUMMARY

According to an embodiment, an apparatus comprises one or more processors and one or more memories storing instructions. Processing of the instructions by one or more processors causes receiving, over one or more communications networks from a requestor device, audio data that represents human speech or text. Two or more translation/transcription services are selected from a plurality of translation/transcription services to process the audio data that represents human speech or text. The audio data that represents human speech or text is provided to the two or more selected translation/transcription services and translation/transcription data is received from each translation/transcription service that includes a plurality of units of speech and a plurality of confidence scores for the plurality of units of speech. Resulting translation/transcription data that includes a plurality of units of speech selected from the translation/transcription data received from the two or more selected translation/transcription services is generated based upon one or more selection criteria that include confidence scores. The resulting translation/transcription data is provided over the one or more communications networks to the requestor device.

According to another embodiment, an apparatus comprises one or more processors and one or more memories storing instructions. Processing of the instructions by one or more processors causes receiving, over one or more communications networks from a requestor device, a request to generate a transcript of audio data for a meeting. In response to receiving, over one or more communications networks from a requestor device, the request to generate a transcript of audio data, the audio data is processed and a meeting transcript is generated for the meeting in a first language, along with a first command transcript for the meeting in the first language, and a second command transcript for the meeting in a second language that is different than the first language. The meeting transcript for the meeting in the first language, the first command transcript for the meeting in the first language, and the second command transcript for the meeting in the second language that is different than the first language, are provided over the one or more communications networks to the requestor device.

According to yet another embodiment, an interactive whiteboard appliance (IWB) comprises a display, a communications interface, one or more processors, and one or more memories storing instructions. Processing of the instructions by one or more processors causes receiving, via the communications interface, from one or more sensors, sensor data that indicates a detected presence of a person. Based upon the sensor data that indicates a detected presence of a person and identity information that specifies one or more of image data or voice data for each of a plurality of persons, a particular person is identified from the plurality of persons that corresponds to the sensor data that indicates a detected presence of a person. A determination is made, based upon meeting information and a current time, whether an electronic meeting involving the IWB appliance is scheduled at or around the current time. In response to determining, based upon the meeting information and the current time, that an electronic meeting involving the IWB appliance is scheduled at or around the current time, a determination is made, based upon the meeting information, whether the particular person is a scheduled participant of the particular electronic meeting involving the IWB appliance that is scheduled at or around the current time. In response to determining, based upon the meeting information, that the particular person is a scheduled participant of the particular electronic meeting involving the IWB appliance that is scheduled at or around the current time, one or more notifications pertaining to the particular electronic meeting are generated and displayed on the display of the IWB appliance.

According to a further embodiment, an interactive whiteboard appliance (IWB) comprises a display, a communications interface, one or more processors, and one or more memories storing instructions. Processing of the instructions by one or more processors causes receiving, via the communications interface, from one or more sensors, first sensor data that indicates a detected presence of a person within a specified distance of the IWB appliance. Based upon the first sensor data that indicates a detected presence of a person within the specified distance of the IWB appliance and identity information that specifies identify information for a plurality of persons, a particular person is identified from the plurality of persons that corresponds to the sensor data that indicates a detected presence of a person within the specified distance of the IWB appliance. A determination is made, based upon meeting information and a current time, whether an electronic meeting involving the IWB appliance is scheduled at or around the current time. In response to determining, based upon the meeting information and the current time, that an electronic meeting involving the IWB appliance is scheduled at or around the current time, a determination is made, based upon the meeting information, whether the particular person is a scheduled participant of the particular electronic meeting involving the IWB appliance that is scheduled at or around the current time. In response to determining, based upon the meeting information, that the particular person is a scheduled participant of the particular electronic meeting involving the IWB appliance that is scheduled at or around the current time, first participation time data is generated and stored that specifies a time at which the particular person joined the particular electronic meeting. Second sensor data that indicates that the particular person is no longer within the specified distance of the IWB appliance is received, via the communications interface, from the one or more sensors. In response to receiving, via the communications interface, from the one or more sensors, the second sensor data that indicates that the particular person is no longer within the specified distance of the IWB appliance, second participation time data that specifies a time at which the particular person is no longer a participant of the particular electronic meeting is generated and stored.

According to yet a further embodiment, an interactive whiteboard appliance (IWB) comprises a display, one or more processors, and one or more memories storing instructions. Processing of the instructions by one or more processors causes retrieving IWB appliance usage information that specifies a plurality of IWB appliance usage values that were used for two or more electronic meetings that were previously conducted using the IWB appliance. The IWB appliance usage information is analyzed to identify one or more usage patterns, wherein each usage pattern includes at least an IWB appliance usage value that was used in the two or more electronic meetings that were previously conducted using the IWB appliance. During the creation of a new electronic meeting involving the IWB appliance, including, in the new electronic meeting involving the IWB appliance, from the IWB usage patterns, at least one IWB appliance usage value that was used in the two or more electronic meetings that were previously conducted using the IWB appliance.

BRIEF DESCRIPTION OF THE DRAWINGS

In the drawings:

FIGS. 1A-C depict example computer architectures upon which embodiments may be implemented.

FIG. 2B depicts an example meeting rules templates screen displayed in response to a user selecting the "Meeting Rules Templates" option from options in FIG. 2A.

FIG. 2C depicts a meeting rules templates screen that displays the contents of the "Board of Directors" meeting rules template selected by a user from the meeting rules templates screen in FIG. 2B.

FIG. 2E depicts an electronic meeting management screen displayed by an electronic meeting application in response to a user selecting a control from meeting controls.

FIG. 2G depicts an electronic meeting management screen with a pop-up window that provides suggestions for missing meeting information, which in the present example is the missing meeting owner.

FIG. 2H depicts an agenda creation screen generated in response to a user selecting Meeting Agenda control from electronic meeting management screen.

FIG. 2I depicts suggested agenda items for each category of suggested agenda items depicted in FIG. 2H.

FIG. 2J depicts a participant selection screen generated in response to a user selecting Meeting Participants control from electronic meeting management screen.

FIG. 2K depicts a natural language query via query window of an electronic meeting screen that allows a user to enter a natural language query.

FIG. 4A is a block diagram that depicts an arrangement in which meeting intelligence apparatus includes speech or text recognition logic that processes first meeting content data to determine one or more corresponding agenda topics.

FIG. 4B is a block diagram that depicts an arrangement for performing sentiment analysis with respect to an ongoing discussion.

FIG. 4C is a block diagram that depicts an arrangement for retrieving requested information using natural language queries.

FIG. 4D is a block diagram that depicts an arrangement for supplementing meeting content with participant identification data.

FIG. 7A depicts an example meeting reports screen that provides access to meeting results data for a plurality of electronic meetings.

FIG. 7C depicts an example participant analysis report.

FIG. 12 depicts example data that may be included in selection data.

FIG. 15 is a block diagram that depicts an example arrangement on which an embodiment may be implemented.

FIG. 16 is a flow diagram that depicts an approach for providing multi-language support for meetings in which the participants have at least two different native languages.

FIG. 17C is a block diagram that depicts example contents of meeting information in the form of a table, where each row corresponds to a particular electronic meeting.

FIG. 18 is a flow diagram that depicts an approach for using person detection and person identification in the context of an electronic meeting with an interactive whiteboard appliance.

FIG. 19 is a block diagram that depicts an example implementation of attendance tracking information for an individual named "Tom J."

Figure 2A:
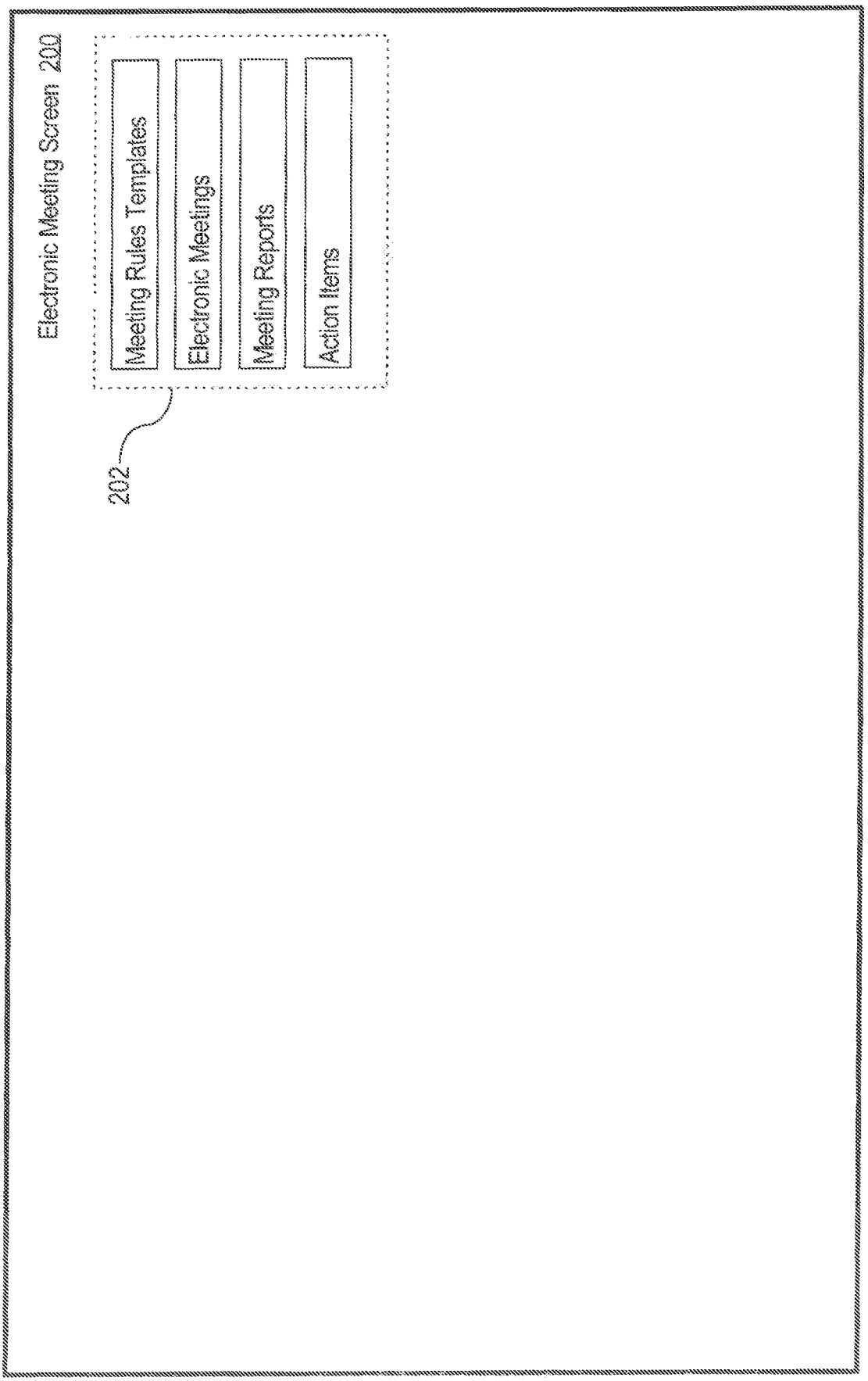
FIG. 2A depicts an example electronic meeting screen displayed by an electronic meeting application at a node.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

I. Overview
II. Architecture
   A. Meeting Intelligence Apparatus
   B. Network Infrastructure
   C. Participant Nodes
III. Meeting Rules Templates
IV. Electronic Meetings
   A. Meeting Creation
   B. Meeting Agenda Creation
   C. Meeting Participant Selection
      i. Suggested Meeting Participants
      ii. Subject Matter Experts (SMEs)
      iii. Meeting Rules Templates
      iv. Relevance Scores
      v. Additional information
V. Real-Time Processing
   A. Meeting Management
      i. Agenda Management
      ii. Points of Agreement, Action Items and New Meeting Requests
      iii. Sentiment Analysis
   B. Information Retrieval
   C. Meeting Content Supplementation
   D. Meeting Content Metadata Generation VI. Post-Meeting Processing
  A. Meeting Content Analysis
  B. Meeting Results
  C. Participant Analysis
  D. Action Item Management
VII. Process Overview
  A. Generating Intervention Data
  B. Generating Reports
VIII. Translation and Transcription
  A. Architecture
  B. Selection Data
  C. Generating Translation/Transcription Data
  D. Supplemental Processing
  E. Multi-Language Electronic Meetings
  F. Meeting Summaries
IX. Person Detection, Person Identification and Meeting Start
  A. Architecture
  B. Meeting Information
  C. Identity Information
  D. Meeting Arrangement
  E. Person Detection, Person Identification and Meeting Start
X. Attendance Tracking, Presentation of Content, Meeting Services, and Agenda Extraction
  A. Attendance Tracking
  B. Presentation of Content
  C. Meeting Services
  D. Agenda Extraction
XI. Learning
XII. Implementation Examples I. Overview Artificial intelligence is introduced into an electronic meeting context to perform various tasks before, during, and/or after electronic meetings. The tasks may include a wide variety of tasks, such as agenda creation, participant selection, real-time meeting management, meeting content supplementation, and post-meeting processing. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings. Embodiments include improved approaches for translation and transcription using multiple translation/transcription services. Embodiments also include using sensors in conjunction with interactive whiteboard appliances to perform person detection, person identification, attendance tracking, and improved meeting start. Embodiments further include improvements to the presentation of content on interactive whiteboard appliances, providing meeting services for meeting attendees, agenda extraction, and learning to aid in creating new electronic meetings. The approaches described herein improve the efficiency of creating and conducting electronic meetings, enforcing electronic meeting rules and policies, allowing decisions to be made more quickly, and providing higher confidence in the usefulness of electronic meetings.

II. Architecture

FIGS. 1A-C depict example computer architectures upon which embodiments may be implemented. FIGS. 1A-C include various examples of an arrangement 100 that supports electronic meetings. Arrangement 100 includes a meeting intelligence apparatus 102 and one or more nodes 104A-N, communicatively coupled via network infrastructure 106. Nodes 104A-N are associated with a plurality of electronic meeting participants 108A-N, also referred to herein as "participants." Some elements depicted in FIG. 1A are not depicted in other figures for purposes of explanation, but these elements may be included in the elements of the other figures.

Electronic meetings supported by arrangement 100 may be any type of electronic meetings conducted in any form using any computing platform. Examples of electronic meetings include, without limitation, audioconferencing sessions, videoconferencing sessions, desktop sharing sessions, any combination of the foregoing, and/or any other electronic meetings involving the sharing of data between network infrastructure 106 and at least one node 104A. Participants 108A-N may be located in physically-disparate locations or co-located in the same physical location. For example, FIGS. 1A-B depict arrangement 100 in which participants 108A-N are located in different physical locations, yet participant in an electronic meeting via network infrastructure 106. FIG. 1C depicts arrangement 100 in which participants 108A-N are located in physical proximity to each other such that they may communicate with each other without network infrastructure 106. However, network infrastructure 106 may enable participants 108A-N to interact with meeting intelligence apparatus 102, which receives input data from and/or sends output data to node 104A. Embodiments are also applicable to electronic meetings in which some participants 108A-N are in physically-disparate locations and some are co-located at the same physical location.

In an embodiment, arrangement 100 involves a network of computers. A "computer" may be one or more physical computers, virtual computers, and/or computing devices. A computer may be a client and/or a server. Any reference to "a computer" herein may mean one or more computers, unless expressly stated otherwise. Each of the logical and/or functional units depicted in any of the figures or described herein may be implemented using any of the techniques further described herein in connection with FIG. 21.

A. Meeting Intelligence Apparatus

In an embodiment, meeting intelligence apparatus 102 is implemented by one or more computing devices configured with artificial intelligence. The one or more computing devices may be special-purpose computing devices dedicated to providing artificial intelligence to electronic meetings, or generic computing devices executing one or more artificial intelligence services, such as artificial intelligence service 110 (FIG. 1A), which provide artificial intelligence to electronic meetings. Thus, meeting intelligence apparatus 102 may be implemented using any combination of computer hardware, computer software, and/or computer firmware. Examples of artificial intelligence service 110 include, without limitation, IBM Watson and other question answering (QA) systems/services. Meeting intelligence apparatus 102 may always be available (e.g., involve continuously running processes) or may be available on demand (e.g., be powered on when needed). Meeting intelligence apparatus 102 may be replicated over multiple computing devices such that at any point in time, at least one computing device can provide meeting intelligence services.

Meeting intelligence apparatus 102 may access meeting content data as if it were a node associated with a participant in an electronic meeting. Thus, meeting intelligence apparatus 102 may access any meeting content data that is transmitted from any of the one or more nodes 104A-N involved in an electronic meeting. For example, meeting intelligence apparatus 102 may monitor, collect, and/or analyze all data transmissions during an electronic meeting.

Meeting intelligence apparatus 102 may analyze meeting content data using any of a number of tools, such as speech or text recognition, voice or face identification, sentiment analysis, object detection, gestural analysis, thermal imaging, etc. Based on analyzing the meeting content data and/or in response to requests, for example, from electronic meeting applications, meeting intelligence apparatus 102, either alone or in combination with one or more electronic meeting applications, performs any of a number of automated tasks, including performing one or more actions with respect to an electronic meeting, such as creating an electronic meeting, providing a translation, responding to an information request, determining suggested agenda items and suggested meeting participants, performing various types of real-time processing with respect to an electronic meeting, such as managing the flow of an electronic meeting, processing agenda items, creating actions items, etc., and various post-meeting processing, such as generating a report, etc.

Meeting intelligence apparatus 102 may be located at a number of different locations relative to network infrastructure 106. Referring to FIGS. 1A and 1C, meeting intelligence apparatus 102 is located outside network infrastructure 106. Referring to FIG. 1B, meeting intelligence apparatus 102 is collocated with at least some of network infrastructure 106. Artificial intelligence service 110 may include one or more application program interfaces (APIs) that may be used by electronic meeting applications to access functionality provided by artificial intelligence service 110.

In an embodiment, meeting intelligence apparatus 102 is communicatively coupled to a meeting data repository (not depicted). The meeting data repository may be part of meeting intelligence apparatus 102, or may be located separate from meeting intelligence apparatus 102. The meeting data repository may be a database, data structure, a configuration file, and/or any other system that stores data related to one or more electronic meetings. Like meeting intelligence apparatus 102, the meeting data repository may be located at different locations relative to network infrastructure 106, for example, on one or more computing devices internal or external to network infrastructure 106. The meeting data repository stores data pertaining to any number of electronic meetings, and may include data for prior electronic meetings, current electronic meetings, and future electronic meetings. Examples of data for prior, current and future electronic meetings include, without limitation, meeting agendas, meeting participant information, meeting invitation information, meeting transcripts, minutes and notes, action items, etc., as well as results data that includes the results of analyzing any of the foregoing types of data. Meeting data may be collected and stored by meeting intelligence apparatus 102, nodes 104A-N, or both. This allows meeting intelligence apparatus 102 to provide the services of a librarian for meeting-related data, as well as the other functionality described herein. Electronic meeting data may also be generated, stored and managed by other entities, such as other processes.

In an embodiment, meeting intelligence apparatus 102 is communicatively coupled to any of a number of external data sources (not shown), such as websites, other data available via the World Wide Web, databases managed by Salesforce, Oracle, SAP, Workday, or any entity other than the entity managing meeting intelligence apparatus 102. Meeting intelligence apparatus 102 may be communicatively coupled to the external data sources via network infrastructure 106. The external data sources may provide meeting intelligence apparatus 102 with access to any of a variety of data, meeting-related or otherwise.

B. Network Infrastructure

Network infrastructure 106 may include any number and type of wired or wireless networks, such as local area networks (LANs), wide area networks (WANs), the Internet, etc. Network infrastructure 106 may also include one or more computing devices, such as one or more server computers, load-balancing computers, cloud-based computers, data centers, storage devices, and/or any other special-purpose computing devices. For example, network infrastructure 106 may include a Unified Communication System (UCS) Service Platform by Ricoh Company Ltd., and/or any other computer(s) that manage(s) electronic meetings.

C. Participant Nodes

Each node of the one or more nodes 104A-N is associated with one or more participants 108A-N. Each participant is a person who participates in an electronic meeting. Each node processes data transmission between network infrastructure 106 and at least one participant. Multiple nodes 104A-N may be communicatively coupled with each other using any of a number of different configurations. For example, multiple nodes may be communicatively coupled with each other via a centralized server or via a peer-to-peer network.

In an embodiment, a node includes a computing device that executes an electronic meeting application 112. As used herein, the term "application" refers to any type of process. The node may include a special-purpose computer, such as Ricoh UCS P3500, or a general-purpose computer that executes a special-purpose application, such as Ricoh UCS App. The node may also include any of a number of input/output mechanisms, such as a camera, a microphone, and an electronic whiteboard. For example, the node may include a smartphone with GPS capability, a camera, a microphone, an accelerometer, a touchscreen, etc. Example implementations of a node include, without limitation, a desktop computer, a laptop computer, a workstation, a tablet computing device, a personal digital assistant, an interactive whiteboard (IWB) appliance, a mobile phone, or other mobile computing device. The input/output mechanisms may include a participant interface, such as a graphical user interface (GUI). Electronic meeting applications may create and manage data that supports electronic meetings, and the data may be stored locally on nodes 104A-N, remotely, or both locally and remotely, depending upon a particular implementation. Electronic meeting application 112 is implemented by one or more processes that allow a corresponding node to participate in electronic meetings. Electronic meeting application 112 is configured to interact with one or more other electronic meeting applications on other computing devices and/or one or more electronic meeting managers or servers to participate in electronic meetings. For example, electronic meeting application 112 may interact with an electronic meeting manager to perform various functions pertaining to electronic meetings. This may include, for example, scheduling meetings, creating agendas and specifying content to be shared/discussed, inviting participants, etc. Electronic meeting application 112 is also configured to access functionality provided by artificial intelligence service 110, via one or more APIs provided by artificial intelligence service 110, to incorporate artificial intelligence into various aspects of electronic meetings, as described in more detail hereinafter.

III. Meeting Rules Templates

According to one embodiment, functionality is provided to create and manage meeting rules templates for electronic meetings. A meeting rules template specifies a set of rules to be applied to any aspect of an electronic meeting, i.e., before, during, and after an electronic meeting. As used herein, the term "rule" refers to a requirement and/or a constraint. For example, a meeting rules template may define items that are required to be included on an agenda, participants that are required in an electronic meeting, that a decision maker must be designated, one or more aspects of how an electronic meeting is conducted, e.g., via time limits, etc., procedural rules that govern an electronic meeting, and items to be included in meeting results. Meeting rules templates may also specify data inputs for an electronic meeting, such as data streams, electronic documents, etc. Meeting rules template functionality may be implemented, for example, by an electronic meeting application executing on a node 104A-N.

Meeting rules may be specified by an organization, e.g., via bylaws, or by entities external to organizations, such as governmental, judicial or law enforcement entities. One non-limiting example is organizational rules or bylaws that require at least a specified number of participants attend an electronic meeting to satisfy a quorum requirement for voting purposes. The participants may include regular members, board members, voting members, etc. Another example is a time constraint (minimum or maximum) for discussion of a particular agenda item. Yet another example is a requirement that documentation for an electronic meeting, such as meeting minutes, include specified information, such as start and end times, the names of board members in attendance, decisions that were made on action items, etc. Requirements and constraints may also specify that a particular meeting procedure be used to conduct an electronic meeting. One non-limiting example of a meeting procedure is Roberts Rules of Order.

As described in more detail hereinafter, according to one embodiment, an electronic meeting application allows a user to designate one or more meeting rules templates for an electronic meeting. The electronic meeting application, in conjunction with meeting intelligence apparatus 102, enforces the rules specified by the designated meeting rules templates before, during, and after electronic meetings. This may include, for example, ensuring that an agenda for an electronic meeting contains required items, that required participants are included in an electronic meeting, that required data inputs are provided, that the electronic meeting is conducted in accordance with the requirements and constraints, and that meeting results satisfy the requirements and constraints specified by a meeting rules template.

FIG. 2A depicts an example electronic meeting screen 200 displayed by an electronic meeting application at a node. Electronic meeting screen 200 includes controls 202 for accessing meeting rules templates, electronic meetings, meeting reports and action items. Electronic meeting screen 200 may represent an initial meeting screen that is displayed after an electronic meeting application is invoked on a node 104A-N.

FIG. 2B depicts an example meeting rules templates screen 204 displayed in response to a user selecting the "Meeting Rules Templates" option from controls 202 in FIG. 2A. Meeting rules templates screen 204 allows a user to view, edit and delete existing meeting rules templates, and create new meeting rules templates. Meeting rules templates screen 204 depicts existing meeting rules templates displayed by department, within a business organization, and by topic. In the example depicted in FIG. 2B, the departments include Legal, Engineering, Software Quality Assurance (SQA), Finance and Management, with one or more identified meeting rules templates for each department. The particular departments included in FIG. 2B are provided for explanation purposes, and the organization of meeting rules templates may vary depending upon a particular implementation. For example, meeting rules templates may be organized and displayed by any type of logical entity.

In the example depicted in FIG. 2B, a user may select an existing meeting rules template and then edit or delete the selected meeting rules template by selecting an "Edit" control or a "Delete" control, respectively, from controls 206. According to one embodiment, permissions may be used to control which users have the authority to edit or delete a meeting rules template. For example, permissions data may be maintained for meeting rules templates, where the permissions data specifies users who are authorized to edit and delete particular meeting rules templates. This may be useful for meeting rules templates, such as the "Board of Directors" meeting rules template that may contain sensitive information. A user may also create a new meeting rules template by selecting a "New" control from controls 206. According to one embodiment, an electronic meeting application may include a wizard that provides step-by-step assistance for users to create new meeting rules templates. This may include, for example, providing commonly-used rules with controls that allow a user to select and de-select individual rules, as well as add custom rules. A "Back" control allows a user to return to the electronic meeting screen 200 of FIG. 2B. A search tool 208 is also provided to allow a user to search for existing rules templates, for example, by keyword.

FIG. 2C depicts meeting rules templates screen 204 that displays the "Board of Directors" meeting rules template for the "Management" department selected by a user from the meeting rules templates screen 204 in FIG. 2B. The Board of Directors meeting rules template specifies rules that must be satisfied before, during, and after Board of Directors meetings. These rules specify that a Board of Directors meeting may have a maximum number of 10 meeting participants, a minimum number of four board members are required, a designated decision maker is required, certain agenda items are required, including a financial review, short term strategic planning, and long term strategic planning, and a maximum amount of time of 15 minutes may be spent on each agenda item. The rules also specify that Board of Directors meetings must be conducted in accordance with Roberts Rules of Order and meeting minutes must be generated that include a start and end time of the meeting, a list of the Board members in attendance, and the results of votes on all motions. The rules further specify that Board of Directors meetings must include as data inputs, Q4 Financials and a Sales Projection Report. The particular data inputs may vary, depending upon the requirements of a particular meeting.

The meeting rules depicted in FIG. 2C are provided for explanation purposes, and meeting rules may vary, depending upon a particular implementation. Controls 210 allow a user to add, edit or delete rules, save rules, or return to the meeting rules templates screen 204 of FIG. 2B by selecting the "Back" option.

Meeting rules may be manually created by users, for example, by an administrator or end user. According to one embodiment, meeting rules may be created with the assistance of meeting intelligence apparatus 102. For example, when creating a new rule, via the "Add" control from controls 210, the meeting rules templates screen 204 may provide an option that allows a user to enter query terms for a particular type of meeting for which the user is interested in defining meeting rules. Meeting intelligence apparatus 102 processes the query terms and presents results that include example meeting rules that may be appropriate for the particular type of meeting. The example meeting rules may be obtained, for example, based upon industry-specific practices, or "best practices." For example, the widely-accepted "best practices" for a particular type of engineering meeting may include a small number of participants, e.g., less than five, and that input from all meeting participants is required.

IV. Electronic Meetings

Figure 2D:
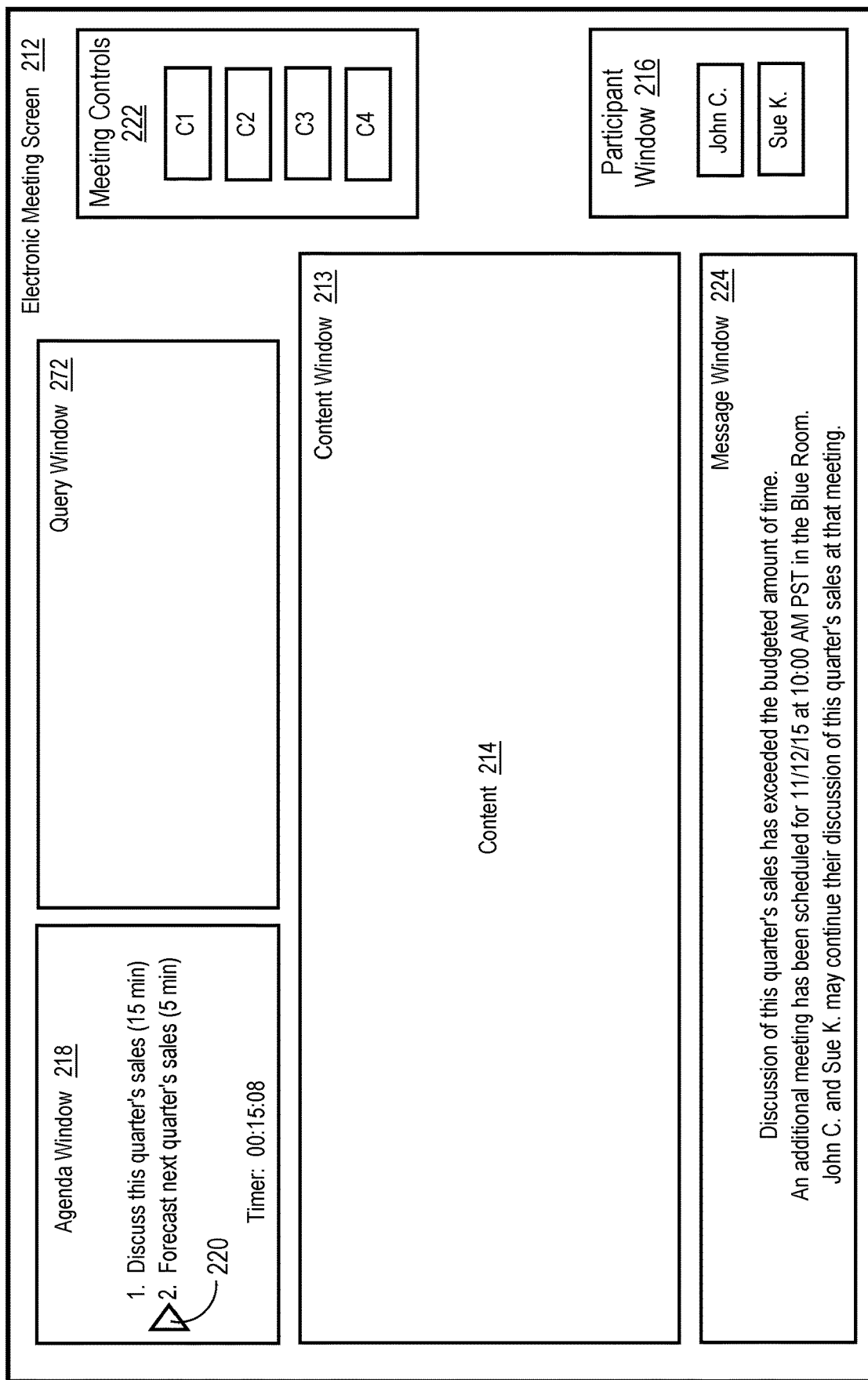
FIG. 2D depicts an electronic meeting screen displayed by an electronic meeting application in response to a user selecting the "Electronic Meetings" option from options in FIG. 2A.

According to one embodiment, an electronic meeting application executing on a node 104A-N includes functionality that allows user to manage electronic meetings. FIG. 2D depicts an electronic meeting screen 212 displayed by an electronic meeting application in response to a user selecting the "Electronic Meetings" option from controls 202 in FIG. 2A. Electronic meeting screen 212 may be implemented, for example, by one or more Web pages which, when processed on a computing device, cause electronic meeting screen 212 to be displayed on the computing device.

Electronic meeting screen 212 includes a content window 213 that includes content 214 for a current electronic meeting, which may represent a videoconferencing session, a desktop sharing session, a messaging session, an audio conferencing session, etc. Electronic meeting screen 212 also includes a participant window 216 that identifies participants of the current electronic meeting, and an agenda window 218 that displays an agenda for the current electronic meeting. Agenda window 218 includes a visual indicator 220 that identifies a current agenda item and a timer that indicates the time remaining for the current agenda item. The management of agenda items using meeting intelligence apparatus 102 is discussed in more detail hereinafter. Electronic meeting screen 212 also includes meeting controls 222 that provide access to various functionality with respect to the current electronic meeting. As described in more detail hereinafter, this includes functionality pertaining to electronic meeting management, content, agendas, and participants. A message window 224 provides messages generated with the assistance of meeting intelligence apparatus, which is also described in more detail hereinafter. Electronic meeting screen 212 may include additional elements or fewer elements depending upon a particular implementation, and embodiments are not limited to the example depicted in FIG. 2D.

FIG. 2E depicts an electronic meeting management screen 230 displayed by an electronic meeting application in response to a user selecting a control from meeting controls 222. Electronic meeting management screen 230 includes an existing meeting portion 232 that displays information and provides controls to view and join existing electronic meetings, and a new meeting portion 234 that includes controls that allow a user to create a new electronic meeting. According to one embodiment, permissions may be used to control the ability for users to view and/or join an electronic meeting. Permissions may be implemented in a wide variety of ways that may vary depending upon a particular implementation. For example, in response to a user selecting the "Join" option for a particular electronic meeting via existing meeting portion 232, a request to join the particular electronic meeting may be generated and transmitted to the organizer of the electronic meeting. In response to the meeting organizer approving the request, the user is may be notified that their request has been granted and the user is allowed to join the particular electronic meeting. As an alternative, this process may be automated based upon a user's permissions. For example, the permissions of the user requesting to join the particular meeting are compared to permissions specified for the particular electronic meeting and the user is allowed to join the particular electronic meeting if the user has the necessary permissions. The use of permissions in the foregoing examples is helpful for controlling access to electronic meetings that may include sensitive or confidential information. Electronic meeting management screen 230 includes a "Back" control to return to electronic meeting screen 200.

In the example depicted in FIG. 2E, existing meetings portion 232 depicts existing electronic meetings for logical entities within a business organization that include a Pluto Project, a Legal Department, a Finance Department, and Management, with corresponding controls to view or join any of these electronic meetings. Embodiments are not limited to these example logical entities, and any type of logical entities may be used. A user may select the view control to view information for a particular existing electronic meeting.

Figure 2F:
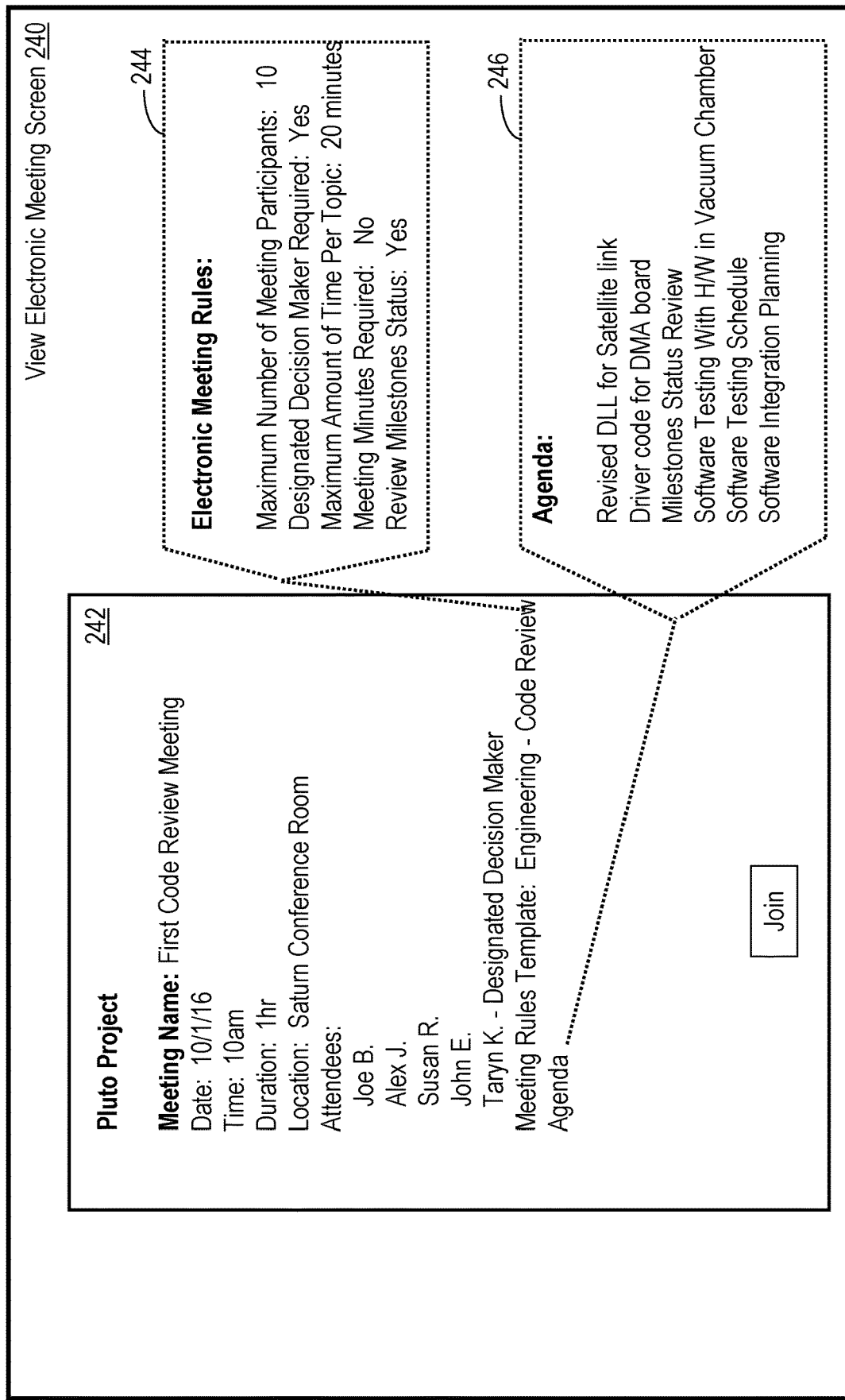
FIG. 2F depicts a view electronic meeting screen displayed in response to a user selecting the "View" option for the Code Review Meeting for the Pluto Project displayed in existing meetings portion.

FIG. 2F depicts a view electronic meeting screen 240 displayed in response to a user selecting the "View" option for the Code Review Meeting for the Pluto Project displayed in existing meetings portion 232. In the example depicted in FIG. 2F, view electronic meeting screen 240 displays information 242 for the Code Review Meeting for the Pluto Project, including date, time duration, location and attendees. The information 242 also includes electronic meeting rules 244 and an agenda 246. As described in more detail hereinafter, electronic meeting rules 244 and agenda 246 may be generated with the assistance of artificial intelligence provided by meeting intelligence apparatus 102. In the example depicted in FIG. 2F, electronic meeting rules 244 are defined by a particular meeting rules template, namely, the Engineering—Code Review meeting rules template depicted in FIG. 2B. This meeting rules template specifies a maximum number of 10 participants, that the meeting must include a designated decision maker, a maximum of 20 minutes may be spent on each topic, and no meeting minutes are required.

Agenda 246 specifies topics to be addressed during the electronic meeting and includes a revised dynamic linked library (DLL) for the satellite link, driver code for the direct memory access (DMA) board, a milestone status review, software testing with hardware (h/w) in the vacuum chamber, the software testing schedule, and software integration planning. A user who has the necessary permissions, such as the owner or host of the Code Review Meeting for the Pluto Project, may edit the information 242 for the electronic meeting. For example, a user may select the "Duration" attribute and change the value from 1 hour to 45 minutes. Information 242 also includes a control that allows a user to join the electronic meeting. Selecting the "Join" option, either from view electronic meeting screen 240, or the electronic meeting management screen 230 (FIG. 2E), causes a request for the user to join the meeting to be sent to the meeting owner for processing.

A. Meeting Creation

Electronic meetings may be created manually by users, or may be created with the assistance of artificial intelligence provided by meeting intelligence apparatus 102. Returning to FIG. 2E, new meeting portion 234 includes controls that allow a user to specify, for a new electronic meeting, a meeting name, a meeting owner, a meeting subject, and a meeting type. The controls also allow a user to select one or more meeting rules templates, a date and time, and a location for the new electronic meeting. The location may correspond to the physical location of a computing device of the electronic meeting owner or host. A single meeting rules template is depicted in FIG. 2E for purposes of explanation, but electronic meetings may have any number of corresponding meeting rules templates. Embodiments are not limited to the information depicted in FIG. 2E, and new meeting portion 234 may allow a user to specify other information for new electronic meetings, depending upon a particular implementation.

According to one embodiment, missing information for new meetings may be provided by meeting intelligence apparatus 102 based upon an analysis of various types of data. In the example depicted in FIG. 2E, a meeting owner was not specified. Meeting intelligence apparatus 102 may determine, based upon an analysis of prior meetings for the Pluto project, such as a first code review meeting, that Bob. H is a good candidate to be the meeting owner of the second code review meeting, and the meeting owner field may be automatically populated with Bob H. Other information may be considered in making the determination, such as other types of meetings for the same project, code review meetings for other projects, assigned responsibilities of project members, etc.

Missing information for a new meeting may be provided or indicated to the electronic meeting application executing on node 104A-N and automatically included in new meeting information. Missing information may be presented in a manner to visually indicate that the information was automatically provided, for example, via highlighting, coloring, special effects, etc., and a user may be given an opportunity to accept, reject, or edit the missing information that was automatically provided. Meeting intelligence apparatus 102 may also provide multiple candidates for missing information.

In the prior example, meeting intelligence apparatus 102 may determine that both Bob H. and another person Susan G. are good candidates to be the meeting owner of the second code review meeting. The two candidates may be presented as suggestions for designation as the meeting owner, and a user given an opportunity to select one, both, or none of the choices, unless the electronic meeting application does not allow multiple meeting owners, in which case only one of Bob H. and Susan G. may be selected as the meeting owner. Suggestions may be presented in ranked order, based upon a confidence score, and the confidence score for each choice may be displayed to provide additional information to the user making the selection.

FIG. 2G depicts electronic meeting management screen 230 with a pop-up window 239 that provides suggestions for missing meeting information, which in the present example is the missing meeting owner. In this example it is presumed that the creator of the new electronic meeting did not specify a meeting owner. The suggestions for the meeting owner are determined by the electronic meeting application in conjunction with meeting intelligence apparatus 102. In this example, the suggested meeting owners Bob H. and Susan G. are displayed in pop-up window 239, and controls are provided to accept or reject one or both of the suggested meeting owners, along with controls for saving the information for the new electronic meeting, or canceling and not saving the information. A confidence score generated by meeting intelligence apparatus 102 is optionally displayed for each suggestion. The confidence score represents a likelihood that the corresponding suggestion will be selected by the user.

Additional information is optionally provided with the suggestions to aid the user in making a selection of one, both or none of the suggested meeting owners. The additional information may be information that meeting intelligence apparatus 102 considered in making the suggestions, or may be other information that is deemed likely to be helpful to users in considering the suggested missing information, i.e., the missing meeting owner in the present example. As depicted in FIG. 2G, the additional information for Bob H. indicates that Bob H. was the owner of prior code review meetings for the Pluto project, making him a candidate for the meeting owner. Susan G. is a member of the Pluto project team and was the owner of code review meetings for other projects, which combined makes Susan G. a candidate for the meeting owner of the second code review meeting for the Pluto project. This example illustrates how cognitive computing may be useful in providing suggestions for missing information for a new electronic meeting. This approach may be applied to any missing information, depending upon a particular implementation.

Electronic meetings may also be automatically created during electronic meetings by an electronic meeting application executing on a node, in conjunction with meeting intelligence apparatus 102. According to one embodiment, meeting intelligence apparatus 102 detects, during an electronic meeting, one or more cues that indicate that a new meeting should be created. For example, meeting intelligence apparatus 102 may detect, in meeting content data, an explicit command, such as a natural language request, from a meeting participant to create a new meeting. Meeting intelligence apparatus 102 may be configured to recognize particular commands and formats, e.g., "SystemOne: create new meeting."

Meeting intelligence apparatus 102 may also be configured to create new meetings based upon implicit commands. Implicit commands or requests are statements made during an electronic meeting that indicate a desire for a new meeting, even though the statements may not include an explicit specified command or request for a new meeting. For example, meeting intelligence apparatus 102 may detect, in meeting content data, statements made as part of a conversation to indicate that another meeting may be useful in discussing a particular topic. Examples of such statements include "It would be good to discuss this in a separate meeting" and "Let's setup another meeting to discuss this further." These statements can be characterized as representing an implied request for a new electronic meeting. Cognitive computing functionality provided by meeting intelligence apparatus 102 may be used to analyze statements made during an electronic meeting to determine whether an implicit command or request for a new electronic meeting has been made during an electronic meeting. Meeting intelligence apparatus 102 may then inform the electronic meeting application that a new electronic meeting should be created, as described in more detail hereinafter.

Meeting intelligence apparatus 102 may be further configured to create a new electronic meeting based upon sentiment analysis of a current electronic meeting that indicates that a new meeting may be appropriate or helpful in a particular situation. For example, sentiment analysis of a current electronic meeting may indicate that significant disagreement and/or hostility exists between participants in a meeting. Sentiment analysis may use various cues that occur in speech during an electronic meeting, such as tone of voice, volume of voice, velocity of speech, lack of pauses in speech, profanity, sounds such as grunts, exhalation of air, etc. The use of sentiment analysis is described in more detail hereinafter.

In response to determining that a new meeting is appropriate, based upon an explicit command, an implicit command, or sentiment analysis, meeting intelligence apparatus 102 may directly instruct an electronic meeting application to request a new meeting, or include an instruction or request in meeting content data or meeting metadata that is provided to the electronic meeting application. In response to receiving an instruction or request, the electronic meeting application may provide a visual and/or audible notification to indicate a new meeting request. The electronic meeting application may display information for the new electronic meeting determined from information in the current electronic meeting. For example, the electronic meeting application, in conjunction with meeting intelligence apparatus 102, may determine information for the new electronic meeting based upon information in the current electronic meeting. For example, a statement may be made during the current electronic meeting, "We should have a separate meeting for this next Tuesday," and a proposed date and time would be included with the information for the new electronic meeting. The electronic meeting application may, in conjunction with meeting intelligence apparatus 102, query a user for additional information about the new electronic meeting, for example, information that is deemed to be missing for the new electronic meeting.

B. Meeting Agenda Creation

Electronic meeting agendas may be created manually by users and may be created with the assistance of artificial intelligence provided by meeting intelligence apparatus 102. According to one embodiment, meeting intelligence apparatus 102 participates in the creation of electronic meeting agendas by providing suggested items to be included on an electronic meeting agenda. The electronic meeting application may request that meeting intelligence apparatus 102 provide suggested agenda items for an electronic meeting. The request for suggested agenda items may include data that specifies a plurality of attributes of the new electronic meeting. For example, a request for suggested agenda items may include any of the data specified by a user in new meeting portion 234 of electronic meeting management screen 230. In response to this request, meeting intelligence apparatus 102 analyzes various types of information and provides suggested agenda items to the electronic meeting application, which displays the suggested items for a user, and allows a user to select suggested items to be included in an electronic meeting agenda.

Returning to FIG. 2E, new meeting portion 234 includes a Meeting Agenda control 236 that allows a user to create a meeting agenda for a new electronic meeting. FIG. 2H depicts an agenda creation screen 250 generated in response to a user selecting Meeting Agenda control 236 from electronic meeting management screen 230. For example, in response to a user selecting Meeting Agenda control 236 from electronic meeting management screen 230, the electronic meeting application may cause agenda creation screen 250 to be generated and displayed.

Agenda creation screen 250 includes agenda information 252 for the new electronic meeting, which in this example is the second code review meeting for the Pluto project. Agenda information 252 includes user-specified agenda items 254 that may be manually specified by a user. User-specified agenda items 254 may be specified, for example, as a list of agenda items that a user wishes to be included on the meeting agenda for the new electronic meeting. In the example depicted in FIG. 2H, user-specified agenda items 254 include three agenda items: Additional Software Requirements from Vendor, Graphical User Interface Update, and Software Integration Planning. These agenda items may be specified by a user typing the agenda items into user-specified agenda items 254, or by copying and pasting information from other applications. User-specified agenda items 254 may be added, edited, and deleted, and the changes saved via selection of the Save control 258.

Agenda information 252 also includes suggested agenda items 256 that are generated with the assistance of meeting intelligence apparatus 102. Suggested agenda items 256 may be automatically generated and displayed in response to a user selecting Meeting Agenda control 236 when agenda creation screen 250 is displayed. Alternatively, agenda creation screen 250 may include a control for requesting the generation and display of suggested agenda items 256. A user may switch between user-specified agenda items 254 and suggested agenda items 256 by selecting each corresponding area on agenda creation screen 250, for example, by using a selection device such as a mouse.

Suggested agenda items 256 are topics for discussion that are determined to be relevant and appropriate for a particular new electronic meeting. The topics may be topics that have been scheduled for discussion, or actually discussed, in other electronic meetings, or they may be new topics. For example, suggested agenda items 259 may include topics that appear in multiple electronic documents related to the subject matter of a new electronic meeting. To generate suggested agenda items 256, meeting intelligence apparatus 102 may analyze agendas of other prior or current electronic meetings, minutes or other written records of other electronic meetings, other documentation, or any other information. This may include information for the same entity associated with the electronic meeting, other entities, or information for a particular industry or context. Examples of information analyzed by meeting intelligence apparatus 102 includes, without limitation, meeting agendas or other documents for other electronic meetings of the same meeting type for the same project, of the same meeting type for other projects within an entity, such as a business or other organization, of a different, but related meeting type, for the same project, or for other projects, etc. this may include, for example, search for electronic documents that mention the current project, which in the present example is the Pluto Project. Other examples include, without limitation, meeting agendas for other organizations within the same industry or context. Information beyond meeting agendas may also be evaluated. Examples of other information include, without limitation, specifications, memoranda, and other documents.

Suggested agenda items 256 may be organized and presented to a user in any manner that may vary depending upon a particular implementation. For a large number of suggested agenda items 256, visually organizing the suggested agenda items on a user interface may provide a more favorable user experience than merely listing all available suggested agenda items 256. FIG. 2H depicts categories of suggested agenda items 256: Uncompleted Agenda Items From Prior Meeting(s), Action Items From Prior Meeting(s), Agenda Items Based Upon Meeting Rules Template, and Other. Each of the categories may be selected to view the particular agenda items within each category.

FIG. 2I depicts suggested agenda items for each category of suggested agenda items depicted in FIG. 2H. Organizing suggested agenda items by category may be more useful to some users than listing suggesting agenda items in random order, although embodiments are not limited to organizing suggested agenda items 256 by category, and other approaches may be used such as alphabetical order, etc.

Agenda items in the Uncompleted Agenda Items and Action Items From Prior Meeting(s) categories may be determined by meeting intelligence apparatus 102 first identifying one or more prior electronic meetings that are related to the current electronic meeting, and then analyzing electronic documents associated with the identified one or more prior electronic meetings. Meeting intelligence apparatus 102 may identify the one or more prior electronic meetings, which in this example is the First Code Review Meeting, based upon a reference to the First Code Review Meeting in documentation associated with the current electronic meeting, i.e., the Second Code Review Meeting, or any other attributes of the current meeting. For example, the agenda for the current electronic meeting may explicitly reference the prior electronic meeting. As another example, the one or more prior electronic meetings may be referenced by a schedule or plan. For example, both the one or more prior electronic meetings and the current electronic meeting may be included on a project schedule.

Once the one or more prior electronic meetings have been identified, electronic documents for the one or more prior electronic meetings, such as the agenda and/or meeting minutes of the prior meeting, are analyzed to determine the agenda items from the one or more prior electronic meetings that were not completed, as well as action items that were created during the one or more prior electronic meetings. For example, meeting intelligence apparatus 102 may examine meeting minutes from the First Code Review Meeting to identify agenda items from that were not completed, as well as action items created during that meeting. Those identified agenda items are added to the Uncompleted Agenda Items From Prior Meeting(s) and Action Items From Prior Meeting(s) categories. In the example depicted in FIG. 2I, the "Driver code for DMA board" and "Software Testing Schedule" agenda items were uncompleted from the First Code Review Meeting, and the "Verify requirements for Satlink—John E." and "Investigate problems with DMA board—Susan R." action items were assigned during or after the First Code Review Meeting.

Agenda items in the Agenda Items Based Upon Meeting Rules Template category may be determined by meeting intelligence apparatus 102 analyzing one or more meeting rules templates specified for the new electronic meeting. In the present example, meeting intelligence apparatus 102 determines that the "Milestones Status Review" agenda item is required by the Engineering—Code Review meeting rules template. Meeting intelligence apparatus 102 therefore uses the "Milestones Status Review" agenda item as a suggested agenda item. According to one embodiment, agenda items required by a meeting rules template are not provided as suggested agenda items that may be selected or not selected by a user. Instead, the agenda items that are required by a meeting rules template are automatically added to the agenda for the current electronic meeting. This ensures that required agenda items specified by a meeting rules template are included on the agenda, and also reduces the number of suggested agenda items that must be reviewed by a user.

Agenda items in the Other category may be determined by meeting intelligence apparatus 102 analyzing a plurality of data items to identify suggested agenda items that are relevant to the new electronic meeting. The plurality of data items analyzed by meeting intelligence apparatus 102 may include any type of data items that may vary depending upon a particular implementation. Relevance may be determined using a wide variety of algorithms and heuristics that may vary depending upon a particular implementation. According to one embodiment, meeting intelligence apparatus 102 is configured to analyze a plurality of data items to identify typical agenda items for the meeting type of the new electronic meeting. In the present example, this includes determining typical agenda items for code review meetings. This may include determining the typical agenda items for code review meetings within the same organization, or searching beyond the current organization to other organizations. The search may be conducted within the same context, industry, etc., or may extend to other contexts, industries, etc. According to one embodiment, meeting intelligence apparatus 102 identifies electronic documents related to one or more topics or subjects of the new electronic meeting and then analyzes the identified electronic documents to determine one or more suggested agenda items for the Other category. In the present example, meeting intelligence apparatus 102 determines that the "Software Testing Schedule" agenda item is typical for code review meetings and is therefore included as a suggested agenda item. Other criteria besides meeting type may be used to identify suggested agenda items. For example, the meeting subject may be used as a criterion to identify suggested agenda items. In the present example, meeting intelligence apparatus may search the plurality of data items to identify data items related to the Pluto Project, and determine suggested agenda items based upon the data items related to the Pluto Project.

According to one embodiment, relevance scores may optionally be determined and displayed for suggested agenda items 256. Relevance scores may be separately determined for each of the suggested agenda items 256 based upon various factors. As depicted in FIG. 2I, relevance scores for suggested agenda items in the Uncompleted Agenda Items From Prior Meeting(s) and Action Items From Prior Meeting(s) categories are relatively high, which is attributable to a high correlation between the suggested agenda items and one or more attributes of the new electronic meeting. For example, the high correlation may be between the suggested agenda items and one or more subjects or meeting types of the electronic meeting. This may result in a user being more likely to select the suggested agenda items for the new electronic meeting. Similarly, relevance scores for suggested agenda items in the Agenda Items Based Upon Meeting Rules Templates are also relatively high since these agenda items are required by the one or more meeting rules templates specified for the new electronic meeting and are therefore determined to be highly correlated to one or more attributes of the new electronic meeting. In contrast, a relevance score of 92% is determined and displayed for the suggested agenda item "Software Testing Schedule." This relevance score is lower than the relevance scores for the Uncompleted Agenda Items From Prior Meeting(s) and Action Items From Prior Meeting(s) categories since the "Software Test Schedule" was not an uncompleted agenda item or an action item from a prior meeting, but is nevertheless determined to have a high relevance score based upon, for example, 1) the meeting type of the new electronic meeting being a code review meeting; and 2) an analysis of agendas for other code review meetings showed that a software test schedule is a common agenda item for code review meeting.

Suggested agenda items may be displayed in a generalized form to identify the topics for discussion, while allowing a user to edit and tailor the suggested agenda items for a particular electronic meeting. Controls, in the form of checkboxes, are provided to allow a user to select and deselect individual agenda items. Selecting a particular agenda item causes the particular agenda item to be included in the agenda for the new electronic meeting. According to one embodiment, agenda creation screen 250 provides the capability for users to edit suggested agenda items 256, for example, by selecting a particular suggested agenda item using a pointing device such as a mouse, and then edit the text of the particular suggested agenda item. This may be useful, for example, to specify changes or clarifications to an agenda item, which is commonly done on the context of electronic meetings. Once the user has completed editing (if applicable) and selecting suggested agenda items 256, a selection of the "Save" control from controls 258 causes the agenda information 252 for the new electronic meeting to be saved. Selecting of the "Back" control from controls 258 causes control to be returned to the electronic meeting management screen 230.

Meeting Participant Selection

Electronic meeting participants may be selected manually by users and according to one embodiment, the selection of meeting participants is assisted by artificial intelligence provided by meeting intelligence apparatus 102. Meeting intelligence apparatus 102 participates in the selection of electronic meeting participants by providing suggested meeting participants for an electronic meeting. In addition, as described in more detail hereinafter, constraints and requirements for meeting participants specified by a meeting rules template designated for an electronic meeting may be enforced by electronic meeting applications.

The electronic meeting application may request that meeting intelligence apparatus 102 provide suggested meeting participants for an electronic meeting. The request for suggested meeting participants may include data that specifies a plurality of attributes of the electronic meeting. For example, a request for suggested agenda items may include any of the data specified by a user in new meeting portion 234 of electronic meeting management screen 230. In response to this request, meeting intelligence apparatus 102 analyzes various types of information and provides suggested meeting participants to the electronic meeting application, which displays the suggested meeting participants for a user, and allows a user to select suggested meeting participants to be included in an electronic meeting.

Returning to FIG. 2E, new meeting portion 234 includes a Meeting Participants control 238 that allows a user to select participants for a new electronic meeting. FIG. 2J depicts a participant selection screen 260 generated in response to a user selecting Meeting Participants control 238 from electronic meeting management screen 230. Participant selection screen 260 includes participant information 262 for the new electronic meeting, which in this example is the second code review meeting for the Pluto project. Participant information 262 includes user-specified meeting participants 264 that may be manually specified by a user, for example, from a list of contacts or one or more address books. An Add Contacts control 266 allows a user to access various sources of contacts, including organization-based contacts, personal contacts, social media contacts, etc., to provide additional contacts.

Participant information 262 also includes suggested meeting participants 268 that are determined, at least in part, with the assistance of meeting intelligence apparatus 102. As depicted in FIG. 2J, several suggested meeting participants 268 are displayed and controls, in the form of checkboxes, are provided to allow a user to individually select suggested meeting participants 268 to be included in the electronic meeting. Controls 270 allow a user to save the selections of meeting participants via a "Save" control from controls 270, or return to electronic meeting management screen 230 via a "Back" control from controls 270. Saving selections of meeting participants via a "Save" control from controls 270 may invoke other functionality, for example, an electronic meeting application to generate and transmit meeting invitations to the meeting participants. According to one embodiment, controls are provided to designate a meeting participant as a decision maker for the electronic meeting. The designation of a meeting participant as a decision maker may be used during the electronic meeting to manage the electronic meeting, as described in more detail hereinafter.

Suggested Meeting Participants

Suggested meeting participants 268 may be determined based upon a wide variety of information and criteria. According to one embodiment, information for other electronic meetings, such as agendas, transcripts, meeting minutes, etc., are analyzed to determine suggested meeting participants 268 for the current electronic meeting. For example, attendees of the prior First Code Review meeting for the Pluto Project may be included in suggested meeting participants 268 for the current electronic meeting, i.e., the Second Code Review Meeting for the Pluto Project, based upon their attendance at the prior electronic meeting. As another example, other members of the same team, project, department, group, technology or business area, etc., may be identified as suggested meeting participants 268. Suggested meeting participants 268 may also be determined based upon position, title, and/or responsibilities with an organization. For example, a team leader or decision maker for the Pluto Project may be included as one of the suggested meeting participants 268. Prior participation of participants in other electronic meetings may also be considered, for example, based upon records of other electronic meetings, such as transcripts, meeting minutes, or other post-meeting processing, as described in more detail hereinafter. For example, positive participation or contributions to other electronic meetings may be a positive factor in including a participant as a suggested meeting participants 268. Participants outside of an organization may also be included in suggested meeting participants 268, for example, as SMEs, as described in more detail hereinafter. Suggested meeting participants 268 may be displayed on participant selection screen 260 in different ways, depending upon a particular implementation. For example, suggested meeting participants 268 may be arranged on participant selection screen 260 based upon relevance scores (described in more detail hereinafter), the level of participation in one or more prior electronic meetings, position or role within an organization or with respect to the electronic meeting or a subject of the electronic meeting.

Subject Matter Experts (SMEs)

Suggested meeting participants 268 may be determined based upon attributes of an electronic meeting. The attributes may be any type of attributes for an electronic meeting and may include, for example, a meeting subject, meeting type, meeting location, agenda items, etc. According to one embodiment, participants determined to be highly correlated to the attributes for an electronic meeting are selected as suggested meeting participants. For example, suppose that the agenda for the Second Code Review Meeting includes an agenda item pertaining to encryption. Suggested meeting participants 268 may include a suggested meeting participant who is a Subject Matter Expert (SME) in encryption, based upon the Second Code Review meeting including an agenda item pertaining to encryption. In the example depicted in FIG. 2J, "John E." is identified as a SME based upon his expertise in the area of encryption and is included in suggested meeting participants 268. The identification of an SME may be based upon an analysis of electronic documents and other information that show that John E is a SME in encryption. Example information that may be considered includes, without limitation, resumes, academic credentials, academic papers, employee records, organization charts, presentation materials, information from other meetings, such as agendas and meeting minutes, project and product documentation, etc. SMEs may be internal or external to an organization, depending upon a particular implementation. For example, some areas of technology, medicine, etc., may be very specific and have relatively few SMEs, and it is possible that some organizations may not have an SME available for a particular area. In these situations, including SMEs that are external to an organization provides additional options for the meeting organizer.

In situations where multiple SMEs are identified for a particular subject matter, all of the identified SMEs may be included as suggested meeting participants and differentiated by their respective relevance scores and additional information, which are described in more detail hereinafter. For example, a SME with prior experience on the project that is the subject of the electronic meeting may be given a higher relevance score than another SME with equivalent background an experience, but without specific prior experience on the project. Similarly, the participation level of each SME in prior electronic meetings may be a factor in determining a relevance score. According to an embodiment, a search tool is provided to allow users to search for meeting participants. The search tool allows a user to specify one or more attributes of desired meeting participants. Meeting intelligence apparatus 102 performs a search and provides search results that satisfy the one or more attributes specified by the user. For example, a user may enter, as attributes, one or more keywords associated with a particular subject or topic, such as "encryption," and participants associated with the subject "encryption" are presented to the user. The user may specify as search criteria other information, such as name, background, etc. The search tool may be implemented via one or more windows, e.g., on participant selection screen 260.

Meeting Rules Templates

Suggested meeting participants 268 may be determined based upon one or more meeting rules templates specified for an electronic meeting. As previously described herein, a meeting rules template specifies a set of requirements and/or constraints that may be applied to any aspect of an electronic meeting, before, during, and after an electronic meeting. The requirements and/or constraints may pertain to meeting participants. For example, a meeting rules template may specify that a particular person, a person with a specified level of authority, a decision maker, or a minimum and/or maximum number of participants must attend an electronic meeting.

According to one embodiment, suggested meeting participants 268 include meeting participants that are determined to satisfy one or more requirements and/or constraints specified by one or more meeting rules templates designated for an electronic meeting. For example, a particular meeting rules template may require that a Chief Executive Officer (CEO) attend a Board of Directors meeting. In this example suggested meeting participants 268 would include the CEO of the organization for the electronic meeting. As another example, a particular meeting rules template may require that corporate legal counsel be included in a litigation settlement meeting. In this example, one of the organization's corporate legal counsel may be included in suggested meeting participants 268. As yet another example, a particular meeting rules template may require that a representative of a Human Resources (HR) department within an organization attend an employee disciplinary meeting.

These are just a few examples of particular participants that are required to attend electronic meetings to satisfy one or more requirements and/or constraints specified by one or more meeting rules templates for an electronic meeting, and embodiments are not limited to these examples. According to one embodiment, particular participants that are required to satisfy requirements or constraints for an electronic meeting may be automatically pre-selected. For example, suppose that a particular member of a team is required to participate in an electronic meeting. The electronic meeting application includes the particular member of the team in suggested meeting participants 268 and pre-selects the particular member. De-selecting the particular member would cause a message to be displayed notifying the user that the particular member is required by the meeting rules template designated for the electronic meeting.

Suggested meeting participants 268 may include multiple suggested meeting participants for a single requirement or constraint specified by a meeting rules template, or for multiple requirements and constraints specified by a meeting rules template. For example, a meeting rules template for a Board of Directors meeting may require that both at least a minimum number of Board members attend the electronic meeting to satisfy a quorum requirement for voting purposes, and also that the Chairman of the Board be one of the meeting attendees. Suggested meeting participants 268 that are required to satisfy one or more requirements and/or constraints specified by one or more meeting rules templates for an electronic meeting may be conspicuously identified to users. For example, such suggested meeting participants 268 may be displayed with an indication that they are required, and/or displayed using different colors, special effects, etc.

According to one embodiment, an electronic meeting application is configured to enforce one or more constraints or requirements specified by a meeting rules templates designated for an electronic meeting. Enforcement of constraints or requirements may occur at different times during meeting participant selection, depending upon a particular implementation. For example, constraints may be enforced after a user has selected meeting participants and selected the Save control 270. This may include, for example, determining whether a total number of meeting participants selected by a user satisfies one or more constraints, such as a maximum number of meeting participants, specified by a meeting rules template designated for the electronic meeting. In response to determining that the total number of meeting participants selected by a user exceeds a maximum number of meeting participants specified by the meeting rules template, the user may be notified, via the graphical user interface, that the requirement has not been satisfied, and provide an opportunity for the user to remedy the error, for example, by de-selecting one or more meeting participants.

Relevance Scores

According to one embodiment, a relevance score is calculated and displayed for each suggested meeting participant 268. The relevance score indicates a relevance of the suggested meeting participant to the electronic meeting, and the relevance score may be helpful to a user in deciding whether to select a particular suggested meeting participant for inclusion in an electronic meeting. Relevance scores may be considered in the presentation of suggested meeting participants 268 to a user. For example, suggested meeting participants 268 may be ordered on participant selection screen 260 based upon relevance scores, e.g., from highest (most relevant) to lowest (least relevant).

In the example depicted in FIG. 2J, the relevance scores are depicted in parentheses, i.e., "(98%)" on a scale of 0-100%, where 0% represents a lowest level of relevance, or no relevance, between a particular suggested participant and an electronic meeting, and 100% represents a high level of relevance, or complete relevance between a particular suggested participant and an electronic meeting. The 0-100% scale depicted in FIG. 2J is provided as an example implementation. Embodiments are not limited to this example and any scoring methodology may be used.

Relevance scores may be calculated based upon a wide variety of factors and information, such as one or more of, a meeting rules template specified for an electronic meeting, one or more attributes of the electronic meeting, such as meeting type, meeting subject, meeting location, and agenda items, as well as any other information that might indicate a relevance between a suggested participant and an electronic meeting, such as participation and contributions made during prior electronic meetings. For example, participation in a prior electronic meeting of the same meeting type and for the same meeting subject would increase the relevance score for a particular suggested meeting participant 268. A determination that the particular suggested meeting participant 268 participated in the prior electronic meeting would further increase the relevance score for the particular suggested meeting participant 268. This may be determined, for example, by an analysis of records for other electronic meetings, such as meeting minutes, transcripts, etc. Information external to an organization may be considered in determining relevance scores, for example, via the Internet. Examples of such information include, without limitation, educational background, professional credentials, work experience, published books, papers, studies and articles, other career achievements, documents related to conferences, documents related to standards organizations and public organizations, government documents, school curriculums, social media data, such as posts, etc. According to one embodiment, the availability of a suggested participant may be determined, e.g., via a participant's calendar, and indicated via participant selection screen 260. For example, a visual indication may be provided on participant selection screen 260 to indicate that a particular participant is not available at the scheduled date and time for an electronic meeting. This allows the meeting organizer to consider re-scheduling an electronic meeting for a meeting participant whose participation is considered to be important.

Additional Information

According to one embodiment, additional information is determined and displayed with suggested meeting participants 268 to aid users in deciding whether to select a particular suggested meeting participant for inclusion in an electronic meeting. The additional information may include any information about the suggested participant, including information used in calculating a relevance score. Examples of additional information include, without limitation, information about a suggested meeting participant, such as information about their educational background, professional credentials, work experience, published books, papers, studies, articles, achievements, contributions, roles and positions within organizations, including participation in projects and meetings, key quotes from other electronic meetings, etc.

For example, as depicted in FIG. 2J, the additional information for suggested meeting participant "Taryn K." specifies that this participant attended a prior electronic meeting that is relevant to the current electronic meeting, i.e., the First Code Review meeting for the Pluto Project. The additional information for suggested participant "Taryn K." also specifies that this participant was a designated decision maker in the First Code Review meeting for the Pluto Project. Both of these items of additional information may be helpful to a user in deciding whether to select suggested meeting participant "Taryn K." for inclusion in the current electronic meeting, i.e., the Second Code Review Meeting for the Pluto Project. These items of additional information may also have contributed to suggested meeting participant "Taryn K." having a very relevance score of 98%, i.e., based upon the facts that "Taryn K." both attended the First Code Review meeting for the Pluto Project and was the designated decision maker in that meeting.

In some situations, a large amount of additional information may be available for suggested meeting participants. According to one embodiment, controls are provided on participant selection screen 260 to access further additional information. In FIG. 2J, an example control is "<more>" which, when selected, provides access to further additional information for suggested meeting participant "John E." The additional information may be displayed, for example, in a pop-up box or overlaid window and may include, for example, any of the information described above, such as key quotes from prior meetings, etc.

V. Real-Time Processing

According to one embodiment, artificial intelligence is used to manage various aspects of electronic meetings. For example, meeting intelligence apparatus 102 may intervene during electronic meetings to provide any of a variety of intervention data, such as visual indications, messages in message window 224, participant information, recommendation information, and/or any other data that meeting intelligence apparatus 102 transmits during an electronic meeting.

Figure 3:
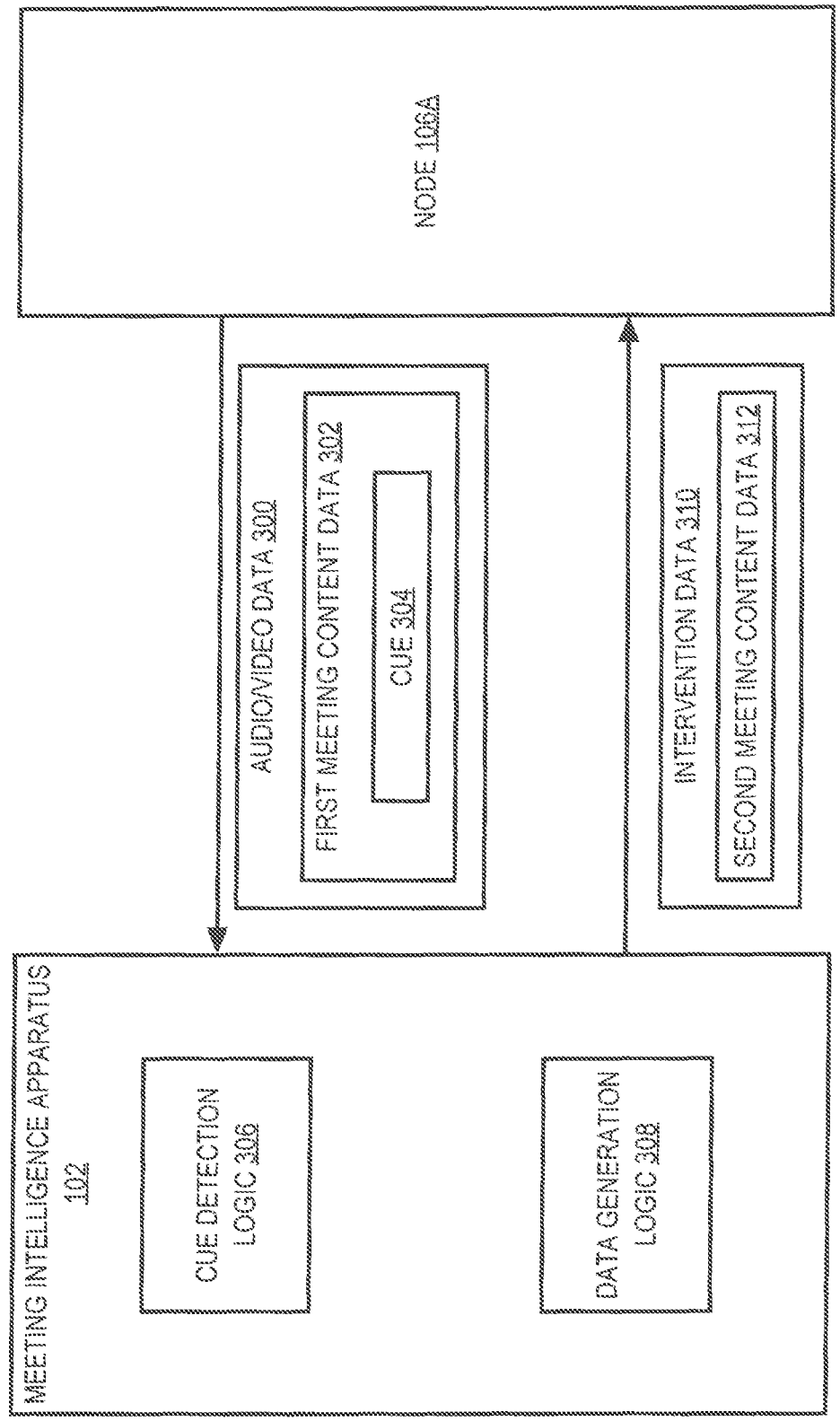
FIG. 3 is a block diagram that depicts an arrangement for generating intervention data.

FIG. 3 is a block diagram that depicts an arrangement for generating intervention data. Referring to FIG. 3, meeting intelligence apparatus 102 receives audio/video data 300 from node 104A. Audio/video data 300 may be one or more data packets, a data stream, and/or any other form of data that includes audio and/or video information related to an electronic meeting. In the example depicted in FIG. 3, audio/video data 300 includes first meeting content data 302 which, in turn, includes cue 304. Cue 304 may take many forms that may vary depending upon a particular implementation. Examples of cue 304 include, without limitation, one or more keywords, tones, sentiments, facial recognitions, etc., that can be discerned from audio/video data 300. Other examples of cue 304 include whiteboard sketches and/or gestures that may not be part of audio/video data 300.

Meeting intelligence apparatus 102 includes cue detection logic 306, which analyzes audio/video data 300 to determine whether audio/video data 300 includes cue 304. Cue detection logic 306 may analyze audio/video data 300 on a continuous basis, or on a periodic basis, depending upon a particular implementation. Meeting intelligence apparatus 102 also includes data generation logic 308, which generates intervention data 310 if audio/video data 300 includes cue 304. Meeting intelligence apparatus 102 transmits intervention data 310 to node 104A during and/or after an electronic meeting. Intervention data 310 includes second meeting content data 312 that may supplement or replace first meeting content data 302, as described in more detail hereinafter. Intervention data may also Meeting intelligence apparatus 102 may can intervene in an electronic meeting in a wide variety of ways. Non-limiting examples include intervening to manage meeting flow, to provide information retrieval services, and/or to supplement meeting content.

Meeting Management

According to one embodiment, artificial intelligence is used to assist with managing various aspects of electronic meetings. This may include a wide variety of functionality that may vary depending upon a particular implementation. Example functionality includes, without limitation, agenda management, points of agreement, action items, new meeting requests, and sentiment analysis. The use of speech and/or text recognition provides a more favorable user experience by allowing users to manage various aspects of electronic meetings using voice commands and/or text commands.

i. Agenda Management

According to one embodiment, artificial intelligence is used to provide agenda management functionality during electronic meetings. Agenda management functionality may include a wide variety of functionality that may vary depending upon a particular implementation. Example functionality includes, without limitation, enforcing time constraints for agenda items, changing designated amounts of time for agenda items, changing, deleting and adding agenda items, including providing missing or supplemental information for agenda items, and agenda navigation.

FIG. 4A is a block diagram that depicts an arrangement in which meeting intelligence apparatus 102 includes speech or text recognition logic 400 that processes first meeting content data 302 to determine one or more corresponding agenda topics. In the example depicted in FIG. 4A, first meeting content data 302 includes the speech or text statement "Gross sales are expected to be $10.8 million next quarter." A participant associated with node 104A may have caused first meeting content data 302 to be generated by speaking, writing, typing, or displaying the statement. Speech or text recognition logic 400 may process first meeting content data 302 by parsing to detect keywords that are mapped to a meeting agenda. In the present example, speech or text recognition logic 400 detects the keywords "next quarter." These keywords are a cue 304 for meeting intelligence apparatus 102 to generate intervention data 310 that indicates a corresponding agenda topic. The intervention data 310 may be used by the electronic meeting application to determine a correspondence between a current point in an electronic meeting and a meeting agenda. This correspondence is used to provide agenda management functionality, including tracking the current agenda topic. In the example of FIG. 4A, second meeting content data 312 specifies, among other information, the position of visual indicator 220, or a current agenda item, using JavaScript Object Notation (JSON). Thus, one or more electronic meeting applications that process the JSON will display visual indicator 220 at the specified position in the meeting agenda during an electronic meeting.

A determined correspondence between a current point in an electronic meeting and a meeting agenda may be used to monitor the progress of an electronic meeting and enforce time constraints with respect to individual agenda items, groups of agenda items, and/or an entire electronic meeting. This may include tracking the amount of time spent on agenda items and providing one or more indications to meeting participants. For example, in addition to the timer provided in agenda window 218 (FIG. 2D), a visual and/or audible indication may be provided when an amount of time designated for an agenda item, group of agenda items, or an entire electronic meeting, is nearing expiration or has expired. If the timer value exceeds the specified time limit, the electronic meeting application may cause a message to be displayed in message window 224. The message may also be spoken by the electronic meeting application. The message may indicate, for example, the that time limit for the current agenda item has expired and the electronic meeting will be progressing to the next agenda item. Additionally or alternatively, the electronic meeting application may move a visual indication to a different agenda topic. Speech and text recognition may also be used to ensure that all agenda items and action items are addressed during an electronic meeting, which may include discussion, deferral, etc.

As previously described herein, agenda items may be designated as requiring a decision, for example via one or more meeting rules templates, or via user-designation. According to one embodiment, an electronic meeting application ensures that a decision is made for all agenda items requiring a decision during an electronic meeting. If a user attempts to navigate to another agenda item or action item before a decision has been made on a current agenda item, the electronic meeting application may display a message in message window 224, or speak the message, indicating that the current agenda item or action item requires a decision. This may include preventing navigation to other agenda items or action items until the current agenda item is addressed. A meeting owner may be permitted to override this functionality and move to another agenda item or action item.

Speech and text recognition may be used to recognize agenda-related commands, such commands to add time to agenda items and agenda navigation commands. For example, the command "add time", followed by a specified amount of time, adds a specified amount of time to the current agenda item. The command "add time to" followed by an agenda item and a specified amount of time, adds the specified amount of time to the specified agenda item, which may be a different agenda item than the current agenda item. Another example is the command "completed," "done," or "defer," followed by "next agenda item," to change the status of the current agenda item and move to the next agenda item. For example, in response to "defer, jump to X," the current agenda item is deferred, also referred to as "parked," and the new current agenda item becomes X. Various other agenda navigation commands may be used, depending upon a particular implementation.

Another example of agenda-related commands are commands to delete, change or add (new) agenda items. Agenda items may be identified by name or other means, such as code, reference number, symbol, etc. For example, the command "delete" followed by a particular agenda item causes the particular agenda item to be deleted from the agenda. As another example, the command "change agenda item X to X'" causes the agenda item X to be changed to X. As yet another example, the command "add agenda item Y" or "new agenda item Y" causes a new agenda item Y to be added to the agenda. The user may specify, for example, by speaking, writing, etc., attributes of a new agenda item, such as name, date, responsible person, etc. Agenda-related commands may also include commands to change the order of agenda items in an agenda. For example, the command "Agenda item X, move to top" causes agenda item X to be moved to the top of the agenda. Similarly, the command "Agenda item X, move to bottom" causes agenda item X to be moved to the bottom of the agenda.

According to one embodiment, meeting intelligence apparatus 102 provides the capability to detect that information is missing for a new agenda item and provide a notification to an electronic meeting application. According to this embodiment, meeting intelligence apparatus 102 detects that not all of the information required for a new agenda item has been specified. This may be performed, for example, by meeting intelligence apparatus 102 analyzing first meeting content data 302 to detect a command to create a new agenda item, along with some attribute information for the new agenda item. Referring to the prior example, meeting intelligence apparatus 102 may detect, in first meeting content data 302, the command, "new agenda item Y," along with attribute data for new agenda item Y, such as a description of the new agenda item. This command may have been spoken, written or selected by a meeting participant, as indicated by the first meeting content data 302.

Meeting intelligence apparatus 102 recognizes, using artificial intelligence such as artificial intelligence service 110, that some information for the new agenda item is missing, such as a responsible person. This may be determined, for example, based upon a set of requirements that specifies information required for agenda items. For example, a requirement may exist that all new agenda items, or agenda items of this type, have an assigned responsible person. Alternatively, this may be determined based upon information specified for agenda items for the same electronic meeting or other electronic meetings. For example, Meeting intelligence apparatus 102 may examine records for other electronic meetings to identify information provided with agenda items for those electronic meetings and determine that most or all of those agenda items included a responsible person.

Once a determination has been made that a new agenda item is missing particular information, Meeting intelligence apparatus 102 may automatically determine the missing information, for example, by examining information for other agenda items for the current electronic meeting, or for other electronic meetings. This may include identifying agenda items that are similar to the new agenda item and then examining the information specified for those similar agenda items. The missing information may then be provided to the electronic meeting application for processing. The electronic meeting application may notify the meeting participants that information is missing for the new agenda item, for example, by displaying a message in message window 224. The electronic meeting application may automatically use the information provided by Meeting intelligence apparatus 102 to address the missing information and notify the meeting participants via message window 224. Alternatively, the electronic meeting application may query a meeting participant to provide the missing information. The information provided by Meeting intelligence apparatus 102 may be provided meeting participants as suggested information for completing the missing information.

Consider the following example. Suppose that a new agenda item is created without a responsible person. Meeting intelligence apparatus 102 determines that a responsible person is missing for the new agenda item and analyzes agendas for other electronic meetings to identify agenda items that are similar to the new agenda item. Various algorithms, such as distance algorithms, may be used to identify other similar agenda items, e.g., other agenda items that are within a specified distance of the new agenda item. The responsible person designated for the other agenda item that is most similar to the new agenda item is identified and provided to the electronic meeting application. In the present example, "Alice C." is the responsible person for the other agenda item that is most similar to the new agenda item.

The electronic meeting application may automatically designate the responsible person determined by meeting intelligence apparatus 102 for the new agenda item and notify the meeting participants via message window 224. An example message is "New agenda item X is missing a responsible person, Alice C. has been automatically designated." The electronic meeting application may provide controls to allow a meeting participant to confirm or change the responsible person. This may also be done via voice commands. Alternatively, the information provided by meeting intelligence apparatus 102 may be displayed as a suggestion, along with controls to accept or change the suggestion. For example, the electronic meeting application may display a message via message window 224 such as, "New agenda item X is missing a responsible person. Suggestion: Alice C." In situations where the information provided by meeting intelligence apparatus 102 includes multiple suggested responsible persons, then the multiple suggested responsible persons may all be listed, and controls provided for a user to select one of the responsible persons. Alternatively, a user may simply speak the name of the responsible person to be designated for the new agenda item.

According to one embodiment, artificial intelligence may provide supplemental information for new agenda items. For example, in the prior example in which the new agenda item is missing a responsible person and Alice C. is provided as a suggestion, the suggestion may include additional information about Alice C. that might be helpful to a meeting participant deciding whether to accept or change the suggestion. In this example, this may include information about Alice C, such as "New agenda item X is missing a responsible person. Suggestion: Alice C. (responsible person on agenda items X1 and X2)." Supplemental information may pertain to other aspects of a new agenda item. For example, additional information about the subject of a new agenda item may be displayed.

As demonstrated by the foregoing examples and embodiments, artificial intelligence may be used to aid in various aspects of agenda management and provide a more useful experience. Information provided by meeting intelligence apparatus 102, such as recognized commands, missing and supplemental agenda information, etc., may be automatically provided by meeting intelligence apparatus 102 to an electronic meeting application. Alternatively, this information may be provided in response to requests from electronic meeting applications.

Changes to agenda items and new agenda items may be recorded in meeting records, such as meeting minutes or transcripts, and used during the creation of other meeting agendas, as previously described herein. The approach described above for new agenda items may be used for existing agenda items. For example, suppose that an existing agenda item is missing information. A user may be queried to supply the missing information for the existing agenda item. Alternatively, the missing information may be provided or suggested by meeting intelligence apparatus 102 as previously described herein. Meeting intelligence apparatus 102 may transmit, to an electronic meeting application, data indicating that required information is missing for a new agenda item. In response to receiving this data, the electronic meeting application notifies meeting participants, for example, via a message in message window 224, an audible indication, or both, that additional information is required for the new agenda item.

According to one embodiment, the aforementioned approaches may be used to create new agenda items for electronic meetings that have no agenda. For example, meeting intelligence apparatus 102 may recognize a "create agenda" command and provide a notification to an electronic meeting application to create an agenda for the current electronic meeting. Agenda items may then be added to the agenda as previously described herein.

ii. Points of Agreement, Action Items and New Meeting Requests

Action items are an important aspect of many electronic meetings. According to one embodiment, an electronic meeting application, in conjunction with meeting intelligence apparatus 102, is configured to recognize commands pertaining to action items for an electronic meeting. For example, meeting intelligence apparatus 102 may recognize a spoken or written command "add action item X," and in response to this command, add action item X to a meeting record for the current electronic meeting. Explicit commands to establish action items may be pre-specified and meeting intelligence apparatus 102 may be configured to detect the pre-specified commands in first meeting content data 302.

According to an embodiment, meeting intelligence apparatus 102 is configured to recognize implicit requests for action items. Implicit requests for action items may be recognized based upon an analysis of first meeting content data 302. The analysis may identify words that although do not constitute an explicit request for an action item, indicate a desire by one or more meeting participants to create an action item. For example, a meeting participant may state, during a current electronic meeting, "Let's ask the IT department to follow-up on RF link reliability." While this phrase may not include pre-specified keywords for creating an action item, based upon the use of artificial intelligence, meeting intelligence apparatus 102 determines that there exists an intent by one or more meeting participants is to create an action item. In response to identifying an explicit or implicit request for an action item, the electronic meeting application and/or meeting intelligence apparatus 102 may automatically create a new action item for the electronic meeting, which may include adding the action item to an electronic record for the electronic meeting. The electronic meeting application may display, for example, on electronic meeting screen 212, a visual confirmation for the meeting participants indicating that the action item was added for the current electronic meeting.

For explicit and implicit requests, the electronic meeting application may display detected words or phrases and provide controls for a meeting participant to confirm the request for an action item. This may be helpful to avoid creating action items based upon implicit requests where the meeting participants did not actually intend to create an action item. Confirmation may be provided verbally or detected via speech or text recognition logic 400. FIG. 2F depicts a message window 224 displayed on electronic meeting screen 212 that includes a proposed action item determined by meeting intelligence apparatus 102 analyzing first meeting content data 302, along with controls for confirming or canceling the proposed action item. In this example, an explicit command was not used to create a new action item. Instead, meeting intelligence apparatus 102 identified an implicit request to create a new action item from the statement made by a meeting participant, "Let's ask the IT department to follow-up on RF link reliability."

There are times during some electronic meetings where certain decisions, conclusions, stipulations, or points of agreement are established by the meeting participants and it is desirable to document this information, in association with the current electronic meeting. According to one embodiment, an electronic meeting application, in conjunction with meeting intelligence apparatus 102, is configured to recognize decisions, conclusions, stipulations, or points of agreement based upon explicit commands, and in response, add the decisions, conclusions, stipulations, or points of agreement to meeting notes, minutes and/or transcripts for the current electronic meeting. For example, meeting intelligence apparatus 102 may recognize a spoken or written command "add conclusion" or "point of agreement," and add a following conclusion statement or point of agreement to a meeting record for the current electronic meeting. In addition, the electronic meeting application may display, for example on electronic meeting screen 212, a visual confirmation for the meeting participants indicating that the decision, conclusion, stipulation, or point of agreement was added for the current electronic meeting. Explicit commands to establish decisions, conclusions, stipulations, or points of agreement may be pre-specified and meeting intelligence apparatus 102 may be configured to detect the pre-specified commands in first meeting content data 302.

According to an embodiment, meeting intelligence apparatus 102 is configured to recognize implicit decisions, conclusions, stipulations, or points of agreement and add corresponding information to a meeting record for the electronic meeting. Implicit decisions, conclusions, stipulations, or points of agreement may be recognized in first meeting content data 302 based upon words that, based upon an artificial intelligence analysis, indicate a desire by one or more meeting participants to establish a decision, conclusion, stipulation, or point of agreement, even though a pre-specified command was used by a meeting participant. For example, a meeting participant may state, "It appears that we have reached a consensus on this point." Based upon the use of artificial intelligence, meeting intelligence apparatus 102 determines that the intent of one or more meeting participants was to establish a conclusion or point of agreement, without using a pre-specified command for doing so. As previously described herein with respect to action items, message window 224 may be used to display a possible decision, conclusion, stipulation, or point of agreement, along with controls for confirming or canceling. Message window 224 may also be used to display detected explicit or implicit requests to create a new meeting, along with controls for confirming or canceling.

i. Sentiment Analysis

As previously described herein, new meetings may be created based upon the results of sentiment analysis that indicates that a new meeting may be appropriate or helpful in a particular situation, for example if significant disagreement and/or hostility exists between participants in a meeting. The results of sentiment analysis may also be used to initiate other actions to address the detected sentiment, e.g., to diffuse detected hostility between meeting participants. For example, a proposal to create an action item may be generated and displayed in message window 224, e.g., "Create action item for current topic?" As another example, a proposal to create a follow-up meeting may be generated and displayed in message window 224, e.g., "Create follow-up meeting for current topic?" As yet another example, a proposal to defer the current agenda item and move to the next agenda item may be displayed in message window 224, such as "Defer current agenda item and move to next agenda item?" This allows a meeting participant, such as the meeting owner to diffuse the detected hostility by stopping discussion on the current agenda item and moving to another agenda item. Furthermore, the suggestion of the alternative actions by meeting intelligence apparatus 102 may depersonalize the intervention because it is done by meeting intelligence apparatus 102 in combination with the electronic meeting application, rather than a meeting participant. This may provide a more favorable user experience.

FIG. 4B is a block diagram that depicts an arrangement for performing sentiment analysis with respect to an ongoing discussion 402. Referring to FIG. 4B, meeting intelligence apparatus 102 includes sentiment analysis logic 404 that performs sentiment analysis on first meeting content data 302 related to ongoing discussion 402. For example, meeting intelligence apparatus 102 may detect an angry tone or sentiment that is a cue 304 for meeting intelligence apparatus 102 to generate intervention data 310 indicating that another electronic meeting has been automatically scheduled for continuing ongoing discussion 402. In the example of FIG. 4B, second meeting content data 312 includes JSON that can be used by an electronic meeting application to make decisions about a current electronic meeting.

Information Retrieval

According to one embodiment, an electronic meeting application, in conjunction with meeting intelligence apparatus 102, provides information retrieval services for electronic meetings. This capability allows a user to formulate and submit natural language queries for processing, and view the results of processing the natural language queries during an electronic meeting. This provides a more favorable user experience than requiring users to be able to formulate queries in more formal formats or a computer language, such as Structured Query Language (SQL).

FIG. 4C is a block diagram that depicts an arrangement for retrieving requested information using natural language queries. A user specifies a natural language query to an electronic meeting application executing, for example, on node 106A. For example, FIG. 2K depicts a natural language query via query window 272 of electronic meeting screen 212 that allows a user to enter a natural language query. The electronic meeting application generates and transmits a natural language request 406 to meeting intelligence apparatus 102. Natural language request 406 may be included in first meeting content data 302, or may be transmitted separately. In the example depicted in FIG. 4C, natural language request 406 includes the question "Where did we leave off at the last meeting?" Note that natural language request 406 may include a question, a statement, a command, or any other type of request for information.

Speech or text recognition logic 400 parses and interprets first meeting content data 302 to detect natural language request 406, which is a cue 304 for meeting intelligence apparatus 102 to generate intervention data 310 to be sent to at least node 104A during an electronic meeting. For example, speech or text recognition logic 400, alone or in combination with sentiment analysis logic 404, may detect inflected speech and/or keywords indicative of an information request, such as "who", "what", "when", "where", "why", or "how". Meeting intelligence apparatus 102 can interpret these and other keywords as commands to perform requested functions, such as data retrieval.

In the example of FIG. 4C, meeting intelligence apparatus 102 may interpret the question as a command to search and analyze prior meeting data to determine an answer to the question. Determining the answer to the question may involve analyzing meeting content data related to an ongoing meeting and/or a prior meeting, thereby increasing the relevance of the answer to the question. For example, the question "Where did we leave off at the last meeting?" may be analyzed using contextual data (e.g., metadata) from the current meeting, such as the identities of participants 108A-N, the topic of the current discussion, etc. Meeting intelligence apparatus 102 may search the meeting data repository for information that most closely matches the contextual data from the current meeting. For example, meeting intelligence apparatus 102 may search the meeting data repository for any prior meetings that included some or all of the participants 108A-N of the current meeting and rank the results. Meeting intelligence apparatus 102 may then determine that the "last meeting" refers to the top result and may search for the last agenda topic in the prior meeting that corresponds to the top result.

Intervention data 310 that is generated in response to natural language request 406 includes stored information 410 that meeting intelligence apparatus 102 retrieves in response to natural language request 406. Meeting intelligence apparatus 102 includes data retrieval logic 408, which performs a search for stored information 410 that is responsive to natural language request 406. For example, data retrieval logic 408 may search a meeting data repository and/or external data sources, such as websites on the Internet. In the example of FIG. 4C, meeting intelligence apparatus 102 generates second meeting content data 312 that includes stored information 410 retrieved from a meeting data repository. The stored information 410 includes the answer to the question about a different meeting.

In an embodiment, meeting intelligence apparatus 102 processes natural language request 406 and researches a particular topic or otherwise search for information that is unrelated to a particular meeting. For example, natural language request 406 may be the statement "We need to figure out how to get source code from the app." In response, meeting intelligence apparatus 102 may retrieve information from various websites that address natural language request 406. As shall be described in greater detail hereafter, this can be a particularly useful feature for participants 108A-N who wish to collaborate, during an electronic meeting, to create a presentation, a report, or any other document. Results of processing natural language queries are displayed by the electronic meeting application, for example, via message window 224.

Meeting Content Supplementation

According to one embodiment, an electronic meeting application, in conjunction with meeting intelligence apparatus 102, provides content supplementation services for electronic meetings. These services provide supplemental information for electronic meetings, including additional information about agenda items, electronic meeting content, and meeting participants, and translation information.

According to one embodiment, meeting intelligence apparatus 102 analyzes agenda items and electronic meeting content and provides supplemental information that is displayed by an electronic meeting application, for example, via message window 224. The supplemental information may pertain to one or more agenda items displayed in agenda window 218 or content 214 displayed in agenda window 213. The supplemental information may be obtained by identifying one or subjects or topics in agenda items or content, and then performing searches on those subjects or topics. The searches may be performed as a background task to a current electronic meeting and may be automatically initiated and then re-run when changes to agenda items or content occur. Results of the searches may be displayed in message window 224 and/or one or more other search results windows. This may include specialized search results windows, for example, a search results window for search results pertaining to agenda items and a search results widow for search results pertaining to electronic meeting content, such as an ongoing meeting or conversation. The information in the search results windows may be continuously updated to reflect changes in the agenda and the content of an electronic meeting. For example, as an electronic meeting is conducted, first meeting content data 302 is provided to and processed by meeting intelligence apparatus 102 to identify topics or subjects to be searched, the identified topics or subjects are searched and search results provided to and displayed by an electronic meeting application. As the electronic meeting switches from topic to topic, the search results displayed by the electronic meeting application are dynamically updated. This allows meeting participants to have access to supplemental information for an electronic meeting. According to one embodiment, data items in search results are selectable, via a pointing device or voice commands, and when a data item is selected, a subsequent search is conducted for the selected data item and the results displayed. This allows meeting participants to seamlessly acquire additional information about topics or subjects discussed during an electronic meeting.

According to an embodiment, the supplemental information includes information about one or more meeting participants. For example, meeting intelligence apparatus 102 may analyze first meeting content data 302 to identify one or more meeting participants, and then transmit participant identification data one or more electronic meeting applications.

FIG. 4D is a block diagram that depicts an arrangement for supplementing meeting content with participant identification data. Referring to FIG. 4D, meeting intelligence apparatus 102 includes voice or face recognition logic 412, which performs voice or face recognition on first meeting content data 302 to detect a voice or a face. The voice or face is a cue 304 for meeting intelligence apparatus 102 to generate intervention data 310 to be sent to at least node 104A during an electronic meeting. In response to detecting the cue 304, meeting intelligence apparatus 102 determines one or more participants 108A-N and generates participant identification data that identifies the one or more participants 108A-N. Meeting intelligence apparatus 102 generates and transmits second meeting content data 312 that includes the participant identification data. When processed at one or more nodes 104A-N, second meeting content data 312 causes the participant identification data to be presented at the one or more nodes 104A-N.

According to one embodiment, the supplemental information includes translation information. Meeting intelligence apparatus 102 may cause a language translation or format conversion of first meeting content data 302 to be presented at one or more nodes 104A-N. In an embodiment, meeting intelligence apparatus 102 performs speech or text recognition on first meeting content data 302 to detect a particular language, which may be a cue 304 for meeting intelligence apparatus 102 to generate second meeting content data 312 that includes a translation of first meeting content data 302 into a different language. For example, meeting intelligence apparatus 102 may translate English content into Japanese content. Second meeting content data 312 may replace or supplement first meeting content data 302. For example, second meeting content data 312 may cause Japanese dubbing of first meeting content data 302, may cause Japanese subtitles to be added to first meeting content data 302, or for Japanese content to be provided separate from the original English content. Embodiments are described herein in the context of translation from English to Japanese for explanation purposes only, and translations may be provided from any source language into any target language. According to one embodiment, different translations may be provided for different nodes 104A-N participating in an electronic meeting. For example, suppose that an electronic meeting is initiated at a first node in a first language, and that second and third nodes are participating in the electronic meeting. At the second node, meeting content may be translated from the first language to a second language, and at the third node, meeting content may be translated from the first language and/or the second language to a third language. The translations may be provided in real-time, for example, via message window 224 and/or via one or more other windows. Users at each participating node may specify a language for their node, for example via meeting controls 222, which may be used as a default language for that node. Users may also specify a preferred language in their user profile, or in association with their user credentials, to allow an electronic meeting application to automatically default to the preferred language for a meeting participant. This translation approach allows multiple participants to participate in an electronic meeting with other participants in multiple other languages, greatly enhancing the user experience and the effectiveness of electronic meetings.

In an embodiment, meeting intelligence apparatus 102 can detect input from an input/output mechanism, and the input may be a cue 304 for meeting intelligence apparatus 102 to convert the input into a different format. For example, the input/output mechanism may be an electronic whiteboard that receives as input first meeting content data 302 in the form of handwritten notes or hand-drawn illustrations. Based on optical character recognition (OCR), vector graphics, and/or any other data conversion tool, meeting intelligence apparatus 102 may convert first meeting content data 302 into second meeting content data 312 in the form of machine-lettering or a machine-drawn image. When processed at one or more nodes 104A-N, second meeting content data 312 may cause the machine-lettering or the machine-drawn image to be provided as output on the electronic whiteboard.

Cue detection logic 306, data generation logic 308, speech or text recognition logic 400, sentiment analysis logic 404, data retrieval logic 408, and voice or face recognition logic 412 may be implemented on meeting intelligence apparatus 102 as part of artificial intelligence service 110, or separate from meeting intelligence service 110. In addition, these elements may be implemented by computer hardware, computer software, or any combination of computer hardware and computer software.

Meeting Content Metadata Generation

FIGS. 4A-D each depict second meeting content data 312 that includes a variety of meeting content metadata. Meeting intelligence apparatus 102 generates the meeting content metadata based on internal and/or external information. Internal information includes information readily accessible to meeting intelligence apparatus 102 even in the absence of a network connection. For example, if meeting intelligence apparatus 102 is a computer, the system date and time are internal information. In contrast, external information includes information accessible to meeting intelligence apparatus 102 via a network connection. For example, information retrieved from external data sources are external information.

FIGS. 4A-D each depict sending meeting content metadata to one or more nodes 104A-N during an electronic meeting. However, some meeting content metadata may remain un-transmitted throughout the duration of the electronic meeting. For example, some meeting content metadata may remain stored in meeting intelligence apparatus 102 for an internal use, such as generating a report. As shall be described in greater detail in FIG. 6C, a notable example of such meeting content metadata is a label that identifies a key meeting point, such as an action item, a task, a deadline, etc.

VI. Post-Meeting Processing

According to one embodiment, an electronic meeting process, in conjunction with meeting intelligence apparatus 102, may provide a wide variety of post-meeting processing services, based upon analyzing meeting content. As used herein, the term "meeting content" refers to any information pertaining to one or more electronic meetings. Examples of meeting content include, without limitation, meeting scheduling and agenda information, meeting participant information, content shared during an electronic meeting, and all actions and functions performed during one or more electronic meetings.

Meeting content may be analyzed at any time relative to an electronic meeting, i.e., before, during or after an electronic meeting, as soon as at least some meeting content is available. Certain types of processing, such as participant analysis described in more detail hereinafter, may benefit from being able to process meeting data from one or more completed electronic meetings. For example, after an electronic meeting ends, meeting intelligence apparatus 102 may analyze stored meeting content data and generate reports based on analyzed meeting content data. Alternatively, meeting intelligence apparatus 102 may analyze meeting content data during an electronic meeting and may generate, after the electronic meeting ends, a report based on analyzed meeting content data. Reports may include any type and amount of data, including any number of documents, a meeting agenda, a meeting summary, a meeting transcript, a meeting participant analysis, a slideshow presentation, etc. As previously described herein, post meeting processing results may be used for other electronic meetings. For example, post meeting processing results may be used to determine suggested meeting participants for other electronic meetings. This may be repeated to improve the quality of suggested meeting participants over time.

Figure 5:
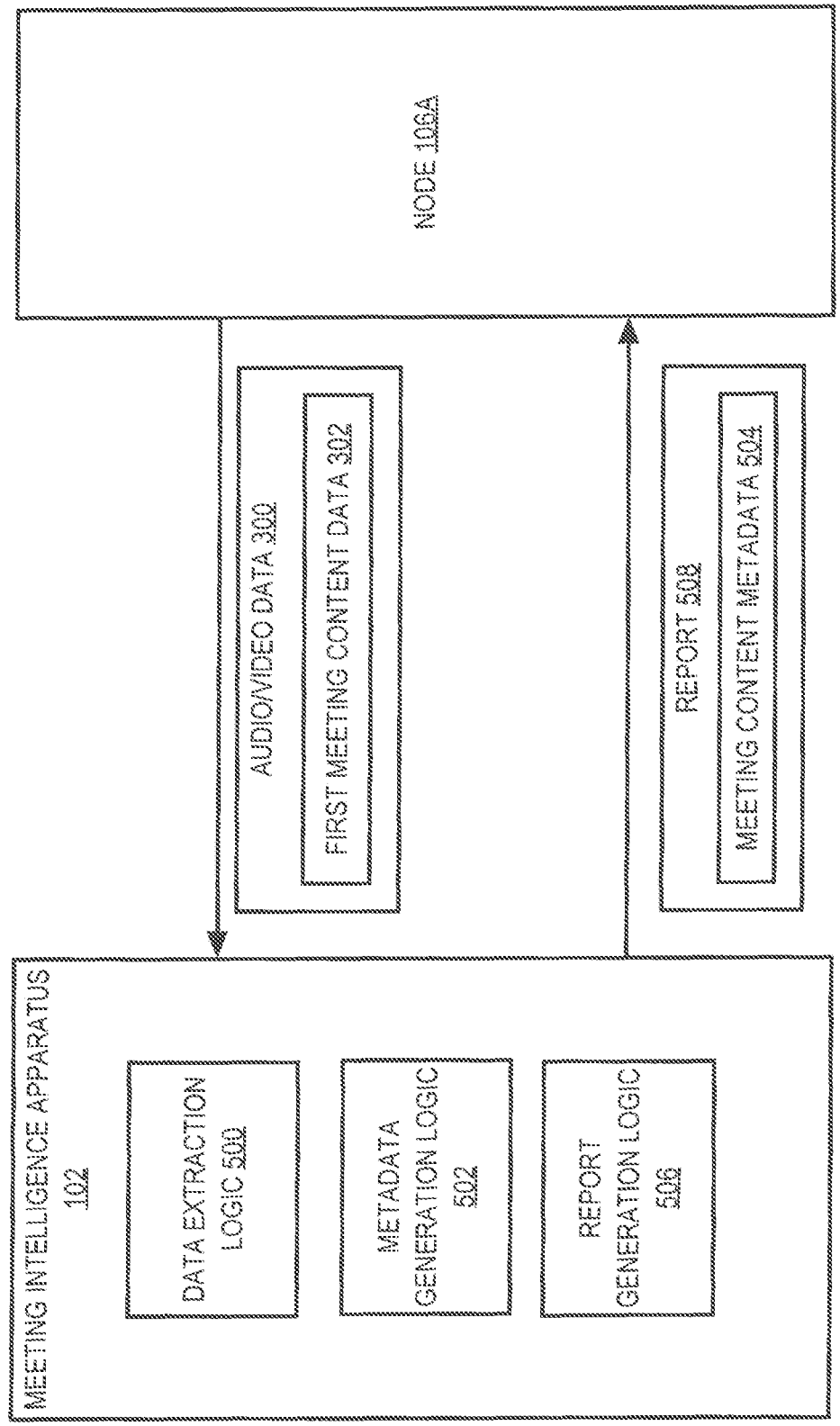
FIG. 5 is a block diagram that depicts an arrangement for generating a report.

FIG. 5 is a block diagram that depicts an arrangement for processing meeting content and generating a report. Referring to FIG. 5, meeting intelligence apparatus 102 receives, from node 104A, audio/video data 300 that includes first meeting content data 302. Meeting intelligence apparatus 102 includes data extraction logic 500, metadata generation logic 502, and report generation logic 506. Data extraction logic 500 causes first meeting content data 302 to be extracted from audio/video data 300. Meeting intelligence apparatus 102 analyzes first meeting content data 302 and uses metadata generation logic 502 to generate meeting content metadata 504. Report generation logic 506 causes meeting content metadata 504 to be included in report 508. This processing may occur on a continuous basis, or in response to a request to perform the processing.

Meeting intelligence apparatus 102 may perform various functions based upon report 508. For example, meeting intelligence apparatus 102 may store report 508 in a meeting data repository or provide report 508 to one or more nodes 104A-N associated with participants 108A-N of an electronic meeting. Thus, meeting intelligence apparatus 102 may generate report 508 in an offline mode and/or an online mode. Electronic meeting applications may also process and store report 508, as well as other data generated in response to an analysis of meeting content.

Meeting Content Analysis

Figure 6A:
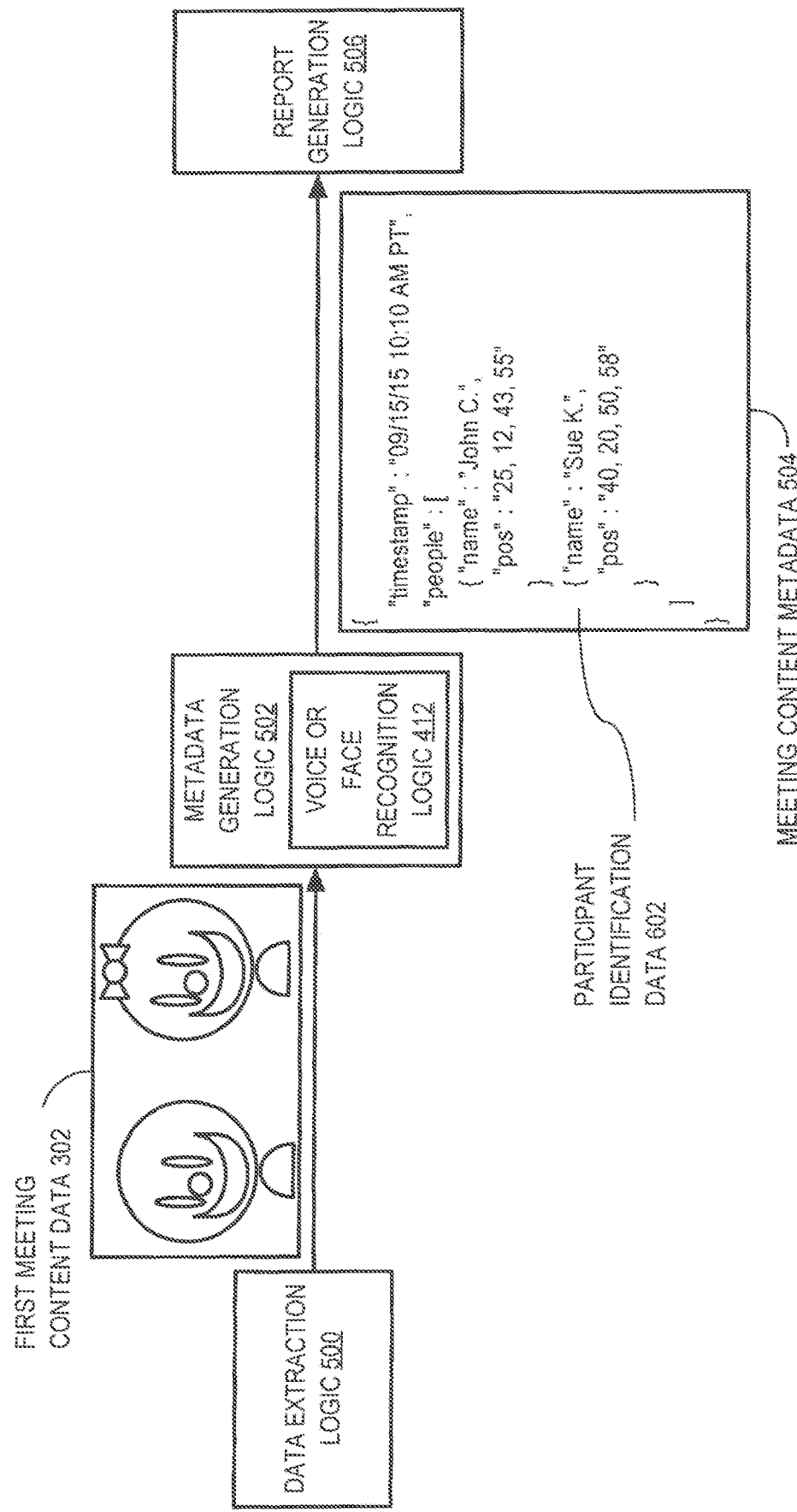
FIG. 6A is a block diagram that depicts an arrangement for generating meeting content metadata that includes participant identification data.
Figure 6B:
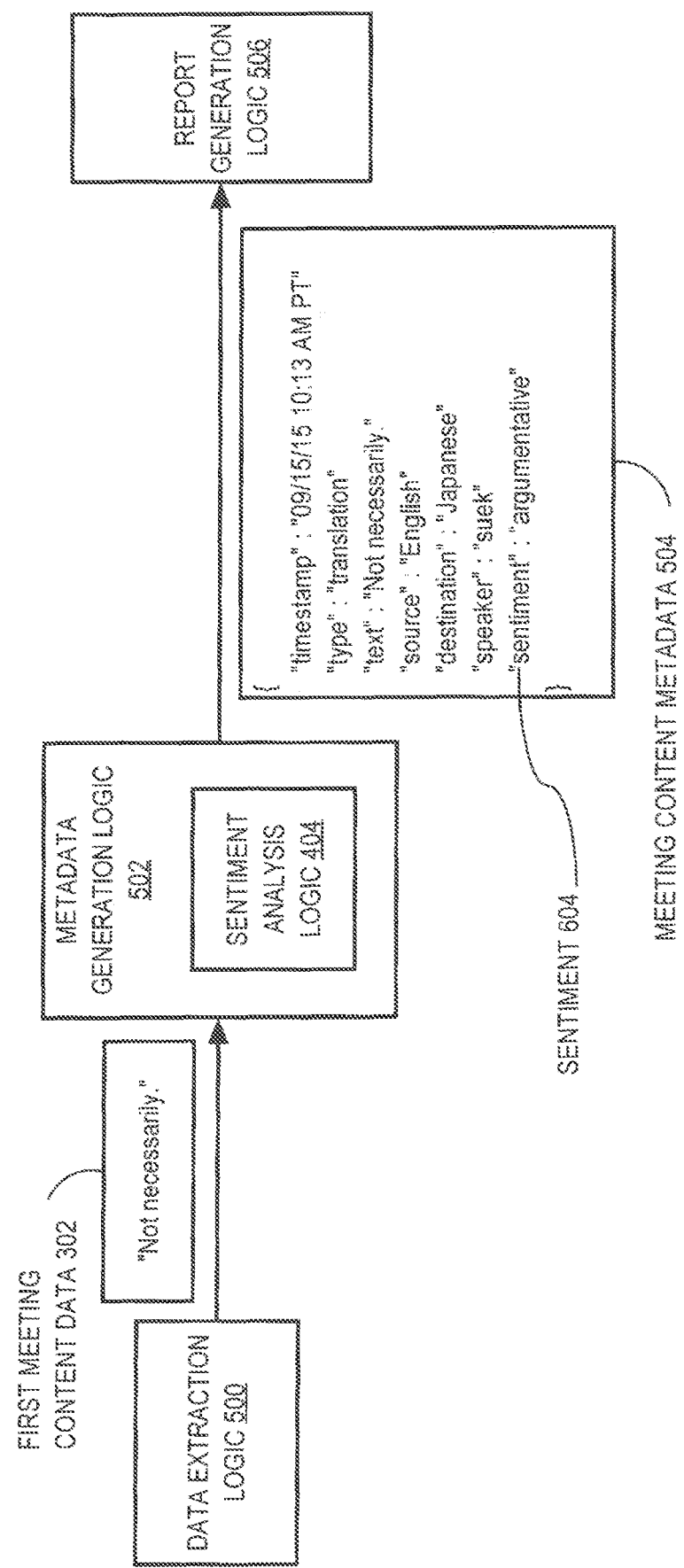
FIG. 6B is a block diagram that depicts an arrangement for generating meeting content metadata that includes a sentiment detected in first meeting content data.
Figure 6C:
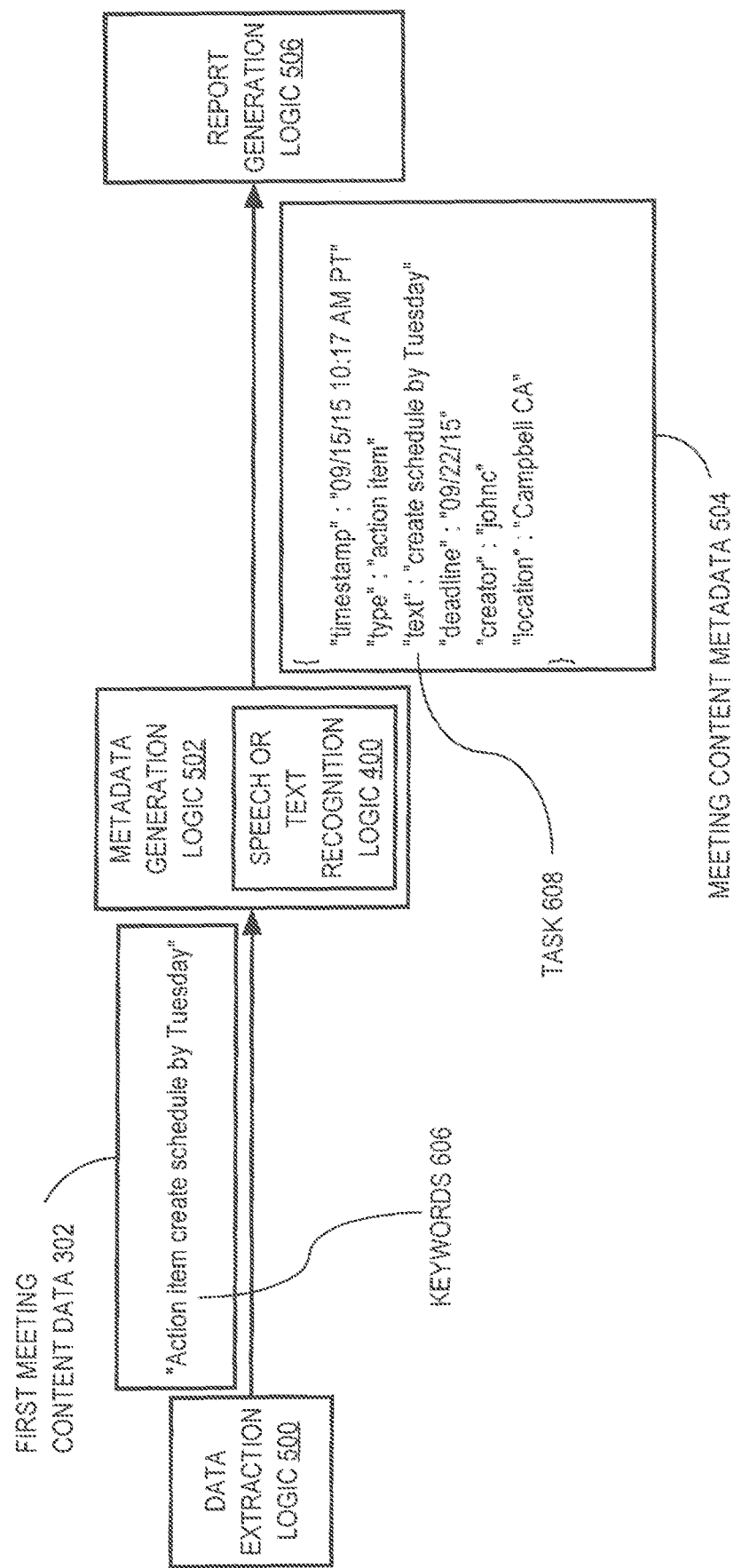
FIG. 6C is a block diagram that depicts an arrangement for generating meeting content metadata that includes a label to identify a key, i.e., important, meeting point.

In an embodiment, meeting intelligence apparatus 102 generates meeting content metadata 504 during an electronic meeting. For example, data generation logic 308 may include metadata generation logic 502, and second meeting content data 312 may include meeting content metadata 504. FIGS. 6A-C depict examples of meeting content metadata 504 that can be generated during an electronic meeting.

FIG. 6A is a block diagram that depicts an arrangement for generating meeting content metadata 504 that includes participant identification data 602. Referring to FIG. 6A, data extraction logic 500 extracts and provides first meeting content data 302 to metadata generation logic 502. In the example of FIG. 6A, metadata generation logic 502 includes voice or face recognition logic 412, which performs voice or face recognition on first meeting content data 302 to identify one or more participants 108A-N in an electronic meeting. Metadata generation logic 502 generates meeting content metadata 504 that includes participant identification data 602 for the one or more participants 108A-N. Metadata generation logic 502 provides meeting content metadata 504 to report generation logic 506.

FIG. 6B is a block diagram that depicts an arrangement for generating meeting content metadata 504 that includes a sentiment detected in first meeting content data 302. Referring to FIG. 6B, data extraction logic 500 extracts first meeting content data 302 that includes the statement "Not necessarily." Metadata generation logic 502 includes sentiment analysis logic 404, which performs sentiment analysis on first meeting content data 302 to determine a sentiment 604 of a participant in an electronic meeting. Sentiment analysis may be performed using a wide variety of sentiment processing algorithms that may vary depending upon a particular implementation. Metadata generation logic 502 generates meeting content metadata 504 that includes sentiment 604. In the example of FIG. 6B, meeting content metadata 504 also includes participant identification data 602 and information related to providing a translation of first meeting content data 302. Thus, metadata generation logic 502 may include a combination of sentiment analysis logic 404, voice or face recognition logic 412, and speech or text recognition logic 400.

FIG. 6C is a block diagram that depicts an arrangement for generating meeting content metadata 504 that includes a label to identify a key, i.e., important, meeting point. Referring to FIG. 6C, first meeting content data 302 includes the statement "Action item create schedule by Tuesday". Metadata generation logic 502 includes speech or text recognition logic 400, which performs speech or text recognition on first meeting content data 302 to recognize one or more keywords 606 in first meeting content data 302. One or more keywords 606 may indicate a task 608 to be completed after an electronic meeting. For example, the one or more keywords 606 may include a voice or text command to perform a particular task. In the example of FIG. 6C, the one or more keywords 606 are the label "Action item" followed by the command "create schedule by Tuesday." Metadata generation logic 502 generates meeting content metadata 504 that includes the one or more keywords 606 and/or task 608.

Figure 7B:
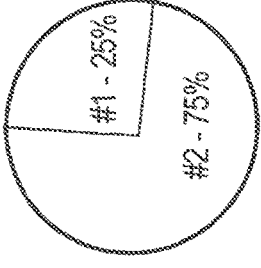
FIG. 7B depicts an example meeting results screen for the Comet Design Review Meeting.

Meeting intelligence apparatus 102 may generate meeting content metadata 504 based on internal and/or external information, such as geolocation information or a meeting room availability schedule. In each of FIGS. 6A-C, report generation logic 506 includes meeting content metadata 504 in report 508. FIGS. 7A-B depict examples of report 508. Referring to FIGS. 7A-B, meeting intelligence apparatus 102 provides report 508 via a web-based participant interface. Meeting intelligence apparatus 102 may send report 508 to one or more nodes 104A-N at any of a number of times, such as upon demand, upon detecting a network connection, automatically after each electronic meeting, etc.

Meeting Results

Post-meeting processing may be performed in accordance with requirements and constraints specified for an electronic meeting, e.g., via a meeting rules template. For example, a meeting rules template may specify particular types of documentation to be created for an electronic meeting, such as meeting minutes, transcriptions, summaries, translations, etc. The types and form of documentation may be required to satisfy various organizational, governmental, judicial, and compliance requirements. The meeting rules template may also specify how the documentation is to be handled, e.g., stored in a particular location, distributed to meeting participants and others, etc. For example, a meeting rules template may specify that meeting results are to be stored on a particular file server and emailed to all of the meeting participants.

FIG. 7A depicts an example meeting reports screen 700 that provides access to meeting results data for a plurality of electronic meetings. Meeting reports screen 700 may be accessed, for example, by a user selecting the "Meeting Reports" control from controls 202 on electronic meeting screen 200 (FIG. 2A). Meeting reports screen allows a user to select a particular electronic meeting and view meeting results for the selected electronic meeting.

FIG. 7B depicts an example meeting results screen 710 for the Comet Design Review Meeting displayed, for example, in response to a user using a pointing device, such as a mouse, to select the "Comet Design Review Meeting" from meeting reports screen 700. Meeting results screen 710 displays meeting results for a selected electronic meeting. In the example depicted in FIG. 7A, the meeting results information is presented in the form of a meeting summary "dashboard," that includes many of the meeting content metadata 504 depicted in FIGS. 6A-C, but embodiments are not limited to this example and are applicable to any type of meeting results.

Meeting results, including a meeting summary, may include explicit data and/or implicit data. Explicit data includes information such as details about the electronic meeting (name, subject, date, location, etc.), meeting participants, meeting content data, such as documents, images, and/or any other data shared during an electronic meeting. In the example of FIG. 7B, explicit data includes the meeting agenda, a list of action items, and a list of documents. In this example, the meeting agenda is accessed via a link, but one or more portions of an electronic meeting agenda, including an entire agenda, may be included in meeting results screen 710.

Implicit data includes meeting content metadata 504, such as identifiers, translations, and/or any other data generated by meeting intelligence apparatus 102 after analyzing an electronic meeting. In the example depicted in FIG. 7B, meeting results screen 710 includes a link to a transcript of the electronic meeting, and a user may select a language for the transcript, irrespective of the language in which the electronic meeting was conducted. Multiple transcripts in different languages may be created. For example, for an electronic meeting conducted in English, both English and Japanese transcripts may be generated. Links are also provided to individual reports related to each participant which, as described in more detail hereinafter, may include various participant metrics.

In the example of FIG. 7B, the meeting results screen 710 also includes links to other reports, such as the meeting agenda, action items, and various documents generated during the electronic meeting. In this example, the electronic documents that were generated during the electronic meeting include "Whiteboard Notes" and "Draft Schedule," and these electronic documents were generated based on one or more input/output mechanisms. For example, the one or more input/output mechanisms may include an electronic whiteboard. Meeting intelligence apparatus 102 may convert handwritten notes or hand-drawn illustrations received as input on the electronic whiteboard into a machine-lettered or a machine-drawn image based on optical character recognition (OCR), vector graphics, and/or any other data conversion tool. For example, meeting intelligence apparatus 102 may perform OCR on handwritten notes to generate metadata that indicates which letters were detected. The metadata may then be used to generate the detected letters in a particular font or any other machine-lettering format.

According to an embodiment, post-meeting processing includes performing various statistical analyses, for example, to determine meeting efficiency. In the example of FIG. 7B, meeting results screen 710 includes a pie chart 712 that depicts an amount of time spent on each of two agenda items during an electronic meeting. In the present example, pie chart 712, along with the accompanying key, indicates that 25% of the meeting time was spent discussing the first agenda item, "Create schedule by Tuesday" and 75% of the meeting time was spent discussing the second agenda item, "Get feedback from Marketing." Similar approaches may be used for other aspects of an electronic meeting, such as action items, and information may be arranged by subject or topic. Embodiments are not limited to this example using pie charts, and any method of presenting statistical information on a computer user interface may be used.

Meeting results screen 710 also includes a statistic in the form of a meeting efficiency metric 714. In the example depicted in FIG. 7B, meeting efficiency is represented by the integer number "86" that is depicted on a scale from low to high, and relative to the meeting efficiency for all electronic meetings. A low efficiency may correspond to a meeting efficiency of 0, while high efficiency may correspond to a meeting efficiency of 100. Meeting efficiency may be calculated based upon a wide variety of criteria that may vary depending upon a particular implementation. Example criteria include, without limitation, the actual total amount of actual time required for an electronic meeting relative to a scheduled amount of time for the electronic meeting, an amount of time added to agenda items during the electronic meeting, an average amount of time per agenda item, a percentage of agenda items that were completed during the electronic meeting, a percentage of action items that were completed during the electronic meeting, etc. Meeting efficiency may be determined based upon any combination of these example criteria, or other criteria, and criteria may be weighted, depending upon a particular implementation. Meeting efficiency is just one example of statistical-based meeting results that may be presented to users, and other statistics may be used. A "Back" control is provided which, when selected by a user, returns control to meeting reports screen 700 of FIG. 7A.

In the prior examples, meeting results were determined and displayed for a particular electronic meeting selected by a user. According to one embodiment, aggregate meeting results are determined across multiple electronic meetings. This allows a user to view overall meeting statistics across multiple meetings with the organization. Examples of meeting statistics include, without limitation, meeting efficiency, average participant participation rate, action item completion rate, sentiment scores, average meeting time, average meeting time overrun, etc. Controls may allow a user to specify the electronic meetings for which statistics are to be determined and displayed. For example, controls may allow a user to select all electronic meetings with an organization, or select electronic meetings by division, group, department (sales & marketing, accounting, engineering, testing, etc.), project, team, user, meeting topic, meeting objective, etc. The statistical results for the selected entity may be displayed in an electronic meeting "dashboard" that allows a user to quickly and easily view the performance of multiple electronic meetings. The statistical results displayed on the electronic meeting "dashboard" may be dynamically updated as the user selects a different division, group, department (sales & marketing, accounting, engineering, testing, etc.), project, team, user, etc. For example, an executive within an organization may quickly and easily view the efficiency of electronic meetings conducted across each entity within the organization, which in some situations allows improvements to be made to how electronic meetings are conducted within the organization.

Participant Analysis

According to one embodiment, post-meeting processing includes participant analysis, which may include determining one or more statistics that are indicative of one or more attributes of the participation by meeting participants, such as the quality and/or quantity of participation. FIG. 7C depicts an example participant analysis report 720 that may be accessed by selecting a particular meeting participant from meeting results screen 710 in FIG. 7B, i.e., "John C.," "Sue K.," or "Mike B." In the present example, it is presumed that a user selected the meeting participant "Sue K." and participant analysis report 720 depicts a meeting participant profile for meeting participant "Sue K."

Controls, such as "+" and "−" allow a user to view the meeting participant's profile for a particular electronic meeting. In the example depicted in FIG. 7C, a user has selected the "+" control adjacent the "Comet Design Review Meeting" to view Sue K's meeting participant profile for this electronic meeting. As depicted in FIG. 7C, participant analysis report 720 depicts various participant metrics including a total participation time during the electronic meeting, a participation time for each agenda item discussed during the electronic meeting, a participation index, an action item completion rate, a role, and sentiment analysis results. The sentiment analysis results may vary depending upon the type of sentiment analysis used. For example, sentiment analysis results may indicate a polarity sentiment result, i.e., positive, negative or neutral. As another example, sentiment analysis results may include a sentiment score for a plurality of sentiments. In the example depicted in FIG. 7C, a sentiment score, on a scale of 0-100, is provided for each of six sentiments, where a score of 0 represents little or no detected presence of the corresponding sentiment, and a score of 100 represents a high presence of the corresponding sentiment. Sentiment analysis results may include other information, such as times during an electronic meeting where particular sentiments were detected. Multiple times may be indicated for particular sentiments that were detected at different times during an electronic meeting.

The participation index may be any measure, weighted or otherwise, of any aspect of the selected participant's contribution to the meeting. For example, "63/100" may indicate a proportion of the total meeting time during which the selected participant spoke. The action item completion rate indicates the past success of a meeting participant in completing action items assigned to the meeting participant. The action item completion rate may be calculated in a wide variety of ways that may vary depending upon a particular implementation. For example, the action item completion rate depicted in FIG. 7C indicates the number of actions items that are completed by a particular meeting participant relative to the total number of action items assigned to the particular participant. In the present example, meeting participant "Sue K." completed one action item out of a total of two action items. The action items may or may not have been assigned specifically to meeting participant "Sue K."

The role associated with the selected participant may indicate any of a number of categories that describe the selected participant relative to the current meeting and/or within a particular entity (e.g., a vice-president of a corporation). For example, "Active Presenter" may indicate that the selected participant did not merely respond to other participants, but also provided many of the topics for discussion. Other statistics may be determined for participants and vary depending upon a particular implementation.

Statistics for meeting participants may be determined based upon any number of electronic meetings. For example, statistics for meeting participants may be calculated based upon a single electronic meeting, or may be based upon aggregated data for multiple electronic meetings. Some statistics, such as the action item completion rate, may be more useful when determined over a large sample of electronic meetings, because the number of action items completed and assigned to any individual meeting participant in a single electronic meeting may be small.

According to one embodiment, participant analysis report 720 includes aggregate statistics 722 for meeting participants over multiple electronic meetings. In this example, aggregate statistics 712 for meeting participant "Sue K." are based upon 12 electronic meetings and include a participation index, an action item completion rate, and sentiment scores. The sentiment scores are determined for each of a plurality of sentiments over 12 electronic meetings and in this example indicate that meeting participant "Sue K." was often cheerful, rarely confused, often defensive and argumentative, sometimes pensive and not often confident.

According to one embodiment, aggregate statistics may be displayed for multiple meeting participants and sorted. For example, in FIG. 7C, participant analysis report 720 includes aggregate statistics for all participants 724, ranked by participation rate and by action item completion rate. This information may be useful in a wide variety of contexts. For example, aggregate statistics may be useful to meeting organizers when planning meetings, to meeting owners during meetings when, for example, assigning action items, and for performance evaluation purposes. Aggregate statistics may also be used by meeting intelligence apparatus 102 to determine suggested meeting participants, as previously described herein. Embodiments are not limited to the example aggregate statistics depicted in FIG. 7B and any aggregate statistics may be used. According to one embodiment, aggregate statistics may be determined and displayed for logical entities, such as projects, departments, groups, divisions, etc., within an organization. This allows users to view meeting participants performance on a per-logical entity basis. For example, a user may view meeting performance statistics for meeting participants of a particular project, and compare those statistics to meeting performance statistics for meeting participants of other projects within an organization. This greatly increases the usefulness of meeting performance statistics to management or other interested personnel. A "Back" control is provided which, when selected by a user, returns control to meeting results screen 710 of FIG. 7B.

According to one embodiment, translation services may be applied to meeting results and participant analysis. For example, meeting results screen 710 may include a language selection control that when selected, displays the contents of meeting results screen 710 in the selected language. The same approach may be applied to the electronic meeting "dashboard" previously described herein. Similarly, participant analysis report 720 may include a language selection control that when selected, displays the contents of participant analysis report 720 in the selected language.

D. Action Item Management

According to one embodiment, post-meeting processing includes action item management, which may include displaying action items for one or more electronic meetings and information for each action item, such as a description, responsible person, due date, current status, etc. Action items may be viewed on a per meeting basis, or across multiple meetings. For example, action items for an entire organization, department, team, project, user, due date, status, etc., may be viewed.

VII. Process Overview

Figure 8:
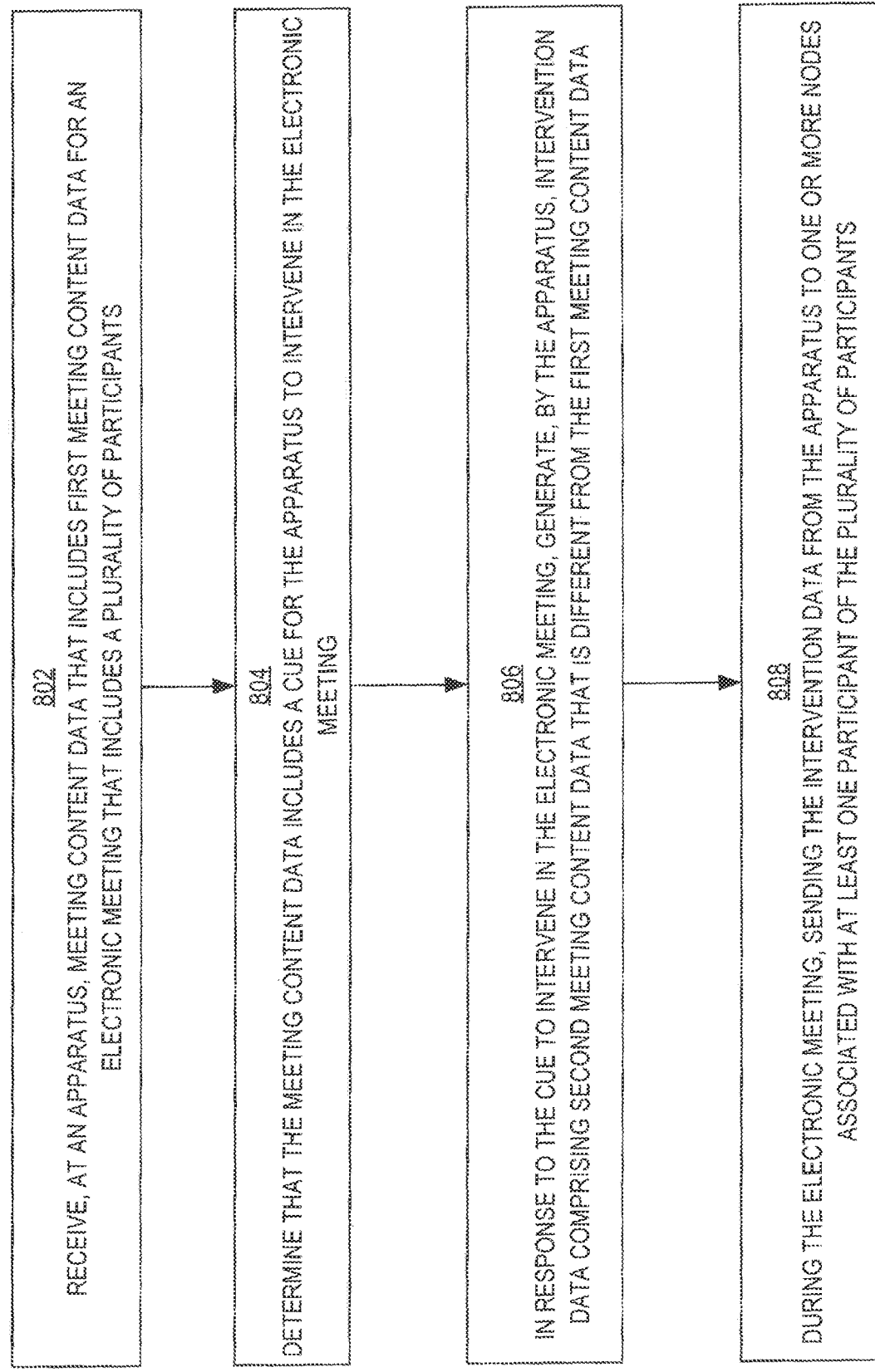
FIG. 8 is a flow diagram that depicts an approach for generating intervention data.
Figure 9:
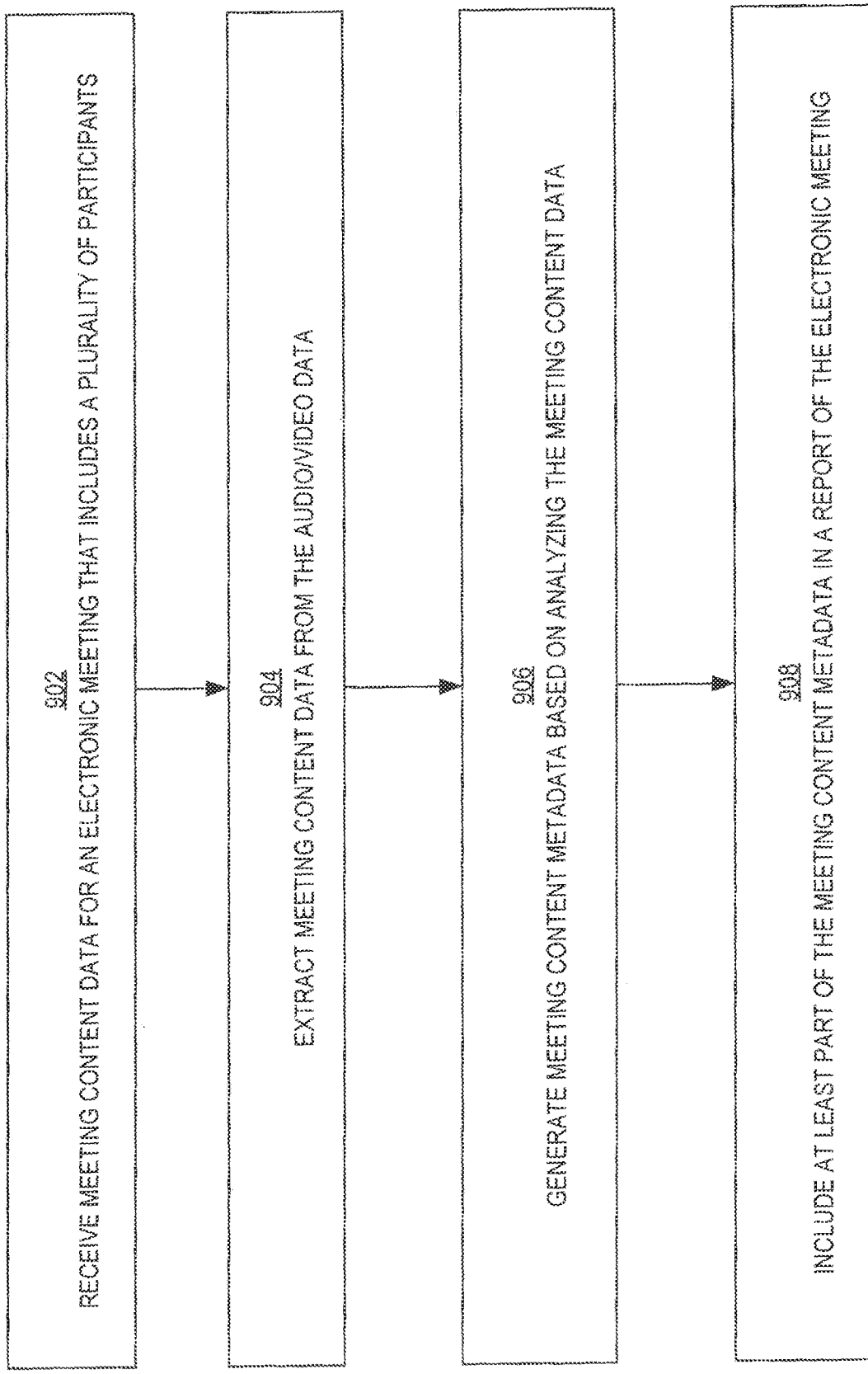
FIG. 9 is a flow diagram that depicts an approach for generating a report.

FIGS. 8 and 9 are flow diagrams that depict various processes that can be performed by meeting intelligence apparatus 102. In an embodiment, FIG. 8 depicts a process that is performed with a network connection during an electronic meeting. In an embodiment, FIG. 9 depicts a process that can be performed, at least partially, with or without a network connection.

Generating Intervention Data

FIG. 8 is a flow diagram 800 that depicts an approach for generating intervention data 310. At block 802, a meeting intelligence apparatus 102 receives meeting content data for an electronic meeting that includes a plurality of participants 108A-N. The meeting content data may include, for example, audio/video data 300 that includes first meeting content data 302 for the electronic meeting. For example, meeting intelligence apparatus 102 may receive a videoconference stream from a Ricoh UCS P3500 associated with a meeting participant Alice, who is making an offer to a meeting participant Bob during the electronic meeting. The meeting content data may include other data besides the actual audio/video data for the electronic meeting. For example, the meeting content data may include supporting documentation for the electronic meeting, as well as any type of information pertaining to other electronic meetings, as well as any other type of information.

At block 804, the meeting intelligence apparatus 102 determines that the meeting content data, e.g., audio/video data 300, includes a cue 304 for the meeting intelligence apparatus 102 to intervene in the electronic meeting. The meeting intelligence apparatus 102 may make this determination based on performing any of a number of analyses on the meeting content data, such as speech or text recognition, voice or face recognition, sentiment analysis, etc. For example, meeting intelligence apparatus 102 may extract and analyze first meeting content data 302 to detect poor eye contact by Alice. The poor eye contact may be a cue 304 for meeting intelligence apparatus 102 to respond by sending a recommendation to Bob.

At block 806, the meeting intelligence apparatus 102 generates intervention data 310 in response to detecting the cue 304. The intervention data 310 includes second meeting content data 312 that is different from the first meeting content data 302. For example, meeting intelligence apparatus 102 may generate a recommendation that advises Bob to make a counteroffer.

At block 808, the meeting intelligence apparatus 102 sends the intervention data 310 to one or more nodes 104A-N during the electronic meeting. The one or more nodes 104A-N are associated with at least one participant of the plurality of participants 108A-N. For example, meeting intelligence apparatus 102 may send the recommendation to Bob and withhold the recommendation from Alice.

Generating Reports

FIG. 9 is a flow diagram 900 that depicts an approach for generating a report 508. At block 902, a meeting intelligence apparatus 102 receives meeting content data for an electronic meeting that includes a plurality of participants 108A-N. For example, meeting intelligence apparatus 102 may receive an audioconference data packet from Charlie's smartphone, which is executing the Ricoh UCS app.

At block 904, meeting intelligence apparatus 102 analyzes the meeting content data. For example, meeting intelligence apparatus 102 may analyze audio/video data 300 for an electronic meeting and extract particular meeting content data from the audio/video data 300. This may include, for example, stripping out header data and analyzing the payload of audioconference data packets. Analyzing the payload may involve performing speech or text recognition, sentiment analysis, voice or face recognition, etc.

At block 904, meeting intelligence apparatus 102 generates meeting content metadata 504 based on analyzing the meeting content data. For example, meeting intelligence apparatus 102 may perform voice recognition on the meeting content data to identify Charlie as the person presenting at the electronic meeting. meeting intelligence apparatus 102 may generate JSON that includes "speaker: Charlie" among the name-value pairs.

At block 906, the meeting intelligence apparatus 102 includes at least part of the meeting content metadata 504 in a report 508 of the electronic meeting. For example, meeting intelligence apparatus 102 may generate a "Meeting Summary" report that includes "Charlie" among the participants 108A-N of the electronic meeting.

VIII. Translation and Transcription

As previously described herein, translation and transcription services may be used in conjunction with electronic meetings, for example, to supplement meeting content and to generate post meeting reports. A wide variety of translation and transcription services may be used and embodiments are not limited to any particular translation or transcription services. As used herein, the term "translation/transcription" refers to translation, transcription, or both translation and transcription, where translation refers to converting text in one language to text in one or more other languages, or converting human speech from one language to one or more other languages, and transcription refers to converting human speech to text.

One of the problems with conventional translation/transcription services is that they typically provide varying results, i.e., different levels of accuracy, based upon factors such as language, context, speaker, length of phrases, etc. For example, a particular translation/transcription service may provide excellent results when translating from language A to language B, but inferior results when translating from language A to language C. Similarly, a particular translation/transcription service may provide excellent results when translating/transcribing the speech of a first speaker, but poor results when translating/transcribing the speech of a second speaker, even when the two speakers are speaking the same words. This may be caused, for example, by different accents, intonation, speaking styles, etc., that are specific to a particular speaker. Results may also vary based upon context. For example, the particular translation/transcription service may provide a high level of accuracy when translating/transcribing information in a first context, such as a medical context, but a low level of accuracy when translating/transcribing information in a second context, such as a computer science context. Consequently, no single translation/transcription service provides the best results in all circumstances, i.e., across all languages, contexts, speakers, length of phrases, etc.

Differences in accuracy of different translation/transcription services may be attributable to a wide variety of factors, such as the design of the algorithms used, how an algorithm is trained, etc. For example, an algorithm for a particular translation/transcription service may be optimized for a particular language and/or context, and not provide accurate results for other languages and contexts. As another example, the training data set used with a particular translation/transcription service may be focused on a particular language or context, which reduces accuracy. Attempts are sometimes made to improve accuracy by re-running algorithms multiple times and/or retraining algorithms using different and/or more extensive data sets, both of which necessarily consume additional computational and storage resources, and require additional time, without necessarily improving results.

According to one embodiment, multiple translation/transcription services are utilized to improve translation/transcription results. The translation/transcription services are selected, from a plurality of available translation/transcription services, to improve accuracy in certain circumstances. The selection may be made based upon various factors that may include, without limitation, language, context, speaker identification, class of speaker, location, compliance requirements, and other factors that may vary depending upon a particular implementation. Translation/transcription results provided by the translation/transcription services are selectively combined to generate resulting translation/transcription data that has a higher level of accuracy that can be achieved using conventional approaches that employ a single translation/transcription service. Other benefits of the approach are described hereinafter. Supplemental processing may also be performed to further improve the accuracy of the resulting translation/transcription data.

A. Architecture

Figure 10:
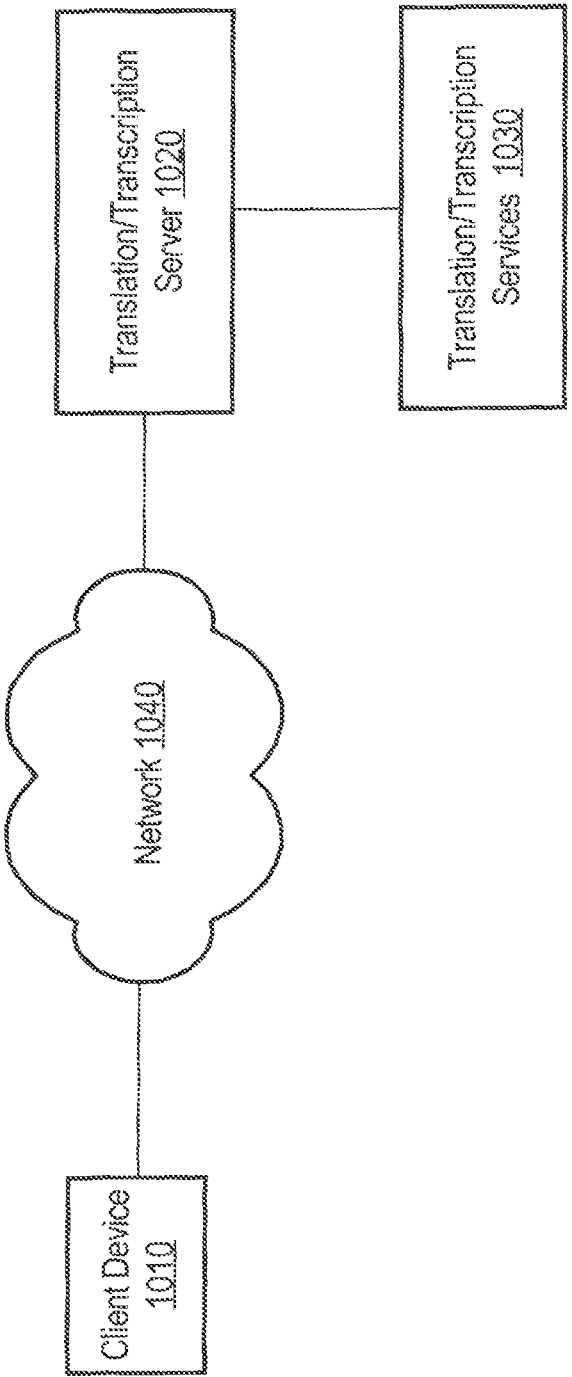
FIG. 10 is a block diagram that depicts an arrangement for performing translation/transcription using multiple translation/transcription services.

FIG. 10 is a block diagram that depicts an arrangement 1000 for performing translation/transcription using multiple translation/transcription services, according to an embodiment. Arrangement 1000 includes client device 1010, a translation/transcription server 1020, and translation/transcription services 1030 communicatively coupled via a network 1040. Network 1040 may be implemented by one or more networks, such as one or more local area networks (LANs), wide area networks (WANs), etc. The elements in arrangement 1000 may also have direct connections and embodiments are not limited to the example elements depicted in arrangement 1100 and fewer or additional elements may be used, depending upon a particular implementation.

Client device 1010 may be any type of device that is capable of requesting the translation and/or transcription of data. Examples of client device 1010 include, without limitation, desktop computers, notebook computers, tablet computing devices, mobile communications devices such as smartphones, MFPs, nodes 104A-104N, meeting intelligence apparatus 102, etc. Client device 1010 may include various processes used to support electronic meetings. For example, client device 1010 may include a collaboration client that allows a user of client device 1010 to participate in an electronic meeting. As another example, client device 1010 may include a collaboration server process that manages electronic meetings between participants.

Translation/transcription server 1020 acts as an intermediary between client device 1010 and translation/transcription services 1030, and manages the processing of translation/transcription requests by translation/transcription services 1030 on behalf of client device 1010. As described in more detail hereinafter, this includes causing a request to translate/transcribe data to be processed by multiple translation/transcription services 1030 and selectively combining the results of the translation/transcription services 1030 into resulting translation/transcription data.

Translation/transcription server 1020 may be implemented by any type of computing device and may include one or more software processes. As such, translation/transcription server 1120 is not limited to a server per se, but may be implemented as any type of intermediate service. In addition, although depicted in the figures as a separate entity, translation/transcription server 1020 may be implemented on client device 1010, or other entities, such as client devices, MFPs, nodes 104A-104N, and meeting intelligence apparatus 102.

Translation/transcription services 1130 include services with the capability to translate text data from one language to one or more other languages, transcribe audio data into text, or both. Translation/transcription services 1130 may be implemented, for example, as Web applications or other processes on servers or other networking elements and translation/transcription services 1130 may support one or more application programming interfaces (APIs).

Figure 11:
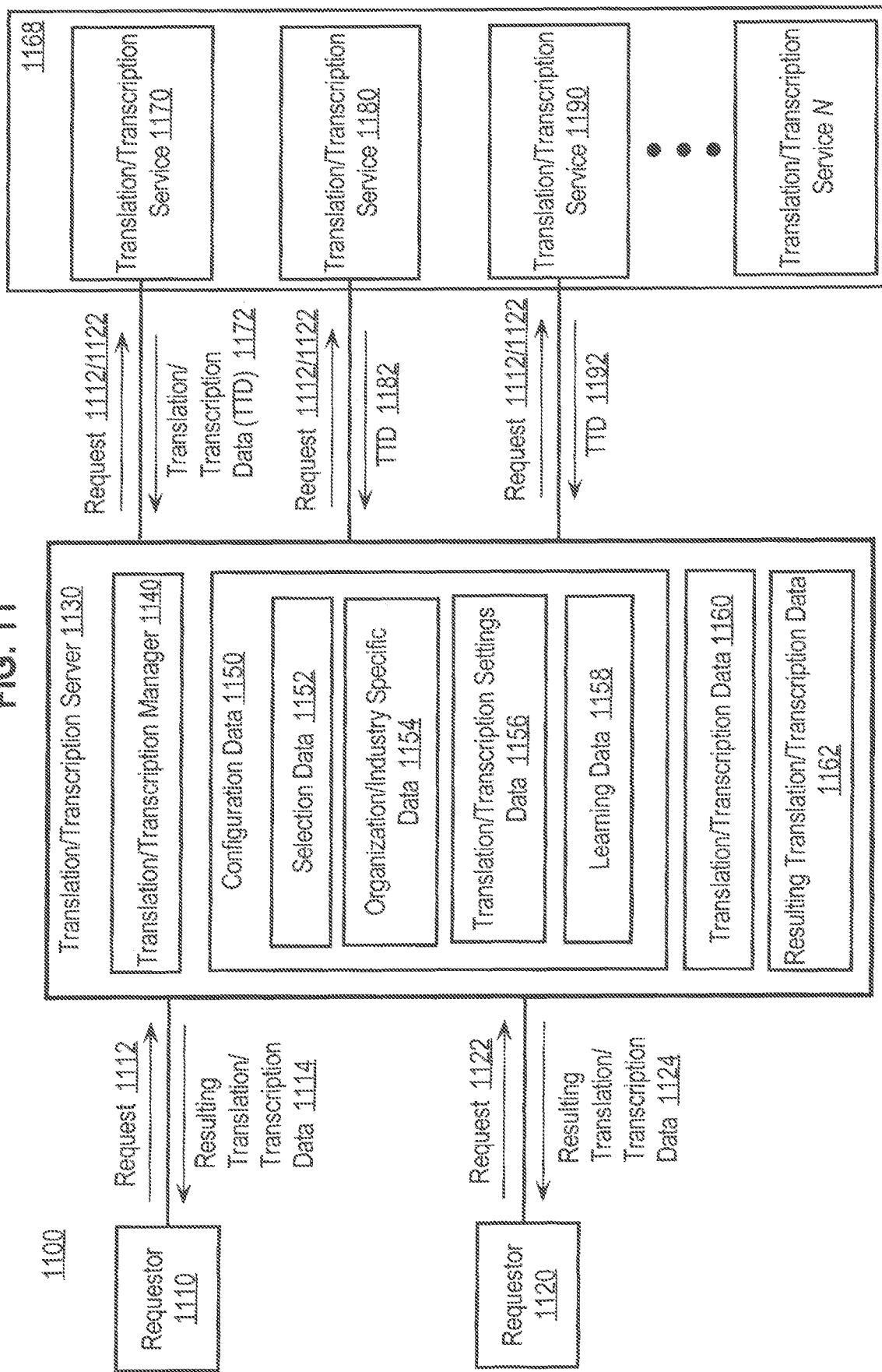
FIG. 11 is a block diagram that depicts an arrangement for performing translation/transcription using multiple translation/transcription services.

FIG. 11 is a block diagram that depicts an arrangement 1100 for performing translation/transcription using multiple translation/transcription services, according to an embodiment. Arrangement 1100 includes requestors 1110, 1120, a translation/transcription server 1130, and translations/transcription services 1168 that include translations/transcription services 1170, 1180, 1190 through N. The elements depicted in FIG. 11 may be communicatively coupled via any type and number of networks and communications links, including direct links. Embodiments are not limited to the example elements depicted in arrangement 1100 and fewer or additional elements may be used, depending upon a particular implementation. For example, embodiments are applicable to any number of requestors and translation/transcription services.

Requestors 1110, 1120, also referred to herein as "requestor devices," may be any entity that requests translation/transcription of data. Examples of requestors 1110, 1120 include, without limitation, client devices including desktop computers, notebook computers, tablet computing devices, mobile communications devices such as smartphones, MFPs, nodes 104A-104N, meeting intelligence apparatus 102, a collaboration server, a collaboration client, etc.

Translation/transcription server 1130 acts as an intermediary between requestors 1110, 1120 and translation/transcription services 1170, 1180, 1190 through N (collectively referred to in FIG. 11 as translation/transcription services 1168) to provide translation/transcription data on behalf of requestors 1110, 1120 using multiple translation/transcription services. This includes translation/transcription server 1130 selecting particular translation/transcription services from available translation/transcription services 1168 to provide the most accurate translation/transcription results for a particular situation. Translation/transcription server 1130 selectively uses the translation/transcription results provided by the selected translation/transcription services to generate resulting translation/transcription data 1114, 1124, which is provided back to requestors 1110, 1120. As described in more detail hereinafter, the resulting translation/transcription data 1114, 1124 may include translation/transcription data from multiple translation/transcription services.

According to one embodiment, translation/transcription server 1130 includes a translation/transcription manager 1140 that implements one or more heuristics, decision logic, algorithms, intelligence, natural language processing, natural language classifying, learning, etc., to perform the functionality described herein. In addition, as described in more detail hereinafter, the heuristics, decision logic, algorithms etc., used by translation/transcription manager 1140 may be dynamic and change over time via user feedback.

Translation/transcription server 1130 may be implemented by and on any type of computing device and may include one or more software processes. As such, translation/transcription server 1130 is not limited to a server per se, but may be implemented as any type of intermediate service. In addition, although depicted in the figures as a separate entity, translation/transcription server 1130 may be implemented on requestors 1110, 1120, or other entities, such as client devices, MFPs, nodes 104A-104N, and meeting intelligence apparatus 102.

Translation/transcription services 1168 include services with the capability to translate text data from one language to one or more other languages, transcribe audio data into text, or both. Translation/transcription services 1168 through N may be implemented, for example, as Web applications or other processes on servers or other networking elements and translation/transcription services 1168 may support one or more application programming interfaces (APIs).

B. Selection Data

According to one embodiment, translation/transcription manager 1140 uses selection data 1152, maintained as part of configuration data 1150, to select particular translation/transcription services, from a plurality of available translation/transcription services, to translate/transcribe text or audio data. The selected translation/transcription services are selected in a manner to provide the most accurate results for particular text or audio data, and the translation/transcription services that are selected may be different for each set of text and audio data.

FIG. 12 depicts example data that may be included in selection data 1152. In the examples depicted in FIG. 12, the labels "S1", "S2", and "S3" refer to three different translation/transcription services, such as translation/transcription services 1170, 1180, 1190, but data may be provided for any number of translation/transcription services. Each of the tables in FIG. 12 identifies one or more particular translation/transcription services that are likely to provide accurate results for a particular factor, such as language, context, speaker, location, and for a particular compliance requirement. A context table 1210 specifies one or more translation/transcription services that are likely to provide accurate results for a particular context. For example, for text or audio data in the medical context, translation/transcription service Si is most likely to provide accurate results, while in the scientific context, translation/transcription services S2 and S3 are most likely to provide accurate results.

A speaker table 1220 specifies one or more translation/transcription services that are likely to provide accurate results for a particular speaker. For example, translation/transcription services S1 and S2 are likely to provide accurate results when processing text or audio data, or a portion thereof, that corresponds to "Speaker A" speaking, while translation/transcription service S3 is likely to provide accurate results when "Speaker D" is speaking.

A compliance table 1230 specifies one or more translation/transcription services to be used when a particular compliance requirement applies. A compliance requirement may correspond to a legal requirement that may be adopted, for example, by business organizations, countries, etc. For example, a particular country may adopt a legal requirement that corresponds to compliance requirement A, for which all of translation/transcription services S1, S2, and S3 are likely to provide equally accurate results. Another country, however, may adopt a legal requirement that corresponds to compliance requirement D, for which translation/transcription service S1 is likely to provide accurate results. In this example, the legal requirement may prohibit the use of translation/transcription services that are outside the country and only translation/transcription service S1 is located within the country.

A location table 1240 specifies one or more translation/transcription services that are likely to provide accurate results for a particular location. As used here, the term "location" refers to a physical location that corresponds to text or audio data to be translated and/or transcribed. For example, for text or audio data corresponding to location "A", translation/transcription service S3 is likely to provide accurate results, while for text or audio data captured in a location "B", translation/transcription service Si is likely to provide accurate results. This may be useful in situations where particular translation/transcription services are known to provide accurate results in certain locations attributable, for example, to local differences in language.

A language table 1250 specifies one or more translation/transcription services that are likely to provide accurate results for a particular combination of source language and target language. For example, when transcribing English text or audio data to English, translation/transcription service S2 is likely to provide accurate results, when translating/transcribing from Japanese to English, translation/transcription service S1 is likely to provide accurate results, and when translating/transcribing from German to French, translation/transcription services S2 and S3 are likely to provide accurate results.

The particular contexts, speakers, compliance groups and languages depicted in FIG. 12 are provided for explanation purposes only and embodiments are not limited to the examples depicted in FIG. 12, and other factors may be used, depending upon a particular implementation. One example of another factor is classes of users, such as non-native speakers of a particular language, e.g., non-native English speakers. Other non-limiting examples of factors include history, reputation and domain. Examples of domain include, without limitation, legal (patents, criminal, civil), medical, engineering (software, hardware, agile processes), business (marketing, sales, finance), and scientific research.

Selection data 1152 may be determined in different ways that may vary depending upon a particular implementation. For example, selection data 1152 may be initially specified manually by a user, such as an administrator, and then manual confirmation and/or statistical analysis may be used to establish that a particular translation/transcription service provides accurate results for a particular factor, e.g., results that have an accuracy above a specified threshold. For example, it may be determined by manual confirmation and/or statistical analysis that translation/transcription service S1 provides accurate results when being used to translate/transcribe text or audio data in the medical context. As another example, it may be determined by manual confirmation and/or statistical analysis that translation/transcription services S1, S2 and S3 all provide accurate results when being used to translate/transcribe text or audio data of Speaker A speaking, while only translation/transcription service S3 provides accurate results when Speaker D is speaking. Differences in results may occur for different reasons. For example, a particular speaker may have an accent that is more accurately translated/transcribed by one translation/transcription service over another translation/transcription service. As another example, one translation/transcription service may provide more accurate results than another translation/transcription service when translating text or audio data in a particular context. Differences in accuracy provided by different translation/transcription services for different factors (context, speaker, compliance, language, etc.) may be attributable to various reasons. For example, algorithms used by translation/transcription services may be optimized for particular factors. As another example, even if the algorithms used by different translation/transcription services are comparable, e.g., implement comparable logic, there may be differences in the training set, i.e., the amount and/or type of training data, used to train the algorithms. Selection data 1152 may be revised over time based upon user feedback included in learning data 1158. For example, the preferred services in the tables of FIG. 12 may be revised, e.g., "fine-tuned," over time in response to actual experiences of a business organization in the form of user confirmations and/or corrections represented by learning data 1158.

Selection data 1152 may be used by translation/transcription manager 1140 in different ways that may vary depending upon a particular implementation. Translation/transcription server 1130 may use selection data 1152 to exclude the use of certain translation/transcription services. For example, when translating/transcribing text or audio data from English to Japanese, translation/transcription manager 1140 may only use translation/transcription service S1 and exclude translation/transcription services S2 and S3. Translation/transcription manager 1140 may instead use selection data 1152 to identify preferences among translation/transcription services, without necessarily excluding a particular translation/transcription service that is not identified as preferred for a particular factor and circumstance. For example, the results of translation/transcription services that are identified as preferable for a particular factor and circumstance may be given more weight, i.e., more influence, than results of translation/transcription services that are not identified as preferable for a particular factor and circumstance. Continuing with the prior example, when translating/transcribing text or audio data from English to Japanese, translation/transcription manager 1140 may apply a greater weighting to results provided by translation/transcription service S1 and a lesser weighting to the results provided by translation/transcription services S2 and S3.

Translation/transcription manager 1140 may also use multiple factors in selection data 1152 to determine which results of translation/transcription services should be used. For example, text or audio data that pertains to the sports context (S1, S2) and by speaker A (S1, S2) in location B (S1), the results of translation/transcription service S1 may be used. Alternatively, the results of both translation/transcription service S1 and S2 may be used, but the results of translation/transcription service S1 weighted more heavily than the results of translation/transcription service S2. Also, in some situations text or audio data may be translated/transcribed into multiple target languages. This may occur, for example, during electronic meetings that are conducted in multiple languages. In these situations, multiple language factor values may be used by translation/transcription manager 1140 to determine which translation/transcription services should be used.

C. Generating Translation/Transcription Data

Figure 13:
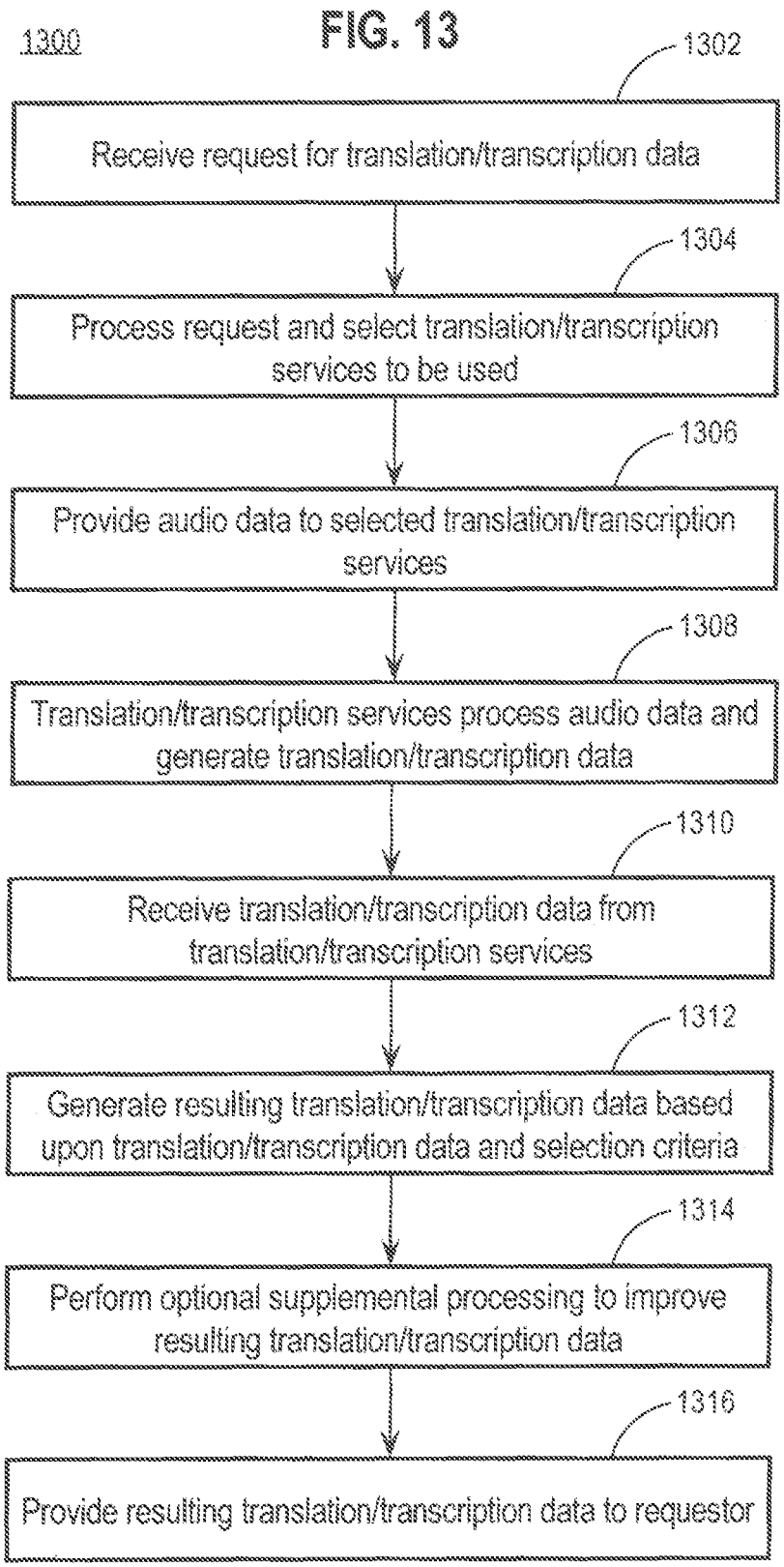
FIG. 13 is a flow diagram that depicts an approach for generating translation/transcription data using multiple translation/transcription services, according to an embodiment.

FIG. 13 is a flow diagram 1300 that depicts an approach for generating translation/transcription data using multiple translation/transcription services, according to an embodiment. For purposes of explanation, it is presumed that requestor 1110 makes the request 1112 for translation/transcription data to translation/transcription manager 1140, and that translation/transcription manager 1140 generates and provides the resulting translation/transcription data 1114 to requestor 1110.

In step 1302, a request is received to translate/transcribe data. For example, translation/transcription manager 1140 receives, from requestor 1110, a request to translate/transcribe data. The request specifies or includes text or audio data to be translated/transcribed. For example, the request may include text or audio data to be translated/transcribed, or a reference, such as a link, to the text or audio data to be translated/transcribed. The text or audio data may represent a completed conversation or session, such as a meeting, conversation, etc. Alternatively, the text or audio data may represent a portion of a conversation or session, and translation/transcription manager 1140 may process the text or audio data as it is generated. For example, translation/transcription manager 1140 may process text or audio data as it is generated and streamed during an electronic meeting to provide live translation/transcription services during an electronic meeting. Embodiments are not limited to requestors issuing explicit, separate requests for each portion of text or audio data to be translated/transcribed, and providing text or audio data may itself constitute a request to translate/transcribe data. For example, requestor 1110 may send a first request that represents the start of a stream of text or audio data, followed by multiple subsequent requests that represent chunks of text or audio data that comprise the stream.

Audio and text data may be in any format that may vary depending upon a particular implementation. Example audio data formats include, without limitation, MP3 (.mp3), Windows Media Audio (.wma), Real Audio (.ra, .ram, .rm), MIDI (.mid) and Ogg (.ogg) formats. The request may also specify the type of data desired, e.g., translated text or audio data, transcription data, or both translated audio data and transcription data, as well as the format of the translated text or audio data, or transcription data.

In step 1304, translation/transcription manager 1140 processes the request and selects translation/transcription services to be used to process the text or audio data. The selection of translation/transcription services may be made in different ways and based upon a variety of factors that may vary depending upon a particular implementation. For example, translation/transcription services may be selected randomly. Without any prior knowledge of the level of accuracy that any particular translation/transcription service will provide for a particular situation, this approach assumes that given a large enough sample of translation/transcription services, the accuracy of the resulting translation/transcription data will be better than when using only a single translation/transcription service, particularly when results from multiple translation/transcription services are combined, as described in more detail hereinafter.

According to one embodiment, translation/transcription manager 1140 uses selection data 1152 to select particular translation/transcription services, as previously described herein, to obtain a higher level of accuracy for a particular situation defined by factors, such as context, speaker, compliance, location, language, etc. The values of the factors, i.e., the particular language, particular speaker, etc., may be manually specified by a user, for example, via a configuration interface provided by translation/transcription manager 1140, or via an interface provided by requestor 1110. Such a configuration interface may allow a user to specify, for example via a graphical user interface with various controls, a particular context, one or more speakers, a compliance group, a location and a source and target language for text or audio data to be processed. Alternatively, the request received from requestor 1110 may specify values for the factors, such as a language, context, speaker, etc. As another alternative, translation/transcription manager 1140 may determine the values for the various factors. For example, when the text or audio data corresponds to an electronic meeting, translation/transcription manager 1140 may determine the value for various factors by examining data for the electronic meeting, such as an agenda, meeting notes/minutes, participant information, etc. As another example, translation/transcription manager 1140 may examine the text or audio data and/or metadata for the text or audio data. For example, translation/transcription manager 1140 may examine and/or analyze the audio data to determine one or more of a context, one or more speakers, the applicability of a compliance group, a location, a source language, and one or more target languages. Any combination of the foregoing may be used by translation/transcription manager 1140 to determine the values for the factors.

Once the values of the factors are known, translation/transcription manager 1140 uses selection data 1152 to select translation/transcription services that are most likely to provide accurate results. For example, if the text or audio data is in English and is to be translated/transcribed to Japanese, then service S1 is selected. If the speaker is known to be speaker A, then service S1 is selected. If, however, the speaker is known to be speaker C, then services S1 and S2 are selected.

The number of translation/transcription services used may vary depending upon a particular implementation, and embodiments are not limited to any particular number of translation/transcription services. Various factors may be considered in determining the number of translation/transcription services to be used in a particular situation. Example factors include, without limitation, a desired level of accuracy, the availability of computational resources, a contracted level of service, etc. For example, for applications that require a high level of accuracy and real-time processing, a large number of translation/transcription services may be used. For non-real-time processing, such as stand-alone translation and transcription situations, fewer translation/transcription services may be used. The number of translation/transcription services used may be specified manually, or for example, specified by selection data 1152.

The number of translation/transcription services used may tailored, i.e., specifically selected, for each set of text or audio data processed. For example, a large number of translation/transcription services may be selected to process a set of text or audio data to obtain a high level of accuracy, while a fewer number of translation/transcription services may be used to process another set of text or audio data where a lower level of accuracy is acceptable, or where a few number of translation/transcription services is specified by a particular level of service. Using fewer translation/transcription services may reduce the amount of computational resources and/or time required to perform the translation/transcription.

The number of translation/transcription services may be dynamically changed while a particular set of text or audio data is being processed. For example, the number of translation/transcription services may be increased if a current level of accuracy, determined during the processing of text or audio data, is determined to be unsatisfactory, e.g., less than a specified threshold level of accuracy. Similarly, the number of translation/transcription services being used may be reduced if the level of accuracy exceeds the specified threshold level of accuracy, or in response to a change in subscription or service level. For example, a particular, a particular translation/transcription service that is providing a low level of accuracy may be discontinued. In the present example, for purposes of explanation, it is presumed that translation/transcription manager 1140 selects translation/transcription services 1170, 1180, 1190 to process the text or audio data, from the N number of available translation/transcription services.

In step 1306, the text or audio data is provided to the selected translation/transcription services for processing. In the present example, translation/transcription manager 1140 provides the text or audio data, or a link to the text or audio data, to translation/transcription services 1170, 1180, 1190 for processing. Text or audio data may be provided to the selected translation/transcription services via one or more requests, which may be the requests that translation/transcription server 1130 received from requestors 1110, 1120, or modified or newly-generated requests that contain different information than the requests received from requestors 1110, 1120. The requests may conform to APIs supported by translation/transcription services 1170, 1180, 1190.

In step 1308, the selected translation/transcription services process the text or audio data and generate and provide translation/transcription data to translation/transcription manager 1140. In the present example, translation/transcription services 1170, 1180, 1190 process the text or audio data and generate translation/transcription data 1172, 1182, 1192, respectively, which may include various types of data and in different formats. The type and format of translation/transcription data 1172, 1182, 1192 may vary for each translation/transcription service and depending upon a particular implementation, and embodiments are not limited to any particular type or form of translation/transcription data. For example, translation/transcription data 1172, 1182, 1192 may include text data that represents text that has been translated from one language to one or more other languages. As another example, translation/transcription data 1172, 1182, 1192 may include text data that represents a result of transcribing human speech to text. Translation/transcription data 1172, 1182, 1192 may also include both text data and audio data.

Figure 14:
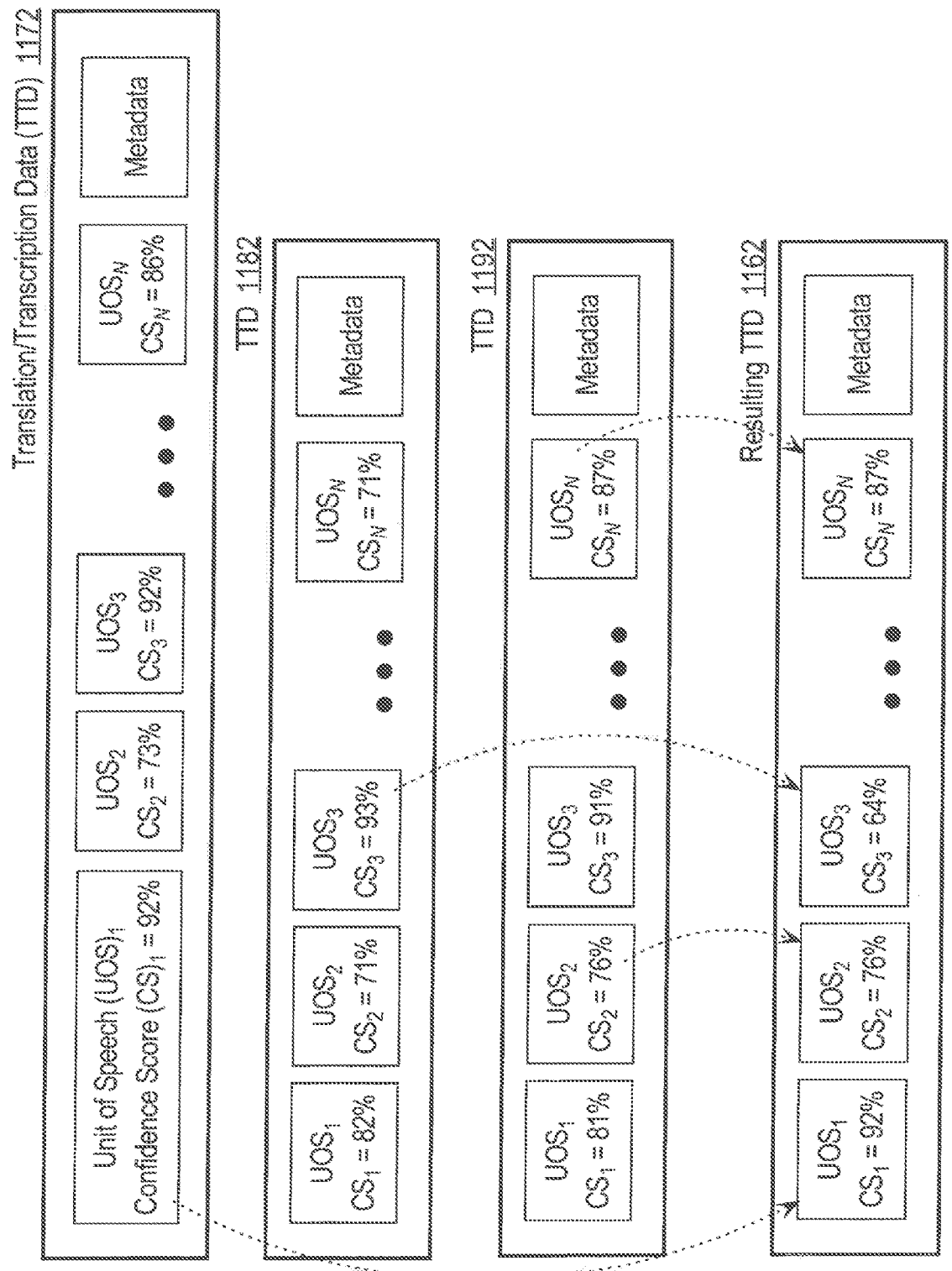
FIG. 14 is a block diagram that depicts examples of translation/transcription data (TTD) and resulting translation/transcription data.

In step 1310, translation/transcription data is received from the translation/transcription services. For example, translation/transcription manager 1140 receives translation/transcription data 1172, 1182, 1192 from translation/transcription services 1170, 1180, 1190. Translation/transcription manager 1140 may store translation/transcription data 1172, 1182, 1192 locally as translation/transcription data 1160, and later process as described in more detail hereinafter. After processing, translation/transcription data 1172, 1182, 1192 may be maintained on translation/transcription server 1130 or deleted, depending upon a particular implementation. FIG. 14 is a block diagram that depicts examples of translation/transcription data (TTD) 1172, 1182, 1192 and resulting translation/transcription data 1114. Translation/transcription data 1172, 1182, 1192 each include a plurality of units of speech, referred to as $UOS_1$ through $UOS_N$. As used herein, the term "unit of speech" refers to one or more spoken words or utterances that represent a single word, a phrase, a sentence, a paragraph, etc. Thus, different units of speech may include different numbers of words. A unit of speech may be determined from text or audio data based upon, for example, pauses, changes in intonation, and/or any combination of factors. For example, natural pauses in human speech, e.g., at the end of a sentence, paragraph, etc., may define transitions between units of speech. An audio or text file may contain any number of units of speech.

According to one embodiment, each unit of speech has a corresponding confidence score, referred to in FIG. 14 as $CS_1$ through $CS_N$. The confidence scores may be determined, for example, by translation/transcription services 1170, 1180, 1190. A confidence score conveys an estimated level of accuracy in a translated/transcribed unit of speech. Confidence scores may be determined by a translation/transcription service based upon the results of prior training. In the example depicted in FIG. 14, confidence scores are presented as a percentage on a scale of 0 to 100 for purposes of explanation only, but embodiments are not limited to this example and any confidence scoring methodology may be used. Confidence scores may be represented by confidence score data that may be maintained as part of, or separate from, units of speech, and confidence scores are depicted in FIG. 14 as being part of each unit of speech for purposes of explanation only.

Translation/transcription data 1172, 1182, 1192 may also include metadata that specifies one or more attributes of translation/transcription data 1172, 1182, 1192, such as timestamp information, data size information, information about content, including context, speaker, location, etc. The metadata may include data that is manually specified by a user, for example during configuration or training, and data that is determined by translation/transcription services 1170, 1180, 1190.

In step 1312, translation/transcription manager 1140 generates resulting translation/transcription data 1162 based upon the translation/transcription data 1172, 1182, 1192 received from translation/transcription services 1170, 1180, 1190. This may be performed in different ways that may vary depending upon a particular implementation, and embodiments are not limited to any particular approach for generating resulting translation/transcription data 1162. According to one embodiment, for each unit of speech, translation/transcription manager 1140 compares the confidence scores from translation/transcription services 1170, 1180, 1190 and selects the version of the translated/transcribed unit of speech with the highest confidence score for the unit of speech. For example, referring to FIG. 14, translation/transcription manager 1140, starting with the first unit of speech ($UOS_1$), compares the confidence score $CS_1$ from translation/transcription services 1170, 1180, 1190 and determines that the translated/transcribed version of the first unit of speech ($UOS_1$) provided by translation/transcription service 1170 has the highest confidence score of 92%, compared to the confidence scores of 82% and 81%, respectively, for $UOS_1$ provided by translation/transcription services 1180 and 1190. Translation/transcription manager 1140 therefore includes the translated/transcribed version of the $UOS_1$ provided by translation/transcription service 1170 in the resulting translation/transcription data 1162. This may be performed, for example, by translation/transcription manager 1140 invoking functionality to cause the translated/transcribed version of the first unit of speech ($UOS_1$) provided by translation/transcription service 1170 to be copied and/or moved into resulting translation/transcription data 1162, which may be stored in a memory area designated for resulting translation/transcription data. This process is performed for each of the other units of speech until all of the units of speech have been processed.

According to one embodiment, a confidence score threshold is used in combination with selection data 1152 to select translated/transcribed units of speech to be included in resulting translation/transcription data. In this embodiment, if all of the confidence scores for a particular unit of speech are below a specified threshold, then instead of using the translated/transcribed unit of speech having the highest confidence score, selection data 1152 is used to select the translated/transcribed unit of speech that is likely to provide the most accurate result. For example, the various factors specified by selection data 1152 may be prioritized in the order of language, context, speaker, compliance requirement, and location. For this example, language table 1250 is first consulted to determine whether a particular translation/transcription service is preferred over the other translation/transcription services that were used. If so, then the translated/transcribed unit of speech from the particular translation/transcription service is used. If language table 1250 indicates that multiple translation/transcription services are preferred, then the next highest priority factor is considered. In the present example, the context table 1210 is next consulted to determine which of the translation/transcription services identified by the language table 1250 as preferred should be used. For example, suppose that both the translation/transcription services S1 and S3 are specified as preferred by language table 1250. If the context table 1210 specifies that translation/transcription service S1 is preferred, but translation/transcription service S3 is not, then the translated/transcribed unit of speech from translation/transcription service S1 is used. This process may be repeated with additional factors with lower priority until a result from a particular translation/transcription service is selected. Alternatively, units of speech for which all of the confidence scores are below a specified threshold may be designated for supplemental processing, as described in more detail hereinafter.

As depicted in FIG. 14, resulting translation/transcription data 1162 includes translation/transcription data from all three translation/transcription services that is interleaved, although this is not required and may not occur in every situation. For example, in some situations a particular translation/transcription service may provide unexpectedly low accuracy across all units of speech for particular text or audio data, and in these situations, none of the results provided by the particular translation/transcription service may be used, even though, based upon the selection data, the particular translation/transcription service was expected to provide accurate results. In other situations, resulting translation/transcription data 1162 may include a large number of contiguous translated/transcribed units of speech from a first translation/transcription service, followed by a large number of contiguous translated/transcribed units of speech from a second translation/transcription service. This may occur, for example, if the first translation/transcription service provided accurate results for a particular context, speaker, language, etc., but the accuracy level decreased after a change in context, speaker, language, etc. At that point, a second translation/transcription service provided more accurate results, so the translated/transcribed units of speech from the second translation/transcription service were selected for inclusion in the resulting translation/transcription data. Thus, translation/transcription manager 1140 may at any time switch between translation/transcription services based upon the accuracy of the translated/transcribed results. In situations, resulting translation/transcription data 1162 may include translated/transcribed units of speech from only a single translation/transcription service, where the confidence scores for that translation/transcription service were the highest across all units of speech.

As depicted in FIG. 14, the confidence scores may for each translated/transcribed unit of speech may be included in resulting translation/transcription data 1162 and may be used during subsequent processing. For example, confidence scores may be displayed on a graphical user interface concurrent with the display of resulting translation/transcription data 1162 to provide a visual indication of the accuracy of translated/transcribed units of speech. Confidence scores may also be included in various types of documentation, such as a meeting summary or meeting transcript. Special visual effects, such as highlighting, formatting, etc., may be used to conspicuously identify particular units of speech that have a confidence score below a specified threshold, to trigger, for example, manual editing or special processing. For example, suppose that the confidence scores for a particular unit of speech from all of the translation/transcription services that were used are below a specified threshold. This may cause translation/transcription manager 1140 to designate the particular unit of speech for manual editing. According to one embodiment, translation/transcription manager 1140 provides a graphical user interface that allows manual editing of translation/transcription results and that includes visually identifying units of speech that have been designated for manual editing based upon confidence scores to improve accuracy. The results of the manual editing may be stored in learning data 1158 and included as an additional input to translation/transcription manager 1140 to improve the accuracy of future translations/transcriptions. Confidence scores may also be used by other applications to improve accuracy.

As depicted in FIG. 14, resulting translation/transcription data 1162 may have corresponding metadata that specifies or more attributes of resulting translation/transcription data 1162 such as the source of each of the units of speech, i.e., translation/transcription data 1172, 1182, or 1192, data size information, information about content, including context, speaker, location, etc. The metadata may be generated by translation/transcription services 1170, 1180, 1190, and/or by translation/transcription manager 1140, and stored as part of or separate from translation/transcription data 1172, 1182, or 1192 and resulting translation/transcription data 1162. Resulting translation/transcription data 1162 may be stored locally at translation/transcription server 1130 and/or stored in a location remote to translation/transcription server 1130. Once resulting translation/transcription data 1162 has been generated, the translation/transcription data used to generate resulting translation/transcription data 1162 may be deleted from translation/transcription data 1160 or retained for later use, depending upon a particular implementation.

The generation of resulting translation/transcription data may be performed in real-time as translation/transcription data is received from translation/transcription services or alternatively, after all of the processing has been performed by the translation/transcription services and all of the translation/transcription data has been received. For example, translation/transcription manager 1140 may generate resulting translation/transcription data 1162 in real-time as translation/transcription data 1172, 1182, 1192 is received from translation/transcription services 1170, 1180, 1190. Alternatively, translation/transcription manager 1140 may generate resulting translation/transcription data 1162 after all of translation/transcription data 1172, 1182, 1192 has been generated and received from translation/transcription services 1170, 1180, 1190.

D. Supplemental Processing

According to one embodiment, translation/transcription manager 1140 is configured to provide optional supplemental processing to improve accuracy. Continuing with the flow diagram 1300 of FIG. 13, in step 1314, translation/transcription manager 1140 performs supplemental processing on resulting translation/transcription data 1162 before it is supplied to requestor 1110. Supplemental processing may be performed on particular units of speech, or groups of units of speech (including all units of speech), to improve accuracy. Units of speech may be selected for supplemental processing based upon confidence scores. For example, according to one embodiment, units of speech having a confidence score below a specified threshold are selected for supplemental processing.

Supplemental processing may include different types of processing that may vary depending upon a particular implementation. For example, auto-correction may be used to process units of speech designated for supplemental processing. Auto-correction may be performed by one or more algorithms that are designed to make corrections based upon statistical modeling. Statistical modeling may be used to identify errors in units of speech, such as grammatical errors, improper structure, improper syntax, multiple nouns in a row, etc. The type of statistical modeling and the parameters for statistical modeling may be specified by the logic, heuristics, algorithms, etc., used to implement auto-correction, and they may change over time based upon user feedback, such as user corrections. The identified units of speech are then corrected based upon the results of the statistical modeling to improve accuracy.

According to one embodiment, auto-correction includes using known correct units of speech to correct and/or supplement units of speech that have been designated for supplemental processing. This may include determining particular known correct units of speech that are similar to the units of speech that have been designated for supplemental processing, and then updating the units of speech that have been designated for supplemental processing based upon the particular known correct units of speech. The particular known correct units of speech may be specified, for example, by one or more databases, dictionaries, etc.

The determination of similarity may be made using a wide variety of techniques that may vary depending upon a particular implementation. According to one embodiment, the determination of similarity is made using distance. Any type of heuristic and/or algorithm may be used to determine the distance between units of speech designated for supplemental processing and particular known correct units of speech, and embodiments are not limited to any particular heuristic and/or algorithm. Non-limiting examples include a Levenshtein distance, a Hamming distance (for units of speech of equal length) and a Jaro-Winkler distance. The distance or similarity thresholds used to trigger auto-correction may vary depending upon a particular implementation and may be specified by configuration data 150. Distance or similarity thresholds may be associated with different levels of auto-correction that are manually selectable and/or specified by configuration data 150. For example, a high level of auto-correction, i.e., more aggressive, may have a corresponding large distance, while a low level of auto-correction, i.e., less aggressive, may have a corresponding small distance. In addition, the statistical analysis used may consider other information to improve accuracy, such as surrounding units of speech, etc.

According to one embodiment, auto-correction includes making changes to units of speech based upon organization/industry-specific information that specifies commonly-used terms for an organization or industry. As used herein, the term "organization" refers to any organized group of people with a particular purpose. Examples of organizations include, without limitation, business entities, societies, schools, social groups, etc. Commonly-used terms for an organization may include, for example, the name of the organization, names of products and/or services provided by the organization, names of divisions, departments, projects, people, etc., within the organization. As used herein, the term "industry" refers to a particular form or branch of economic or commercial activity. Organization/industry-specific information may include "coined" terms that have a special meaning within a particular organization/industry, but not necessarily to other organizations/industries. Organization/industry-specific data 1154 may be maintained as part of configuration data 1150, or may be maintained separate from selection configuration 1150. Organization/industry-specific data 1154 may be initially manually created by a user, such as an administrative user, and then revised over time to further improve accuracy. Organization/industry-specific data 1154 may include standard terms that may be customized by particular organizations and/or industries.

According to one embodiment, statistical analysis is used to identify portions of units of speech, and/or entire units of speech, that are likely to be a commonly-used term for an organization or industry. This may include using one or more algorithms for calculating the distance, i.e., similarity, between a particular unit of speech, or a portion thereof, and one or more terms from organization/industry-specific data 1154. For example, suppose that a particular translated/transcribed unit of speech is "multi-function parade" and one of the organization-specific terms included in organization/industry-specific data 1154 is "multi-function peripheral." In this example, the term "peripheral" is misconstrued as "parade." Statistical analysis may determine that the distance between the units of speech "multi-function parade" and "multi-function peripheral" is so small, i.e., that the terms are so similar, that there is a high likelihood that the original spoken or written unit of speech was actually intended to be "multi-function peripheral," but because of limitations in the translation/transcription process, resulted in the translated/transcribed unit of speech "multi-function parade." In this situation, auto-correction replaces or corrects the translated/transcribed unit of speech "multi-function parade" with "multi-function peripheral" to improve accuracy.

As another example, a particular business organization may sell a product named the "Quick Draw Analyzer" that is incorrectly translated/transcribed as "Quick Drawn Analyzer," i.e., with an extra "n" at the end of the term "Draw." Statistical analysis may determine that the distance between the unit of speech "Quick Drawn Analyzer" and the name of the business organization's "Quick Draw Analyzer" product is so small, i.e., that the units of speech are so similar, that is highly likely that the translated/transcribed unit of speech "Quick Drawn Analyzer" was intended to be "Quick Draw Analyzer." In this situation, the translated/transcribed unit of speech "Quick Drawn Analyzer" is modified to "Quick Draw Analyzer" to improve accuracy.

As yet another example, the unit of speech "Ricoh," referring to the well-known international corporation, may be mistakenly translated/transcribed to "Rico" because of limitations in translation/transcription algorithms and/or training data. In this example, the letter "h" is left off the end of "Rico." Supplemental processing may determine that there is a very high likelihood, based upon organization-specific information, that the unit of speech "Rico" should instead be "Ricoh," and so during supplemental processing, the unit of speech "Rico" is changed to "Ricoh."

The auto-correction approaches described herein may be applied to portions of units of speech, or entire units of speech. This may include decomposing a unit of speech into its constituent components and then performing auto-correction on the constituent components, either alone or in groups. This may be particularly beneficial for large units of speech, i.e., units of speech that include a large number of words. Auto-correction may be performed on different combinations of constituent components of a unit of speech. For units of speech that include many words, decomposition may be performed iteratively until further decomposition is not possible. In addition, although embodiments are described herein in the context of performing supplemental processing on units of speech, or constituent components thereof, embodiments are not limited to these examples and supplemental processing may be applied across multiple units of speech, e.g., on groups of two or more adjacent units of speech. This may improve accuracy for units of speech that contain on a few words.

The metadata for resulting translation/transcription data 1162 may be updated to specify any changes made via supplemental processing. For example, the metadata may specify one or more units of speech that were modified or substituted, the prior values of the units of speech, timestamp information that specifies when the changes were made, etc.

Continuing with the flow diagram 1300 of FIG. 13, after optional supplemental processing has been performed in step 1314, in step 1316, translation/transcription manager 1140 provides resulting translation/transcription data 1162 to requestor 1110 as resulting translation/transcription data 1114. Requestor 1110 may present the resulting translation/transcription data 1114 in real-time, for example, during an electronic meeting. This may include playing translated speech through one or more speakers and/or displaying transcribed text on one or more displays. Alternatively, the translated and transcribed data may be included in post meeting documents, such as meeting notes and reports, and also saved for later processing. Although embodiments are described herein in the context of organization-specific information, embodiments are not limited to these examples and other types of information may be used to improve the accuracy of resulting translation/transcription data.

Using the approach described herein and depicted in the figures, translation/transcription manager 1140 selects multiple translation/transcription services that are most likely to provide accurate results for a particular situation, i.e., a particular set of factors. Translation/transcription manager 1140 then selectively uses the results provided by those translation/transcription services, on a unit of speech-by-unit of speech basis. The translation/transcription manager 1140 may also perform supplemental processing to further improve the accuracy of the resulting translation/transcription data. This provides translated/transcribed information with a higher level of accuracy that can be achieved using conventional approaches that employ a single translation/transcription service. In addition, the approach reduces the amount processing resources, storage resources, networking resources, network traffic, and/or time attributable to performing additional training of and re-running translation/transcription services. For example, generating more accurate resulting translation/transcription data using multiple translation/transcription services in a single iteration avoids expending computational and storage resources on additional iterations, and also reduces network traffic.

E. Multi-Language Electronic Meetings

The approaches described herein may be used to support electronic meetings in which the participants have at least two different native languages. Suppose that an electronic meeting includes two participants and the first meeting participant's native language is language A and the second participant's native language is language B. Suppose further that the electronic meeting is to be conducted in language A. In this example, while the second participant may be able to generally speak and understand language A, the second participant may have difficulty speaking particular words in language A, since language A is not the second participant's native language. In situations where these particular words are commands that are recognized by a computerized system, such as a content collaboration system, it may be difficult for the second participant to verbally command the system in language A by speaking the particular words. Such systems typically respond to spoken commands recognized from recorded audio data or meeting transcripts, and rely upon the commands being spoken within a specified tolerance of an expected pronunciation. The result is that mispronounced commands may not be recognized and acted upon by these systems.

According to one embodiment, these issues are addressed by an approach that generates command transcripts in multiple languages to allow participants to speak commands in their native language during electronic meetings. FIG. 15 is a block diagram that depicts an example arrangement 1500 on which an embodiment may be implemented. Arrangement 1500 includes two locations 1510, 1520 that correspond to participants of a meeting. Locations 1510, 1520 may represent physical locations, for example different offices within a business organization, with computer hardware and software that allows participants to participate in a meeting, such as an electronic collaboration meeting. Locations 1510, 1520 may each include hardware and/or software for recording audio of meetings to enable audio data for meetings may be generated at one or both of locations 1510, 1520. Example implementations of locations 1510, 1520 include, without limitation, client devices, nodes 104A-104N, etc. Arrangement 1500 may include other elements, such as collaboration servers, etc., which are not depicted in FIG. 15 for purposes of explanation.

Each location has a corresponding default language that is the native language of one or more participants at the location. The default language may be specified at each location by the participants, by a meeting organizer or an administrator, and default language is made known to translation/transcription server 1020/1130. For example, the default language for each location may be made known to translation/transcription server 1020/1130 by client device 1010, requestors 1110, 1120, or an administrator, and may be specified by configuration data 1150. In the example depicted in arrangement 1500, the meeting is conducted in English, the default language for location 1510 is English, and the default language for location 1520 is Japanese.

As depicted in FIG. 15, a meeting transcript is generated in English and is used, for example, to document the meeting, generate meeting summaries, etc. According to an embodiment, a command transcript is generated in each of the default languages for the meeting, which in the present example are English and Japanese. Thus, in the present example, when translation/transcription server 1020/1130 receives and processes a request to translate/transcribe data, translation/transcription server 1020/1130 generates a meeting transcript in English and command transcripts in both English and Japanese. For example, translation/transcription data 1160 and/or resulting translation/transcription data 1162 may include data that represents a meeting transcript in English and command transcripts in both English and Japanese. The transcription data is made available to a command processing system, for example, in a content collaboration system, for processing, so that commands may be recognized and acted upon in real-time during a meeting.

As used herein, the term "meeting transcript" refers to a text transcript of audio data for a meeting. A meeting transcript typically includes everything that was said during a meeting, to the extent that it can be determined from audio data for the meeting. A meeting transcript may also include metadata for the meeting that may vary depending upon a particular implementation. Examples of metadata include, without limitation, a name, location, start time, duration, attendees, agenda items or topics, and action items for the meeting. As used herein, the term "command transcript" refers to a text transcript of commands spoken during a meeting. A command transcript may include only commands spoken during a meeting, and may include other information, such as one or more portions (or all) of the conversations that occurred during the meeting. A command transcript may also include metadata for the meeting as previously described herein with respect to the meeting transcript. Command transcripts may be generated in a wide variety of ways that may vary depending upon a particular implementation, and embodiments are not limited to any particular approach for generating command transcripts. For example, a command transcript may be generated directly from audio data in the same manner as a meeting transcript. As another example, a command transcript may be generated from a meeting transcript by removing non-command information. Specified commands may be included in configuration data 1150 and text that is not one of the specified commands is removed from the meeting transcript data to generate a command transcript. According to one embodiment, the specified commands are recognizable by a content collaboration system. For example, the specified commands may include commands for planning/scheduling or starting a meeting, adding/changing agenda items, adding or removing participants, specifying action items, specifying content to be shared in a meeting, etc. One of the benefits of using command transcripts is that they may contain significantly less data than meeting transcripts and consequently, fewer computational resources and less time is required to process and store command transcripts compared to meeting transcripts. In addition, the user experience of manually reviewing a command transcript is greatly improved compared to looking for commands in a meeting transcript.

Meeting transcripts and command transcripts may be generated using a translation/transcription service that is selected for the particular combination of source and target languages. In the prior example in which the meeting is conducted in English, the default language for location 1510 is English, and the default language for location 1520 is Japanese, a first translation/transcription service may be used to generate the meeting transcript and the command transcript for location 1510 in English. Similarly, a second translation/transcription service may be used to generate the command transcript for location 1510 in Japanese. The first and second translation/transcription services may be the same or different, and are selected to provide the most accurate results. For example, referring to the language table 1250 of FIG. 12, translation/transcription service S2 may be used to generate the meeting transcript and the command transcript for location 1510 in English, while translation/transcription service S1 may be used to generate the command transcript for location 1520 in Japanese, since these services are known and/or expected to provide accurate results for the particular combination of source and target languages.

According to one embodiment, the translation/transcription services used to generate the meeting transcript and the command transcripts in the default languages may be dynamically changed over time. For example, a translation/transcription service currently being used may be changed if the confidence scores for the results no longer satisfy one or more specified thresholds. In this situation, an alternative translation/transcription service is selected that is expected to provide more accurate results. The change of a translation/transcription service may be made at any time, including during a meeting and/or after a meeting.

According to one embodiment, multiple translation/transcription services may be used to generate the meeting transcript and the command transcripts in the default languages. According to this embodiment, audio data is processed by multiple translation/transcription services and the translation/transcription service having the high level of accuracy, as determined by confidence scores, is used to generate command transcripts. The translation/transcription service may be dynamically changed over time as confidence scores change. For example, if the confidence scores for a translation/transcription service currently being used fall below a specified threshold, then transcription may be switched to a different translation/transcription service. Alternatively, multiple translation/transcription services may be used and the results combined using confidence scores, as previously described herein. Using multiple translation/transcription services may provide results with a higher level of accuracy than using a single translation/transcription service. Also, identifying units of speech for manual processing, supplemental processing and auto-correction techniques previously described herein are also applicable to generating command transcripts. According to one embodiment, multiple translation/transcription services are used and if the confidence scores for all of the multiple translation/transcription services do not satisfy a specified threshold, the results from multiple translation/transcription services that were used are included in the command transcript, the meeting transcript, or both the command transcript and the meeting transcript. This may be performed on a unit of speech-by-unit of speech basis. For example, suppose that three translation/transcription services are being used to process audio data and generate command transcripts. Suppose further that for a particular unit of speech, the confidence scores for all three translation/transcription services for the particular unit of speech are less than a specified threshold. According to one embodiment, more than one of the results from the three translation/transcription services, i.e., multiple versions of the results, are included in the command transcript, the meeting transcript, or both the command transcript and the meeting transcript. In the present example, this may include the results from two or three of the three translation/transcription services. Alternatively, the results from the top N highest scoring translation/transcription services are included in the command transcript. For example, suppose that the specified threshold is 76% and the confidence scores from the three translation/transcription services for the particular unit of speech are 71%, 34% and 58%, respectively. In this situation, the transcribed versions of the particular unit of speech from the first and third translation/transcription services are included in the command transcript, the meeting transcript, or both the command transcript and the meeting transcript. This may increase the likelihood that a command is recognized by a command processing system. Additional information may be included in the command transcript to conspicuously identify the particular unit of speech. For example, one or more special characters and/or special effects may be used to conspicuously identify the multiple versions of the particular unit of speech so that they may be readily identified by manual visual inspection.

Although embodiments are depicted in the figures and described herein in the context of two locations and two default languages, one of which is the same language as the language in which the meeting is conducted, embodiments are not limited to this example and are applicable to any number of locations and default languages. As one non-limiting example, the meeting transcript may be in a first language, the default language for location 1510 is a second language, and the default language for location 1520 is a third language. As another non-limiting example, suppose that arrangement 1500 included a third location with a default language of French. In this situation, translation/transcription server 1020/1130 generates a meeting transcript in English, and command transcripts in English, Japanese, and French.

According to an embodiment, real-time cross language support provides audio and/or text to participants in their default language. For example, referring to FIG. 15, audio data in English from location 1510 is translated and/or transcribed into Japanese when provided to location 1520. Similarly, audio data in Japanese from location 1520 is translated and/or transcribed into English when provided to location 1510. This may be done using particular translation/transcription services or multiple translation/transcription services, as previously described herein. The translated audio may be played, for example, via one or more speakers, and the resulting text from transcribed audio may be displayed on a user interface. This allows the participants to communicate in real-time using different languages and with more accurate translations/transcriptions using multiple translation/transcription services as described herein.

FIG. 16 is a flow diagram that depicts an approach for providing multi-language support for meetings in which the participants have at least two different native languages. For purposes of explanation and with reference to FIG. 11, it is presumed that requestor 1110 makes the request 1112 for transcription data to translation/transcription manager 1140, and that translation/transcription manager 1140 generates and provides the resulting translation/transcription data 1114 to requestor 1110. Requestor 1110 may be, for example, a collaboration client executing on a client device, or a collaboration server, that needs to have transcription data generated from meeting audio data.

In step 1602, a request is received to transcribe data. For example, translation/transcription manager 1140 receives, from requestor 1110, a request to transcribe data. The request identifies and/or includes audio data to be transcribed. The audio data may represent a portion of a meeting or an entire meeting. The request may also specify one or more languages for the transcribed data, and may also optionally specify the type of transcription data desired, e.g., a meeting transcription, command transcriptions, or both a meeting transcription and command transcriptions. For example, requestor 1110 may send a first request that represents the start of a stream of text or audio data, followed by multiple subsequent requests that represent chunks of text or audio data that comprise the stream.

In step 1604, translation/transcription manager 1140 processes the request and selects translation/transcription services to be used to process the text or audio data. As previously described, for each target language a single translation/transcription service may be selected that is expected to provide the most accurate results. Alternatively, multiple translation/transcription services may be selected and the results evaluated and selectively combined to provide the most accurate resulting transcription data, as previously described herein.

In step 1606, audio data is provided to the selected translation/transcription services for processing. In the present example, for purposes of explanation, it is presumed that translation/transcription manager 1140 provides the audio data, or a link to the audio data, to translation/transcription service 1170 for processing.

In step 1608, the selected translation/transcription service processes the audio data and generates and provides transcription data to translation/transcription manager 1140. In the present example, translation/transcription service 1170 processes audio data and generates translation/transcription data 1172.

In step 1610, translation/transcription data is received from the translation/transcription services. For example, translation/transcription manager 1140 receives translation/transcription data 1172 from translation/transcription service 1170. Translation/transcription manager 1140 may store translation/transcription data 1172 locally as translation/transcription data 1160, and later process as described in more detail hereinafter. After processing, translation/transcription data 1172 may be maintained on translation/transcription server 1130 or deleted, depending upon a particular implementation.

In step 1612, translation/transcription manager 1140 generates resulting translation/transcription data 1162 based upon the translation/transcription data 1172 received from translation/transcription service 1170. This may involve minimal processing if only a single translation/transcription service is used, as in the present example. If multiple translation/transcription services are used, then generating resulting translation/transcription data 1162 may be performed using confidence scores as previously described herein. Generating resulting translation/transcription data 1162 may include generating a meeting transcript, and also one or more command transcripts that have non-command data removed. In addition, since the resulting translation/transcription data 1162 does not include translation data per se, in this example, the resulting translation/transcription data 1162 may be considered to be transcription data.

In step 1614, translation/transcription manager 1140 optionally performs supplemental processing on resulting translation/transcription data 1162 before it is supplied to requestor 1110. Supplemental processing may be performed on any portion of, or all of, resulting translation/transcription data 1162 to improve accuracy, as previously described herein.

In step 1616, translation/transcription manager 1140 provides resulting translation/transcription data 1162 to requestor 1110 as resulting translation/transcription data 1114. Requestor 1110 may present and/or process the resulting translation/transcription data 1114 in real-time, for example, during an electronic meeting. This may include, for example, displaying the meeting transcript and/or the command transcripts. This may also include processing and taking actions based upon commands contained in the command scripts. For example, the command transcripts may be provided to a collaboration management process that requested the transcripts, and the collaboration management process in turn provides the command transcripts to the meeting equipment at locations 1510, 1520 so that appropriate action may be taken in response to the commands contained in the command transcripts.

IX. Person Detection, Person Identification and Meeting Start

Various approaches are provided for performing person detection and identification in conjunction with electronic meetings, both during meeting startup and ongoing meetings. As used herein, the term Interactive Whiteboard (IWB) appliance, also referred to as "interactive whiteboards," refers to electronic whiteboards that allow users to view and update content on a display.

A. Architecture

Figure 17A:
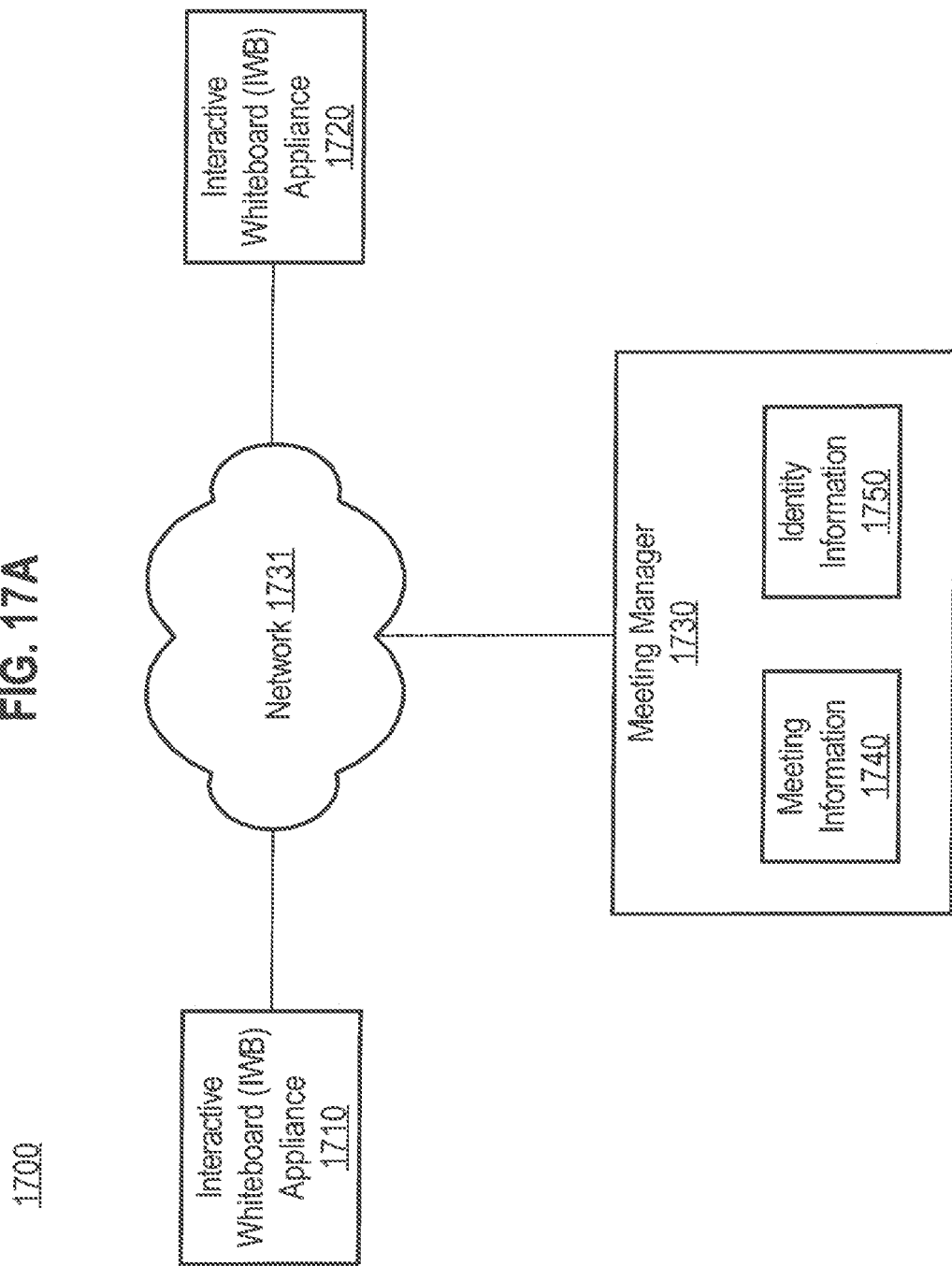
FIG. 17A is a block diagram that depicts an arrangement for managing electronic meetings.

FIG. 17A is a block diagram that depicts an arrangement 1700 for managing electronic meetings according to one embodiment. Arrangement 1700 includes IWB appliances 1710, 1720 and a meeting manager 1730, communicatively coupled via a network 1731. Network 1731 may be any combination of wired or wireless networks including, for example, LANs, WANs, packet-switched networks such as the Internet, etc. IWB appliances 1710, 1720 may be any type of IWB (similar or different) and the type of IWB may vary depending upon a particular implementation. Two IWB appliances are depicted and described herein for purposes of explanation only, and embodiments are applicable to any number of IWB appliances. Arrangement 1700 is not limited to the elements depicted in FIG. 17A, and may have fewer or more elements depending upon a particular implementation.

Figure 17B:
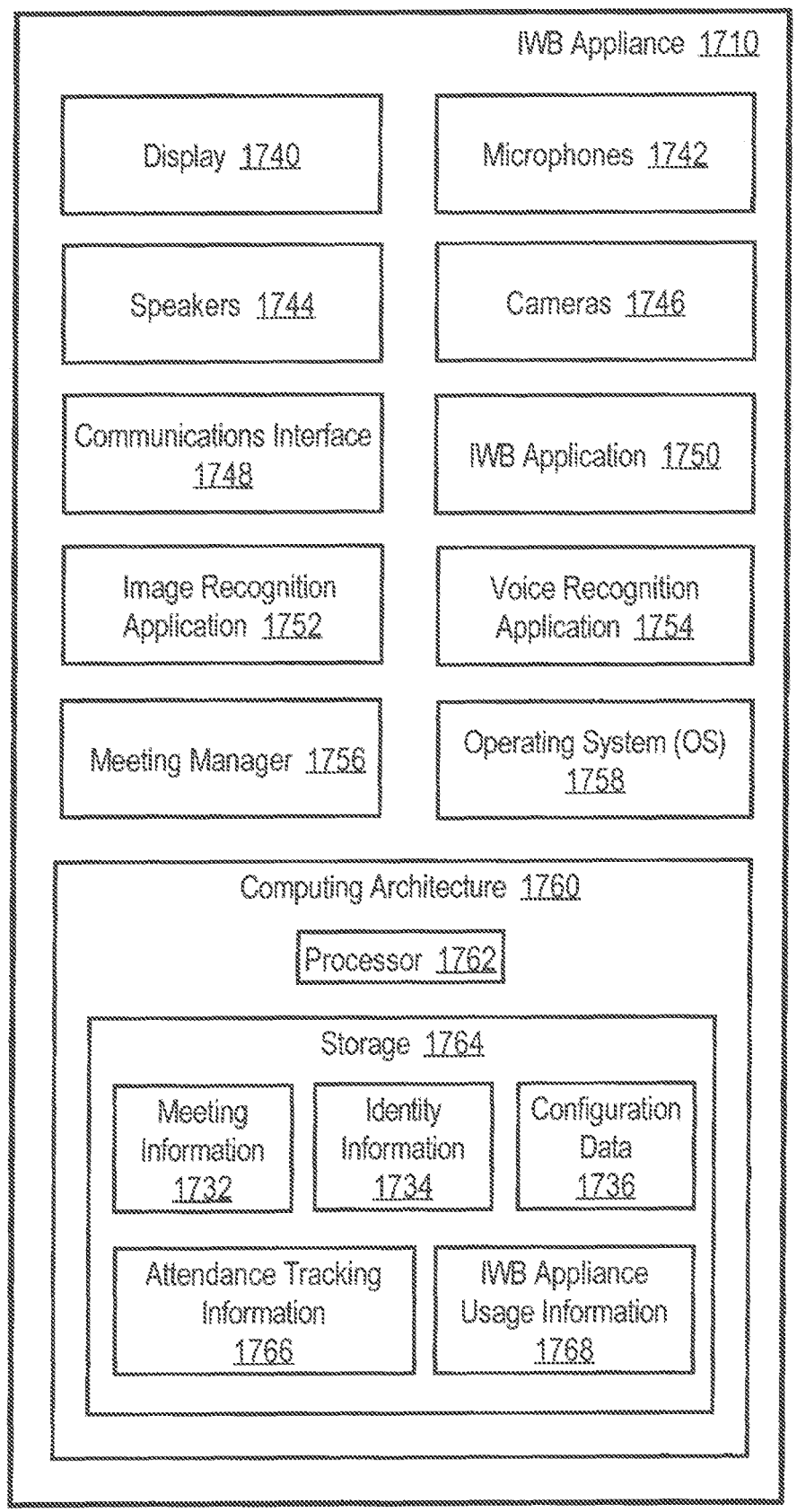
FIG. 17B is a block diagram that depicts an example implementation of an interactive whiteboard appliance.

IWB appliances 1710, 1720 may be implemented by any type of IWB appliance and may be configured with a wide variety of computer hardware, computer software, and other features that may vary depending upon a particular implementation and embodiments are not limited to IWB appliances 1710, 1720 have any particular configuration and features. FIG. 17B is a block diagram that depicts an example implementation of IWB appliance 1710, which may also be applicable to IWB appliance 1720. IWB appliance 1710 supports content collaboration sessions, such as videoconferencing sessions, whiteboard/desktop sharing sessions, etc., with other IWB appliances and other devices that support content collaboration sessions. Content collaboration sessions allow users to view, edit, and create content at either a single location or multiple locations.

In the example depicted in FIG. 17B, IWB appliance 1710 includes a display 1740, microphones 1742, speakers 1744, cameras 1746, a communications interface 1748, an IWB application 1750, a meeting manager 1756, an operating system (OS) 1758, and a computing architecture 1760. IWB appliance 1710 may include fewer or more components that those depicted in FIG. 1 and described herein, the particular components used may vary depending upon a particular implementation, and IWB appliance 1710 is not limited to a particular set of components or features. For example, IWB appliance 1710 may also include manual controls, such as buttons, slides, etc., not depicted in FIG. 1, for performing various functions on mobile device, such as powering on/off or changing the state of IWB applicant 1710 and/or display 1740.

Display 1740 may be implemented by any type of display that displays content, e.g., images, video, word processing documents, spreadsheets, etc., and other information to a user. Display 1740 may be capable of receiving user input and embodiments are not limited to any particular implementation of display 1740. As one non-limiting example, display 1740 may be a touchscreen display 1740 that both displays information to users and allows user to select graphical user interface objects. IWB appliance 1710 may have any number of displays 1740, of similar or varying types, located anywhere on IWB appliance 1710.

Microphones 1742 provide the capability for IWB appliance 1710 to detect and receive audio information from, for example, meeting participants and other persons. The audio information may represent, for example, sounds, music, spoken words, etc. Speakers 1744 provide the capability for IWB appliance 1710 to play audio information, such as sounds, music, speech, etc. Cameras 1746 provide the capability for IWB appliance 1710 to detect and acquire image and/or video information. Microphones 1742, speakers 1744, and cameras 1746 may be implemented by any number and type of microphones, speakers, and cameras, respectively, and embodiments are not limited to any particular type and number of microphones, speakers and cameras.

Communications interface 1748 may include computer hardware, software, or any combination of computer hardware and software to support wired and/or wireless communications between IWB appliance 1710 and other devices and/or networks, such as IWB appliance 1720 and meeting manager 1730, as well as client devices (not depicted). The particular components for communications interface 1748 may vary depending upon a particular implementation and embodiments are not limited to any particular implementation of communications interface 1748.

IWB appliance 1710 also includes one or more applications that execute on IWB appliance 1710 and may each be implemented by one or more processes. IWB application 1750 manages interactive content sessions, such as videoconferencing sessions, whiteboard/desktop sharing sessions, etc., with other devices, such as IWB appliance 1720. This may include the capability to interact with one or more collaboration servers. Image recognition application 1752 determines the similarity of images, for example, by comparing image data for a first image to image data for a second image. Voice recognition application 1754 determines the similarity of voice data, for example, by comparing voice data for a first set of one or more units of speech to a second set of one or more units of speech. IWB appliance 1710 may include additional applications and/or processes, that may vary depending upon a particular implementation.

Meeting manager 1756 may be implemented by one or more processes that manage electronic collaboration meetings both on IWB appliance 1710 and with other devices, such as IWB appliance 1720 and other devices. This may include initiating, managing and terminating electronic collaboration meetings.

Operating system (OS) 1758 executes on computing architecture 1760 and may be any type of operating system that may vary depending upon a particular implementation and embodiments are not limited to any particular implementation of OS 1758. OS 1758 may include multiple operating systems of varying types, depending upon a particular implementation, and may include one or more APIs that provide access to functionality offered by OS 1758.

Computing architecture 1760 may include various elements that may vary depending upon a particular implementation and IWB appliance 1710 is not limited to any particular computing architecture 1760. In the example depicted in FIG. 17B, computing architecture 1760 includes a processor 1762 and storage 1764. Processor 1762 may be implemented by any number and types of processors and storage 1764 may be implemented by any number and types of memories, including volatile memory and non-volatile memory, which may vary depending upon a particular implementation. Computing architecture 1764 may include additional hardware, firmware and software elements that may vary depending upon a particular implementation. According to one embodiment and as described in more detail hereinafter, storage 1764 includes local copies of meeting information 1732 that specifies information for one or more meetings and identity information 1734 that specifies information for one or more users. Storage 1764 may store other data of varying types, depending upon a particular implementation.

Meeting manager 1730 is an entity that manages meeting information for meetings conducted between IWB appliances 1710, 1720. Meeting manager 1730 may be implemented by computer hardware, computer software, or any combination of computer hardware and computer software. For example, meeting manager 1730 may be implemented by one or more processes executing on one or more computing elements. Meeting manager 1730 is depicted in FIG. 17A as a separate element for purposes of explanation only, and the functionality of meeting manager 1730 may be implemented on other elements, including IWB appliances 1710, 1720, client devices (not depicted), etc. Meeting manager 1730 manages information pertaining to electronic meetings on behalf of IWB appliances 1710, 1720. According to one embodiment, meeting manager 1730 manages meeting information 1732 that specifies information for one or more meetings and identity information 1734 that specifies information for one or more users. Meeting information 1732 and identity information 1734 may be maintained and managed in a wide variety of forms that may vary depending upon a particular implementation. For example, meeting information 1732 and identity information 1734 may be maintained as unstructured data in one or more files, or as structured data in one or more databases. Meeting manager 1730 may provide one or more APIs that allow IWB appliances 1710, 1720 and other client devices to access the functionality provided by meeting manager 1730. Meeting information 1732 may be initially obtained and updated from a meeting or calendar system.

B. Meeting Information

FIG. 17C is a block diagram that depicts example contents of meeting information 1732 in the form of a table, where each row corresponds to a particular electronic meeting. In the example depicted in FIG. 17C, meeting information 1732 includes a meeting ID, a meeting name, a meeting location, a date/time for the meeting, participants, and other information. The meeting ID may be any type of information, such as an alphanumeric string, that uniquely identifies an electronic meeting. The meeting name may be, for example, one or more words that describe an electronic meeting. The meeting location may be any information that specifies one or more physical locations for an electronic meeting, including multiple locations. For example, the specified locations may refer to meeting or conference rooms, etc. The participants information specifies one or more participants for each electronic meeting and participants may be indicated by name, user ID, etc. Other information may include any type of information about an electronic meeting, for example, a priority of an electronic meeting, whether the electronic meeting is public, private, has certain security restrictions, etc.

According to one embodiment, IWB appliance 1710 is registered as a user with a calendar service to allow IWB appliance 1710 to participate in electronic meetings in the same manner as users. This may require an administrator performing authentication, such as OAuth authentication, on behalf of IWB appliance 1710. In addition, other special settings may be made, for example, to allow IWB appliance 1710 to accept all meeting invitations by default. Once IWB appliance 1710 has been properly configured to use the calendar service, IWB appliance 1710 may be invited as an attendee of electronic meetings and given access to meeting content in the same manner as users.

According to one embodiment, IWB appliance 1710 is configured to support the Google Calendar API and a Google account is created and assigned to IWB appliance 1710. The Google account for IWB appliance 1710 may be configured to automatically accept meeting invitations. IWB appliance 1710 is also configured with the Google Chrome Web browser and an administrator logs into the Google account created and assigned to IWB appliance 1710 and sets Google Chrome as the default Web browser. An administrator user completes OAuth authentication on behalf of IWB appliance 1710 to allow IWB appliance 1710 to access the Google Calendar API. In response to a voice command, such as "Show Calendar," to display the Google calendar, IWB appliance 1710 launches the Google Chrome Web browser with a Google Calendar URL to allow a user to view scheduled meetings in the Google Calendar user interface. In response to a voice command, such as "Hide Calendar," to hide the Google calendar, IWB appliance 1710 closes the Google Chrome Web browser. With this implementation, meetings may be scheduled with IWB appliance 1710 in several ways. First, a user may log into Google Calendar using the account created for and assigned to IWB appliance 1710, create a new calendar entry, invite participants, and specify content items for the meeting. Second, a user may schedule a meeting by sending a meeting invitation to the account created for and assigned to IWB appliance 1710. For example, a user may create a new calendar entry and include, as one of the invitees, the email address of the account created for and assigned to IWB appliance 1710, and specify content items for the meeting.

C. Identity Information

FIG. 17C also depicts example contents of identify information 1734 in the form of a table, where each row corresponds to a particular person. In the example depicted in FIG. 17B, identity information 1734 includes a user ID, a name, image data, voice data, and other information. The user ID may be any data that uniquely identifies a person. Example implementations of a user ID include, without limitation, one or more alphanumeric strings. A person's name may also be an alphanumeric string, e.g., first name, first name and last initial, first name and last name, etc. Image data may be any type of image data that corresponds to the person and that may be used to identify the person. For example, image data may include one or more facial images, one or more full body images, etc., in various formats. Image data may be encoded in various forms. Image data may also include other data that represents a result of processing one or more images. This type of information may be helpful when attempting to match one or more images with image data contained in identity information 1734. For example, image data may include an image signature, the result of processing one or more images with one or more algorithms, hash functions, etc. Image data may be in any format that may vary depending upon a particular implementation, and embodiments are not limited to any particular format of image data. Example formats for image data include, without limitation, JPG, TIF, GIF, PNG, RAW, etc.

Voice data may be any type of audio data that corresponds to, and may be used to identify, a person. For example, voice data may represent one or more words spoken by an individual, such as their name or a spoken phrase. Voice data may be in any format that may vary depending upon a particular implementation, and embodiments are not limited to any particular format of voice data. Example formats for voice data include, without limitation, WMA, WAV, Real Audio (.ra, .ram, .rm), MIDI, Ogg, etc. Voice data may be used alone, or in combination with the image data, to identify a speaker.

Other information may include any type of information about a person, including metadata that may be used to identify a person detected within proximity to an IWB, as described in more detail hereinafter. Examples of other information include, without limitation, occupation, educational background, work history, accomplishments and achievements, personal interests, physical attributes, such as eye color, hair color, skin color, distinguishing marks, weight, size, etc. Other information may also include information about electronic devices, such as mobile phones, portable computers, personal digital assistants, tablet computing devices, wearable devices, etc., that belong to a person. For example, other information may specify a serial number, MAC address, or other identifying information for a mobile device that belongs to a person.

Identity information 1734 may be created and maintained in several different ways that may vary depending upon a particular implementation. For example, identity information may be manually created and maintained by an administrator of an organization, such as human resource personnel, during the hiring process or new employee orientation.

According to one embodiment, IWB appliance 1710 is configured with the capability to create and maintain identity information 1734. This includes collecting image and voice data in a passive mode and/or an active mode. IWB appliance 1710 may be configured to operate in the passive or active mode, for example, by an administrator, meeting organizer, etc. IWB appliance 1710 may include controls for selecting the passive mode, the active mode, or no data collection. The controls may also allow a user to select collection of image data, voice data, or both image data and voice data.

In the passive mode, IWB appliance 1710 acquires facial images of persons, such as meeting participants without the participation and/or knowledge of the persons. Facial images may be acquired using one or more cameras integrated into IWB appliance 1710, such as cameras 1746, or external sensors, as described in more detail hereinafter. IWB appliance 1710 then attempts to associate the acquired facial images with particular persons. For example, image recognition application 1752 may compare facial images acquired by IWB appliance 1710 to known facial images from databases, records, social media, etc. This may include using meeting participant information. For example, the participants of a meeting may be determined, and then the acquired facial images may be compared to facial images of meeting participants to associate the acquired facial images with a person.

Voice information may also be used to identify meeting participants, either alone or in combination with facial image information. For example, voice recognition application 1754 may compare voice characteristics of a person, for whom a facial image has been acquired, to known voice characteristics to determine and/or confirm a person that corresponds to the acquired facial images. For example, voice information may be used to confirm the identity of a meeting participant when the use of facial image information alone does not specify a minimum confidence threshold. Voice information may also be analyzed to detect clues, such as names of persons, unique words, etc., that may be used to associate an acquired facial image with a person.

Voice data may also be acquired in the passive mode. For example, IWB appliance 1710 may collect voice data via microphones 1742 and attempt to associate the acquired voice data with particular persons. After image data and/or voice data has been acquired via the passive mode and associated with a particular person, IWB appliance 1710 may update identity information 1734 with the new information, for example, by adding a row to the table.

In the active mode, IWB appliance 1710 acquires facial images of persons with their involvement and/or cooperation. For example, IWB appliance 1710 may prompt a person, via a visual and/or audible notification, to position themselves in front of a camera so that a facial image of the person may be acquired. This may be performed at any time, for example, prior to, during, or after a meeting. The position may be conspicuously identified, for example, by providing prompting and/or live image feedback via display 1740. For example, acquired images may be displayed in a particular location of display 1740 and continuously updated to allow a person to properly position themselves for a facial image to be acquired. This may include, for example, displaying a box or frame to visually indicate an image acquisition area, and displaying live images in the box or frame. After acquiring a facial image, IWB appliance 1710 may display the acquired image and allow the user to accept the acquired image or acquire another image. Once a facial image has been acquired and confirmed by the user, IWB appliance 1710 may query the user for information, such as a name, with which to associate the acquired facial image. The user may provide the information by typing or speaking their name, scanning a key card or badge, etc. IWB appliance 1710 may also query the user to speak their name, or one or more words, such as a phrase, to be stored as voice data for the user. After image data and/or voice data has been acquired via the active mode and associated with a particular person, IWB appliance 1710 may update identity information 1734 with the new information, for example, by adding a row to the table.

Although meeting information 1732 and identity information 1734 are depicted as having five entries each, embodiments are not limited to this example and may include any amount of data. In addition, meeting information 1732 and identity information 1734 may be sorted and/or indexed in various ways that may vary depending upon a particular implementation.

D. Meeting Arrangement

Figure 17D:
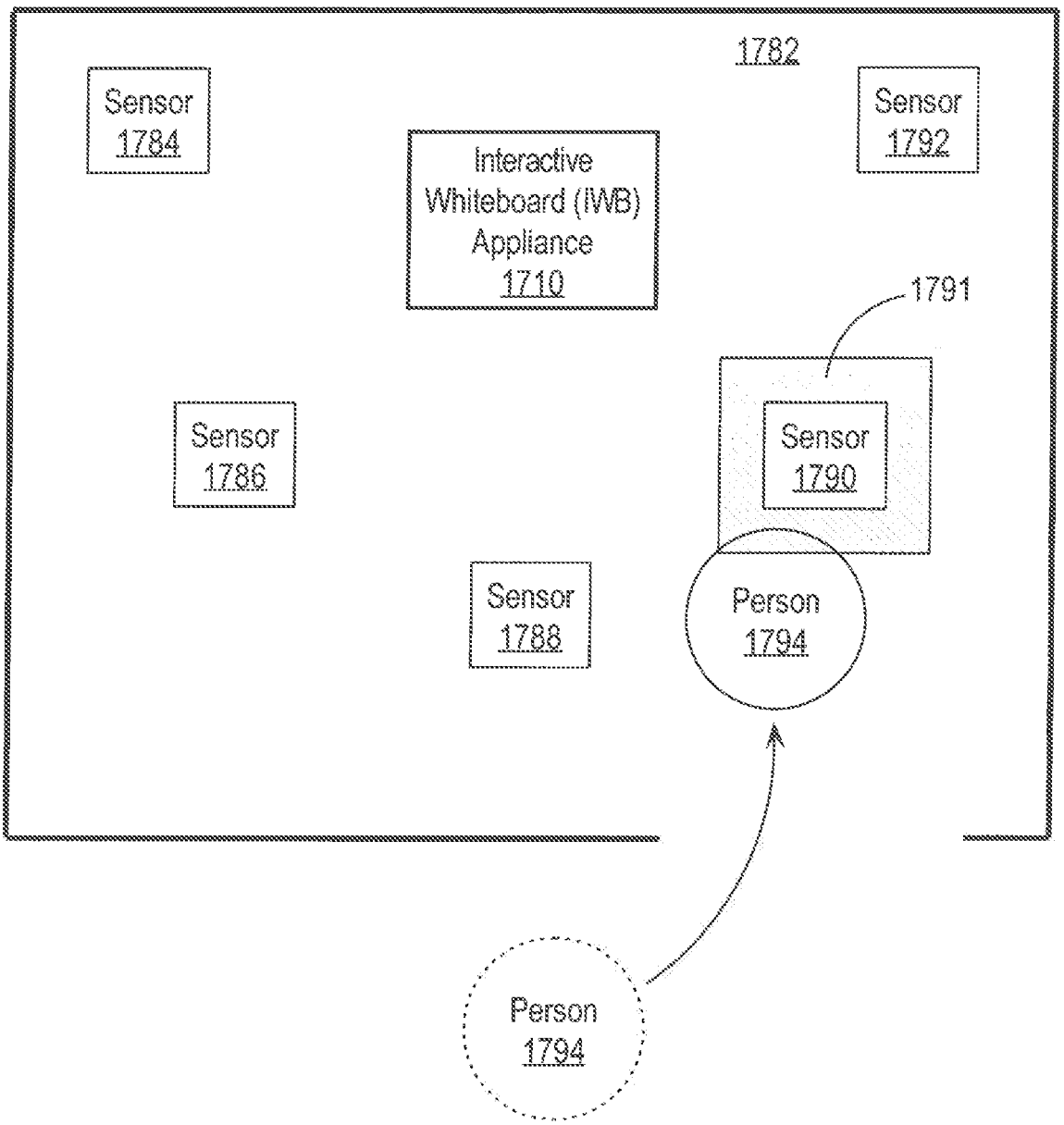
FIG. 17D is a block diagram that depicts a meeting arrangement that includes an interactive whiteboard appliance and sensors located within a room.

FIG. 17D is a block diagram that depicts a meeting arrangement 1780 that includes IWB appliance 1710 (FIG. 17A) and sensors 1784-1792 located within a room 1782. Room 1782 may be any type of room or defined area, such as a conference room, meeting room, office, presentation area, etc. Although embodiments are described in the context of a room 1782 for purposes of explanation, embodiments are not limited to this context and are applicable to embodiments without rooms per se.

Sensors 1784-1792 may be any type of sensor for detecting the presence and/or movement of a human being. Example implementations of sensors 1784-1792 include, without limitation, image sensors such as cameras and depth cameras, voice sensors, audio/video recorders, motion detectors, heat sensors, badge or card readers, scanners, etc. According to one embodiment, sensors 1784-1792 are capable of generating sensor data that represents the detected condition. For example, an audio sensor may generate audio data that represents detected speech and other sounds. As another example, an audio/video recorder may generate audio/video data that represents detected audio and video. As yet another example, a motion detector may generate motion detection data that represents a detected motion.

Sensors 1784-1792 may be implemented by any number of sensors that are located in any location with respect to IWB appliance 1710. For example, sensors 1784-1792 may be attached to walls, ceilings, floors, etc. According to one embodiment, sensors 1784-1792 are located in positions with respect to IWB appliance 1710 to be able to sense the presence and/or movement of human participants participating in an electronic meeting via IWB appliance 1710. For example, sensors 1784-1792 may be located close to where it is expected that participants of the electronic meeting using IWB appliance 1710 would be physically located. Although embodiments are described herein in the context of sensors 1784-1792 that are external to IWB appliance 1710 for purposes of explanation, embodiments are not limited to these examples and are applicable to sensors that are integrated into IWB appliance 1710.

According to one embodiment, IWB appliance 1710 is capable of receiving sensor data generated by sensors 1784-1792, for example, via wired or wireless connections. Sensor data may be provided directly from sensors 1784-1792 to IWB appliance 1710, or indirectly via, for example, a server or sensor data repository. The sensor data may indicate, for example, movement, the presence of a person, etc.

E. Person Detection, Person Identification and Meeting Start

FIG. 18 is a flow diagram 1800 that depicts an approach for using person detection and person identification in the context of an electronic meeting with an IWB appliance. For purposes of explanation, embodiments are described in the context of a single person being detected by a single sensor, but embodiments are not limited to this context and are applicable to any number of persons and sensors. Referring to FIG. 17D, it is presumed that no one is present in room 1782 when person 1794 moves from outside room 1782 to inside room 1782, and within sensing proximity of sensor 1790, i.e., within a sensing area 1791 of sensor 1790. It is further presumed that sensor 1790 generates sensor data in response to detecting person 1794.

In step 1802, an IWB appliance receives, from one or more sensors, sensor data that indicates the physical presence of a person within a specified distance of the IWB appliance. In the present example, IWB appliance 1710 receives sensor data from sensor 1790 indicating the physical presence of person 1794 within a specified distance of IWB appliance 1710. The sensor data may be, for example, badge/card reader data, motion detection sensor data, camera sensor data, and/or audio data, or any combination thereof, that indicates the presence or movement of a person.

For example, the sensor data may be motion detection sensor data that indicates movement of a person in the vicinity of IWB appliance 1710. As another example, the sensor data may be audio data generated in response to a person speaking. As a further example, the sensor data may be scan data generated in response to a user scanning a badge or card. As yet another example, the sensor data may indicate the presence of an electronic device, such as a mobile phone, that belongs to a particular person. Thus, the sensor data may indicate that a person is physically located within a specified distance of IWB appliance 1710.

According to one embodiment, IWB appliance 1710 may be configured to operate in a low power state, sometimes referred to as a "sleep state," and transition from the low power state to a higher power state in response to receiving the sensor data from sensor 1790. While operating in the low power state, IWB appliance 1710 continues to execute one or more processes that provide for the detection of sensor data received from sensors 1784-1792 while consuming less power than when operating in higher or more active operational states.

According to one embodiment, upon receiving sensor data indicating the presence of a person within a specified distance of IWB appliance 1710, IWB appliance 1710 prompts the person for additional information that may be used to identify the person. For example, in response to receiving sensor data indicating the presence of a person, IWB appliance 1710 may ask the person to identify themselves by speaking their name. This may be performed, for example, in situations where sensors 1784-1792 do not include the capability to capture image or video data and audio data is therefore needed to identify the person. As another example, IWB appliance 1710 may ask the person to position themselves in front of a camera so that a facial image of the person may be acquired. The position may be conspicuously identified, for example, by providing prompting and/or live feedback via display 1740. For example, video/image input received by one or more of sensors 1784-1792 may be displayed and continuously updated on display 1740 to allow the person to properly position themselves to allow a facial image to be acquired. This may include, for example, framing the facial image, using directional indicators, etc. Communications with persons may be made visually via display 1740, audibly via speakers 1744, or both.

In step 1804, the person is identified using the sensor data. The particular steps performed by IWB appliance 1710 to identify a person using sensor data may vary depending upon the type of sensor data that was received. According to one embodiment, IWB appliance 1710 uses the received sensor data and identity information 1734 to identify person 1794. IWB appliance 1710 may use the local identity information 1734 stored on IWB appliance 1710, identity information 1734 obtained from meeting manager 1730 via one or more requests to meeting manager 1730, or a combination thereof. Identifying a particular person using sensor data may include, for example, comparing one or more portions of the sensor data to image data and/or voice data included in identity information 1734. For example, image recognition application 1752 may compare one or more facial images included in the sensor data to facial images represented by the image data included in identity information 1734 to identify person 1794. As another example, voice recognition application 1754 may compare audio data included in the sensor data to voice data included in identity information 1734 to identify person 1794.

Various types of algorithms and heuristics, for example distance algorithms, may be used to compare sensor data to image data and/or voice data included in identity information 1734, and embodiments are not limited to any particular approach for comparing sensor data to data included in identity information 1734. For example, a distance, such as a Euclidean distance, may be determined between a facial image represented by sensor data and each facial image represented by the image data included in identity information 1734. The distances are compared and the facial image represented by the image data included in identity information 1734 that is closest to the facial image represented by sensor data is determined to be the most likely match. Distance thresholds may also be used. For example, a facial image represented by the image data included in identity information 1734 must be less than a threshold distance from the facial image represented by sensor data to be determined as a match. Distance-based approaches may also be used to compare audio data represented by sensor data to voice data in identity information 1734. According to another embodiment, if the sensor data is badge or card identification data, such as a number or code, IWB appliance 1710 contacts a badge or card database to obtain user information associated with the badge or card identification.

Although embodiments are depicted in the figures and described herein in the context of performing image and voice recognition using image recognition application 1752 and voice recognition application 1754, respectively, on IWB appliance 1710, embodiments are not limited to these examples and external image and voice recognition services may be used. For example, IWB appliance 1710 may use one or more cloud-based image and voice recognition services for processing image and voice data to identify meeting participants. This may include IWB appliance 1710 transmitting video and/or audio data to a third party service for analysis.

Sensor data may be processed prior to being used in comparisons. For example, sensor data may be converted into one or more target data formats prior to being used in comparisons. As another example, one or more portions of sensor data may be processed, e.g., via one or more algorithms, to create a face or voice signature, which is then compared to the image data and voice data included in identity information 1734. Multiple types of sensor data, and sensor data from any number of sensors, may be used to identify a person. For example, both video/image and audio data may be used to identify person 1794. Different combinations of sensor data may be used depending upon a particular implementation and/or situation, and embodiments are not limited to any particular combination of sensor data. In addition, other information from identity information 1734 may be used to identify person 1794. For example, suppose that after a comparison of a facial image included in received sensor data to the image data included in identity information 1734 that person 1794 is most likely to be User #1 or User #4, but the comparison scores alone are not definitive. Other information may include attributes of each user, e.g., hair color, eye color, height, weight, distinguishing features or marks, etc., that may be used to confirm that person 1794 is more likely to be User #1 than User #4. Upon identification of the person, IWB appliance 1710 may greet the person, for example, via one or more messages displayed on display 1740, one or more audible greetings via speakers 1744, or both. For example, in response to determining that a detected person is "Tom J.," IWB appliance 1710 may cause the message "Hello Tom J." to be displayed on display 1740. As another example, IWB appliance 1710 may cause the greeting "Hello Tom J." to be spoken/played via speakers 1744. The processing of sensor data, as described herein, may be performed by meeting manager 1756, one or more services external to IWB appliance 1710, or any combination thereof. For example, third party services, such as server-based or cloud-based services may be used to compare image data or voice data. According to one embodiment, after a person is identified using sensor data as described herein, an offer is provided for the identified person to update their corresponding image data and/or voice data. For example, IWB appliance 1710 may display a visual or audio notification on display 1740 with controls that allow the identified person to update their corresponding image data and/or voice data.

In some situations, it may not be possible to identify a person in the vicinity of an IWB appliance. This may occur, for example, if a good quality facial image of the person cannot be acquired and/or if background noise prohibits acquisition of good quality audio. According to one embodiment, if in step 1804 the person cannot be identified as described herein, the IWB appliance 1710 takes additional actions to attempt to identify the person. The additional actions may include, for example, querying the user to identify themselves. For example, IWB appliance 1710 may display a message on display 1740, or make an audio request via speakers 1744, for the unidentified person to identify themselves. This may include acquiring another, e.g., better quality, facial image and/or voice data as previously described herein.

In step 1806, a determination is made whether an electronic meeting involving IWB appliance 1710 is scheduled at or near the current time. This may be performed using meeting information 1732. For example, IWB appliance 1710 may compare the current time to meeting date/time information for each of the electronic meetings represented in meeting information 1732 to determine whether an electronic meeting involving IWB appliance 1710 is scheduled at or near the current time. According to one embodiment, if the current time is within a specified amount of time of a scheduled time for a particular electronic meeting, then the particular electronic meeting is considered to be scheduled at or near the current time. The specified amount of time may be configurable, for example, by an administrative user of IWB appliance 1710, and may be stored as part of configuration data 1736. IWB appliance 1710 may also query a meeting or calendar system to determine whether an electronic meeting involving IWB appliance 1710 is scheduled at or near the current time. For example, IWB appliance 1710 may use an API provided by a meeting or calendar system to obtain meeting information.

If the result of the determination is that an electronic meeting is not scheduled at or near the current time, then in step 1808, an offer is made to start a new electronic meeting. For example, IWB appliance 1710 may provide a visual and/or audible notification that includes an invitation to start a new electronic meeting, such as "There is no meeting scheduled at this time. Would you like to start a new meeting?" The identified person may accept or reject the offer to start a new electronic meeting and if accepted, may create a new meeting via display 1740, for example, by selecting graphical user interface objects and/or specifying information for the new electronic meeting via hand, stylus, or speech.

If, on the other hand, in step 1806 a determination is made that an electronic meeting is scheduled at or near the current time, then in step 1810, a determination is made to determine whether the identified person is a scheduled participant of the electronic meeting. For example, IWB appliance 1710 may consult the participant information for the electronic meeting from meeting information 1732 to determine whether the identified person is a scheduled participant of the electronic meeting.

If, in step 1810 the result of the determination is that the identified person is not a scheduled participant of the electronic meeting, then in step 1812, the identified person is notified of the scheduled electronic meeting. For example, IWB appliance 1710 may provide a visual and/or audible notification to the person that an electronic meeting is scheduled. The notification may provide details about the electronic meeting, such as the name of the electronic meeting, the start time, participants, other information, etc. A calendar may be displayed on display 1740 showing the scheduled meetings for a specified period of time, e.g., the current day, week, month, etc. Then, in step 1814, an offer to schedule a new electronic meeting is optionally made. For example, IWB appliance 1710 may provide a visual and/or audible notification that includes an invitation to schedule a new electronic meeting. This may include an identification of available meeting times, along with prompts for other information for the electronic meeting, such as a name, participants, agenda, content, etc., for the electronic meeting. The identified person may accept or reject the offer to start a new electronic meeting and if accepted, may create a new electronic meeting via display 1740, for example, by selecting graphical user interface objects and/or specifying information for the new electronic meeting via hand, stylus, or speech.

If, on the other hand in step 1810, a determination is made that the identified person is a participant of the electronic meeting, then in step 1816, a conclusion is made that the identified person intends to attend the electronic meeting. In addition, a notification may be made to welcome the identified person to the electronic meeting. For example, IWB appliance 1710 may provide a visual and/or audible notification the includes a greeting that welcomes the identified person to the electronic meeting, such as "Welcome John J. to the Alpha project design review meeting." The notification may provide details about the electronic meeting, such as the name of the electronic meeting, the start time, participants, other information, etc. Other actions may also be performed in response to determining that the identified person is a participant of the electronic meeting. For example, as described in more detail hereinafter, the other actions may include attendance tracking.

In step 1818, IWB appliance 1710 may optionally prepare for and/or start the electronic meeting. This may include querying the user whether to load and display content for the electronic meeting, such as an agenda for the electronic meeting, and/or one or more content items for the electronic meeting, such as a presentation, slide show, electronic documents, video clips, etc. This may include presenting on display 1740 the agenda and a list of content items for the electronic meeting, along with graphical user interface controls that allow the identified person to select particular items for viewing and/or editing. IWB appliance 1710 may also start a recording of the electronic meeting from which a meeting transcript may be generated. The meeting recording and/or the meeting transcript may be stored in storage 1764.

The aforementioned steps of flow diagram 1800 may be repeated for any number of persons, including persons who join an electronic meeting in progress. The process is also applicable to remote meeting attendees. IWB appliance 1710 may process sensor data collected at other locations in the same manner as described herein with respect to sensor data collected from sensors 1784-1792. In addition, IWB appliance 1710 may process image and voice data from meeting data, for example, from an audio/visual data stream for a videoconferencing session or content sharing session.

X. Attendance Tracking, Presentation of Content, Meeting Services, and Agenda Extraction The availability of sensor data to IWB appliances as previously described herein allows IWB appliances to provide other services including attendance tracking, presentation of content, meeting services, and agenda extraction.

A. Attendance Tracking

According to one embodiment, IWB appliances are configured to track the attendance of meeting attendees using sensor data. As depicted in FIG. 17B, IWB appliance 1710 maintains attendance tracking information 1766 that tracks the attendance of individual participants to particular electronic meetings. FIG. 19 is a block diagram that depicts an example implementation of attendance tracking information 1766 for an individual named "Tom J." In the example depicted in FIG. 19, each row of the table corresponds to a particular electronic meeting attended by "Tom J." and specifies information about the electronic meeting, such as a meeting ID, a meeting name, a location, a scheduled date/time for the electronic meeting, and one or more participation times of "Tom J." Attendance tracking information 1766 may include other information that may vary depending upon a particular implementation, and embodiments are not limited to the particular attendance tracking information 1766 depicted in FIG. 19.

The participation times are recorded in attendance tracking information 1766 by IWB appliance 1710 as a participant enters and leaves an electronic meeting based upon sensor data from sensors 1784-1792. For example, IWB appliance 1710 may record participation times in step 1816 of FIG. 18 after the person has been identified in step 1804 and determined to be a participant of an electronic meeting scheduled at or near the current time in step 1810. Participation times may specify the actual times that a participant arrived for and departed an electronic meeting, based upon sensor data, even if those times are outside the scheduled time for the electronic meeting. For example, suppose that an electronic meeting is scheduled for 10-11 am and a particular participant arrives early for the electronic meeting at 9:55 am. The participation start time may be the particular participant's actual arrival time of 9:55 am or alternatively, the meeting start time of 10 am. Similarly, if the particular participant stays beyond the scheduled meeting end time of 11 am to 11:05 am, the participation end time may be the particular participant's actual departure time of 11:05 am or alternatively, the meeting end time of 11 am, and the particular approach used may vary depending upon a particular implementation.

As previously described herein, participant identification may include the use of face recognition, voice recognition, positioning information, scanning information, etc. Participation times may include multiple intervals for a single electronic meeting. For example, Tom J attended Meeting #4 during two periods, 1:58-2:16 pm and 2:20-2:48 pm. The gap between the two periods, i.e., between 2:16 and 2:20 pm, may represent a time when Tom J left the electronic meeting, for example, to attend to another issue.

The end of an attendance time period may be determined in various ways that may vary depending upon a particular implementation. For example, one or more sensors may be located at an entrance to a meeting area so that the arrival and departure of participants may be explicitly determined. As another example, IWB appliance 1710 may detect, via sensor data from sensors 1784-1792, that a participant has ended participation in an electronic meeting, for example, by an explicit statement by the participant that is detected by IWB appliance 1710 via audio data. For example, the participant may make the statement, "Goodbye" or "See you later" that is detected by IWB appliance 1710 in audio data for the electronic meeting. As another example, where a particular participant was previously detected participating in an electronic meeting via sensor data from sensors 1784-1792, but is later not detected via sensor data, it may be presumed that the particular participant is no longer participating in the electronic meeting.

The example depicted in FIG. 19 is presented in the context of a single participant for purposes of explanation only, and attendance tracking information 1766 may include meeting tracking information for any number of participants. For example, attendance tracking information 1766 may include a separate table for each participant. Embodiments are not limited to the example depicted in FIG. 19, and attendance tracking information 1766 may different information depending upon a particular implementation. Attendance tracking information 1766 may be shared with and/or aggregated across other devices. For example, IWB appliance 1710 may share and/or aggregate attendance tracking information 1766 with IWB appliance 1720, meeting manager 1730, etc.

Figure 20:
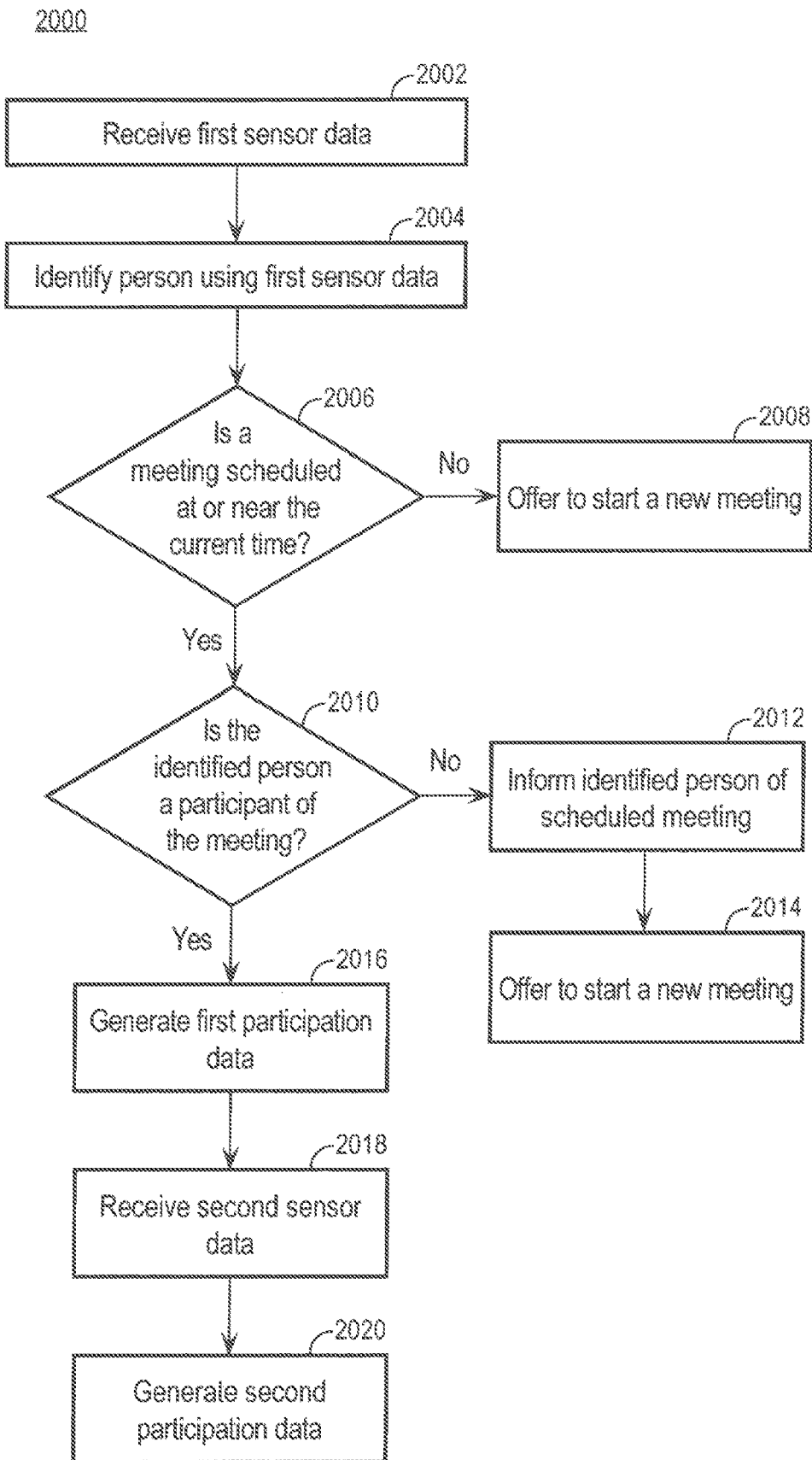
FIG. 20 is a flow diagram that depicts an approach for performing meeting attendance tracking for an interactive whiteboard appliance according to an embodiment.

FIG. 20 is a flow diagram 2000 that depicts an approach for performing meeting attendance tracking for an IWB appliance according to an embodiment. In step 2002, an IWB appliance receives, from one or more sensors, first sensor data that indicates the physical presence of a person within a specified distance of an IWB appliance. In the present example, IWB appliance 1710 receives first sensor data from sensor 1790 indicating the physical presence of person 1794 within a specified distance of IWB appliance 1710.

In step 2004, the person is identified using the first sensor data as previously described herein. In step 2006, a determination is made whether an electronic meeting involving IWB appliance 1710 is scheduled at or near the current time, as previously described herein. If the result of the determination is that an electronic meeting is not scheduled at or near the current time, then in step 2008, an offer is made to start a new electronic meeting, as previously described herein. If, on the other hand, in step 2006 a determination is made that an electronic meeting is scheduled at or near the current time, then in step 2010, a determination is made to determine whether the identified person is a scheduled participant of the electronic meeting, as previously described herein. If, in step 2010 the result of the determination is that the identified person is not a scheduled participant of the electronic meeting, then in step 2012, the identified person is notified of the scheduled electronic meeting, as previously described herein.

If, on the other hand in step 2010, a determination is made that the identified person is a participant of the electronic meeting, then a determination is made that the identified person has joined the electronic meeting and in step 2016, first participation data is generated to specify a time at which the identified person joined the electronic meeting. For example, IWB appliance 1710 may update attendance tracking information 1766 with a time, i.e., a start time, to specify the identified person's participation in the electronic meeting. Sometime later, in step 2018, second sensor data is received that indicates that the identified person is no longer attending the electronic meeting. The second sensor data may explicitly indicate that the identified person has departed room 1782. For example, one or more sensors, e.g., badge/card readers, cameras, etc., may detect the identified person leaving room 1782. In this manner, the second sensor data explicitly indicates that the identified person is no longer with the specified distance of IWB appliance 1710. According to another embodiment, the second sensor data may no longer detect the presence of the identified person, and a corresponding determination is made that the identified person is no longer within the specified distance of IWB appliance 1710.

In response to receiving the second sensor data that indicates that the identified person is no longer attending the electronic meeting, in step 2020, second participation data is generated to specify a time at which the identified person ended participation in the electronic meeting. For example, IWB appliance 1710 may update attendance tracking information 1766 with a time, i.e., an end time, to specify the identified person's participation in the electronic meeting.

B. Presentation of Content

As previously described herein, e.g., step 1818 of FIG. 18, IWB appliance 1710 may optionally prepare for and/or start a meeting, which may include obtaining and/or displaying content, referred to herein as "content items," for the meeting. Content items may include any type of content that may vary depending upon a particular implementation. Examples of content items include, without limitation, an agenda for the meeting, and/or one or more content items for the meeting, such as presentations, slide shows, electronic documents, video clips, etc.

IWB appliance 1710 may display representations of content items to provide a visual indication of the content items. For example, IWB appliance 1710 may display icons, symbols, images, such as thumbnail images, etc., to visually indicate content items that may be displayed for a meeting. IWB appliance 1710 may also display visual controls, in the form of graphical user interface objects, that allow a user to select one or more content items to be displayed for a meeting. A user may select a visual control by touching display 1740 with their finger, using a stylus, etc. According to one embodiment, IWB appliance 1710 provides voice command support for displaying content items. This may include voice commands for selecting and displaying content items. For example, a user may speak the command, "IWB Command: display Acorn presentation," and in response to the command, IWB appliance 1710 displays the Acorn presentation on display 1740. In this example, the spoken words "IWB Command" serve as a marker or flag in audio data to help IWB appliance 1710 recognize voice commands.

As another alternative, IWB appliance 1710 may automatically display content items for a meeting and may arrange the content items, or representations thereof, using tiling, separate windows, etc., to visually organize the content items in a manner that allows a user to recognize that multiple content items are available without necessarily being able to simultaneously view the entirety of all of the content items. IWB appliance 1710 may use intelligence to group content items having similar content. For example, content items that are related to a first subject are grouped together as a first set of content items and displayed in a first region of display 1740. Content items that are related to a second subject are grouped together as a second set of content items and displayed in a second region of display 1740 that is different than the first region, separate from the first set of content items. This may be implemented by displaying the actual content items, or representations thereof, as previously described herein. Content items, or representations thereof, may also be visually organized on display 1740 by date.

Content items may be obtained by IWB appliance 1710 from a wide variety of sources and/or locations that may vary depending upon a particular implementation and embodiments are not limited to any particular source. For example, IWB appliance 1710 may obtain content items locally from storage 1764, from servers, databases, etc., that are remote with respect to IWB appliance 1710, or any combination thereof. The source and/or location of content items may be specified by configuration data 1736. Any number of content items of the same or different types may be displayed for a meeting by IWB appliance 1710. According to one embodiment, IWB appliance 1710 is configured to satisfy any authentication and/or access requirements required to obtain content items. For example, IWB appliance 1710 may supply access credentials required to retrieve content items from a repository or database. In addition, IWB appliance 1710 may be configured to generate requests for content items that satisfy an API of a server, database, etc. For example, IWB appliance 1710 may generate and transmit an SQL query to a database management system to request one or more content items.

The determination of particular content items for a meeting may be made in different ways that may vary depending upon a particular implementation, and embodiments are not limited to any particular approach. For example, content items for a meeting may be specified by meeting information 1732. As another example, content items may be specified by calendar data that defines a meeting. For example, some electronic meeting/calendar systems allow content items to be specified when a meeting is created and the corresponding meeting invitations may identify or include the content items, e.g., as attachments, and/or include a link to content items. Thus, in situations where IWB appliance 1710 is an invited attendee, IWB appliance 1710 is able to determine and obtain the content items for the meeting based upon the meeting invitation and/or calendar data. This may include obtaining content items from a meeting invitation, from a calendaring system, or another location referenced by a meeting invitation.

For example, suppose that User A creates an electronic meeting in an electronic meeting system and invites User B and User C to the meeting. User A intends on conducting the electronic meeting in room 1782 using IWB appliance 1710, so User A also invites IWB appliance 1710 to the meeting. In this example, User A is the meeting organizer, but this is not required and users may create meetings on behalf of other users. Suppose further that User A specifies that Content Items #1 and #2 will be used for the meeting. In response to the creation of the meeting, the electronic meeting system sends an invitation to User B, User C, and IWB appliance 1710, for example, via email. The meeting invitation specifies details for the electronic meeting, such as date, time, location, etc., and also specifies that Content Items #1 and #2 will be used for the electronic meeting. Content Items #1 and #2 may be included as attachments to the meeting invitation, and/or may be specified by the meeting invitation. For example, the meeting invitation may identify Content Items #1 and #2, include a link to Content Items #1 and #2, e.g., to local storage 1764 or remote service, such as a cloud-based service, etc., or include Content Items #1 and #2 as attachments to the meeting invitation. Thus, in this example, User A, User B, User C, and IWB appliance 170 all have access to Content Items #1 and #2 via the meeting invitation.

Content items may be processed by IWB appliances in vary ways to facilitate processing by IWB appliances. For example, content items may be deconstructed from their original file formats to extract text and other content contained therein. Extracted content items may be stored as structured data, for example, in a database management system, or stored in meeting information 1732. As another example, the format of content items may be changed to accommodate additional processing, such as searching, etc.

C. Meeting Services

According to one embodiment, IWB appliances are configured to provide various meeting services. As used herein, the term "meeting service" refers to a service that has a correspondence to an electronic meeting conducted via an IWB appliance. Examples of meeting services include, without limitation, transportation, lodging, food, entertainment, technical support, and information requests, and embodiments are not limited to any particular types of meeting services. The correspondence between a meeting service and an electronic meeting may include any type of relationship between an electronic meeting and a meeting service. For example, a meeting service may be requested prior to, during, or after an electronic meeting, and considered to have a correspondence with the electronic meeting.

According to one embodiment, an IWB appliance is configured to provide voice command support for requesting meeting services. Once a IWB appliance has been activated, either manually or by detecting the presence of one or more persons, IWB appliance may begin monitoring audio data to detect voice commands pertaining to meeting services. For example, a user may request a meeting service by speaking the command, "IWB Command: meeting service, order two extra-large pepperoni pizzas." IWB appliance 1710 detects or recognizes the command in audio data and fulfills the requested meeting service. As another example, a user may speak the command, "IWB Command: taxi service." IWB appliance 1710 again recognizes the command in audio data and fulfills the requested meeting service. Meeting services may be requested at any time with respect to an electronic meeting, including before, during, and after an electronic meeting. For example, meeting services that are to be used during an electronic meeting may be requested before or during an electronic meeting. As another example, a car service that is to be used after an electronic meeting may be requested prior to, during, or after an electronic meeting. According to one embodiment, IWB appliances provide support for pre-ordering of meeting services. For example, suppose that an electronic meeting is schedule for 1-4 pm on a particular day. Suppose further that the meeting participants want to have a particular meeting service, such as food, etc., provided at 3 pm. A person may speak the command, "IWB Command: meeting service, order two extra-large pepperoni pizzas, deliver at 3 pm." As another example, a person may speak the command, "IWB Command: meeting service, taxi at 4:15 pm." In both examples, IWB appliance 1710 detects the spoken command and automatically fulfills the meeting service requests at the specified times.

IWB appliance 1710 may be configured to fulfill meeting service requests using specific services. For example, a user, such as an administrative user, may specify that IWB appliance 1710 uses a particular pizza parlor to fulfill orders for pizza, or a particular taxi service to fulfill requests for taxi service, and this information is stored in configuration data 1736. IWB appliances may be configured to generate and transmit requests for meeting services that comply with any requirements of third party services used to fulfill the requests, such as APIs, security, etc. For example, IWB appliance 1710 may be configured to generate and transmit a request for taxi service to a Web application for the taxi service, and the request satisfies any requirements of the Web application. IWB appliances may be configured to provide visual confirmation of requests for meeting services. For example, in response to detecting a command for a meeting service, IWB appliance 1710 may display a text message confirming the request for the meeting service. IWB appliance 1710 may also display options for a requested meeting service and/or request additional information from users. For example, suppose that IWB appliance 1710 is not configured with a particular service to fulfill requests for taxi services. In this situation, IWB appliance 1710 may display several car service options via display 1740 along with graphical controls for selecting a particular car service option. A user may select a graphical control that corresponds to a desired car service or speak a voice command to select the desired car service. In response to a user selecting a particular car service, IWB appliance 1710 may query the user whether the particular car service should be established as the default service for fulfilling future car service requests. In response to the user confirming this query, IWB appliance 1710 may update configuration data 1736 to specify that the particular car service should be used for future car service requests. IWB appliance 1710 may also provide status updates for requested meeting services, for example, via display 1740.

Meeting services may also be requested via an IWB appliance in other ways besides voice recognition. This may include using a live operator, a chat bot, an avatar, or any combination thereof. For example, IWB appliance 1710 may be configured to provide an audio or an audio/video connection with a live operator to allow a user to request meeting services from the live operator. Similarly, IWB appliance 1710 may establish a connection with a chat bot or an avatar, with whom users may make requests for meeting services.

Requests for meeting services involving information requests may include requests for information within an organization. For example, a user may request information from prior meetings, such as agendas, content items, action items, meeting transcripts, etc. Information requests may be provided to internal database management systems, business systems, or other enterprise systems for fulfillment. Results provides by these entities may be displayed on the display of an IWB appliance.

D. Agenda Extraction

According to one embodiment, IWB appliances are configured to provide various agenda-related services that may vary depending upon a particular implementation. For example, when content items for an electronic meeting include an agenda, an IWB appliance may display the agenda, or a representation thereof, in a conspicuous manner on display 1740 to call attention to the agenda.

IWB appliances may obtain agenda information from various sources. For example, IWB appliances may retrieve agendas attached to, or identified by, meeting invitations, calendar entries, etc. As another example, IWB appliances may retrieve agenda information by conducting keyword searches of meeting data or calendar data to search for agenda-related documents. For example, IWB appliance 1710 may search for the word "Agenda" in calendar/meeting entries, notes, description fields, etc., to locate agenda information. According to another embodiment, IWB appliances are configured to search for keywords contained in content items to search for agenda-related information. For example, IWB appliance 1710 may search for the word "Agenda" in content items, such as presentation documents, word processing documents, spreadsheet documents, etc., to identify meeting agenda information contained therein. This allows an IWB appliance to automatically detect and use an agenda, without a user having to manually specify agenda items. Once an agenda has been identified and retrieved, the agenda may be used with the other functionality described herein for agendas.

XI. Learning

According to one embodiment, IWB appliances are configured with the ability to perform learning based upon prior IWB appliance usage in the context of electronic meetings. This includes collecting IWB appliance usage information about the usage of IWB appliances before, during and after electronic meetings, analyzing the collected IWB appliance usage information to determine usage patterns, and taking one or more actions based upon the determined usage patterns.

IWB appliance usage information may include a wide variety of information that may vary depending upon a particular implementation, and embodiments are not limited to any particular type of information. Examples of IWB appliance usage information include, without limitation, IWB appliance settings, meeting information, such as meeting dates and times, meeting types, meeting organizers, attendees and content items used during electronic meetings, meeting services used before, during, and after electronic meetings, and control system settings for systems external to IWB appliances.

Figure 21:
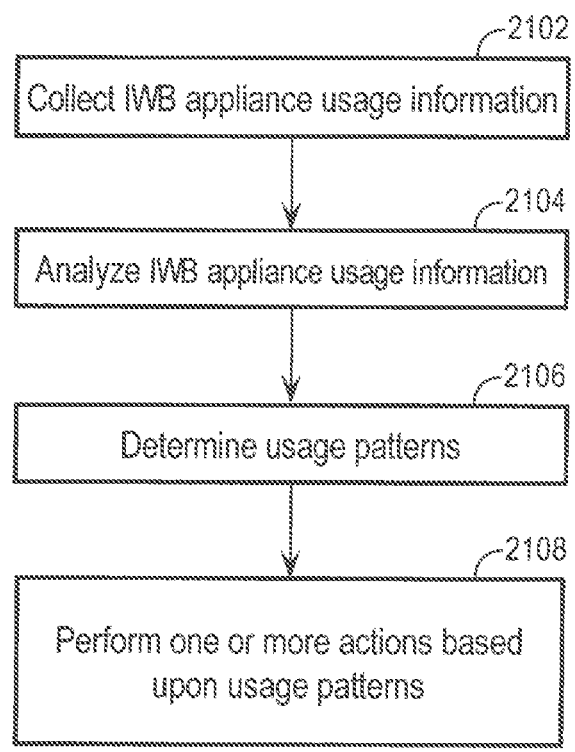
FIG. 21 depicts an example computer system upon which embodiments may be implemented.

FIG. 21 is a flow diagram 2100 that depicts an approach for improving the use of IWB appliances in the context of electronic meetings based upon IWB appliance usage information. In step 2102, IWB appliance usage information is collected. For example, IWB appliance 1710 may collect and store IWB appliance usage information 1768 (FIG. 17B) in the context of electronic meetings conducted via IWB appliance 1710.

Figure 22:
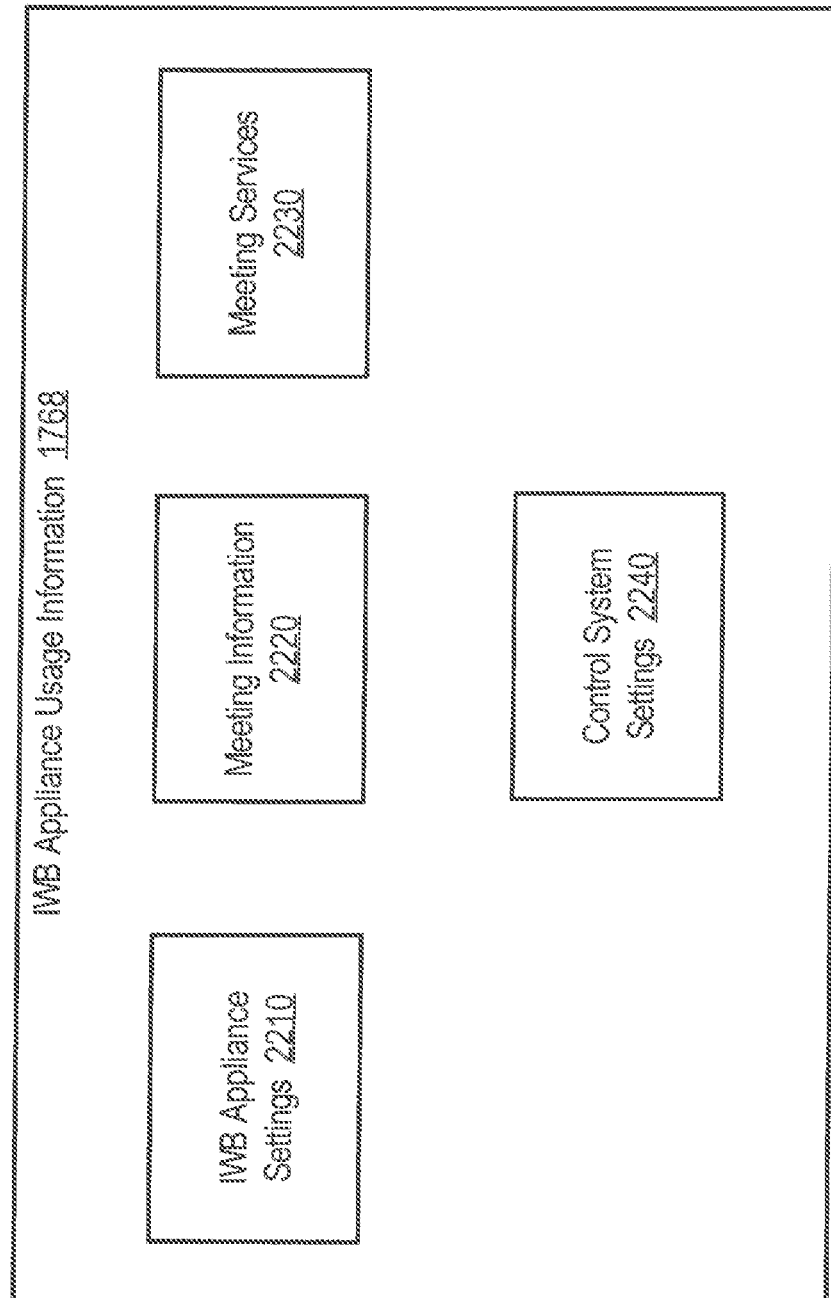
FIG. 22 is a block diagram that depicts example interactive whiteboard appliance usage information that includes interactive whiteboard appliance settings, meeting information, meeting services, and control system settings.

FIG. 22 is a block diagram that depicts example IWB appliance usage information 1768 that includes IWB appliance settings 2210, meeting information 2220, meeting services 2230, and control system settings 2240. IWB appliance settings 2210 specify IWB appliance settings used during electronic meetings including, without limitation, display settings (brightness, color, contrast, etc.), camera and microphone settings (volume, sensitivity, etc.), operating mode (local, local/remote), input/output settings, other configuration settings. Meeting information 2220 may specify meeting name, meeting type, meeting location, meeting dates and times, meeting organizers, attendees and content items used during electronic meetings. Meeting services 2230 may specify meeting services used before, during and after electronic meetings. Control system settings 2240 include settings for systems external to IWB appliances, such as temperature and lighting controls, video and audio system controls, etc.

According to one embodiment, IWB appliance usage information 1768 is generated based upon prior electronic meetings that have been conducted, and is then dynamically updated over time as additional electronic meetings are conducted. Meeting manager 1756 may examine and extract meeting information from meeting information 1732, attendance tracking information 1766, electronic calendaring and meeting systems, electronic meeting transcripts and notes, and use the extracted meeting information to generate meeting information 2220. IWB appliance usage information 1768 may be generated based upon any number of prior electronic meetings and, as discussed in more detail hereinafter, may provide better results for a greater number of prior electronic meetings and in particular, multiple occurrences of each of a plurality of electronic meetings. For example, multiple occurrences of a department meeting, a project meeting, an organization meeting, etc.

According to one embodiment, IWB appliance usage information 1768 specifies a plurality of IWB appliance usage values, where each IWB appliance usage value specifies an IWB appliance setting, meeting information, a meeting service, or a control system setting that was used for a prior electronic meeting. For example, an IWB appliance usage value may specify an IWB appliance setting in the form of a brightness setting of display 1740 that was used for a prior electronic meeting. As another example, an IWB appliance usage value may specify meeting information in the form of the organizer or a participant of a prior electronic meeting. As a further example, an IWB appliance usage value may specify a meeting service used in conjunction with, i.e., before, during or after, a prior electronic meeting. As another example, an IWB appliance usage value may specify a control system setting in the form of a lighting or temperature setting used for a prior electronic meeting.

In step 2104, the IWB appliance usage information is analyzed to determine usage patterns for the prior electronic meetings. IWB appliance usage information 1768 may be analyzed by IWB appliance 1710 or external to IWB appliance 1710. For example, one or more processes on IWB appliance 1710, such as meeting manager 1756, may analyze IWB appliance usage information 1768 to identify usage patterns for prior electronic meetings. This may include the use of any number and types of heuristics, algorithms, machine learning, artificial intelligence, etc. As another example, IWB appliance 1710 may provide one or more portions (or all) of IWB appliance usage information 1768 to one or more processes external to IWB appliance 1710, such as server-based, network-based, cloud-based services, including without limitation, artificial intelligence service 110, for analysis to identify usage patterns for prior electronic meetings.

Usage patterns may take different forms that may be specific to particular IWB appliance usage information. According to one embodiment, a usage pattern may be determined when the same IWB appliance usage value was used for two or more prior electronic meetings. The same IWB appliance usage value may apply to any type of IWB appliance usage information. For example, two or more prior electronic meetings involving IWB appliance 1710 may use one or more of the same IWB appliance settings, meeting days, times, location, attendees or content items, use the same meeting service(s), and/or the same control system settings. In addition, the two or more prior electronic meetings do not need to have been contiguous in time.

Consider the following example. Suppose that a user, User A, conducts two code design review meetings for the Pluto project using IWB appliance 1710. Suppose further that at least some of the IWB appliance usage information is the same across both meetings. For example, the meetings may have been conducted with the same IWB appliance settings, on the same day of the week, in the same location, with participants in common, with one or more content items in common, one or more meeting services in common, and/or one or more control system settings in common. In this example, one or more usage patterns are determined based upon the IWB appliance usage information that is common across the two code design review meetings.

In step 2106, one or more actions for a new electronic meeting using the IWB appliance are performed in response to the determined usage patterns. The one or more actions may include a wide variety of actions that may vary depending upon a particular implementation, and embodiments are not limited to any particular actions. According to one embodiment, when another occurrence of the electronic meeting involving IWB appliance 1710 is created and/or scheduled via IWB appliance 1710, one or more of the IWB appliance usage values from the identified usage patterns are used for the new electronic meeting.

For example, one or more IWB appliance settings that were used for multiple prior electronic meetings involving IWB appliance 1710 may be used for the new electronic meeting. As another example, recurring date, such as every Friday or the third Wednesday of each month, or participants of the prior electronic meetings may be automatically used for the new electronic meeting. As a further example, one or more content items, meeting services, or control system settings that were used in the prior electronic meetings may be automatically used for the new electronic meeting. The automatic inclusion of prior IWB appliance usage values for the new electronic meeting may be accomplished in many different ways that may vary depending upon a particular implementation and embodiments are not limited to any particular way. For example, when the new electronic meeting is created, the IWB appliance usage values from the prior electronic meetings may be designated as default values for the new electronic meeting and displayed to a user via display 1740. Graphical user interface controls may be displayed with the default values to allow the user to accept or change the default values. For example, when a user creates the new meeting, the participants of the prior electronic meetings may be listed as default attendees for the new electronic meeting and graphical user interface controls displayed adjacent each default attendee to allow the user to accept or reject each of the default attendees. Selecting a graphical user interface control to accept a particular default attendee causes the particular default attendee to be confirmed as an intended participant of the new electronic meeting and may cause, for example, a meeting invitation to be generated and transmitted to the particular default attendee, e.g., using the email address of the default attendee. As an alternative to automatically including IWB appliance usage information values for new electronic meetings, IWB appliance usage information values that are identified in the usage patterns may be provided as suggestions to users, and users are allowed to confirm or reject the suggestions. For example, participants that participated in the prior electronic meetings may be presented on display 1740 of IWB appliance 1710, or other calendar/meeting scheduling processes, as suggested participants, along with graphical user interface controls that allow a user to confirm or reject each of the suggested participants. IWB appliance usage values may be used as default or suggested values on a value-by-value basis. For example, IWB appliance settings values from prior electronic meetings may be used as default values for the new electronic meeting, while meeting attendees from the prior electronic meetings may be used as suggested attendees for the new electronic meeting.

The use of IWB appliance settings from prior electronic meetings is not limited to the context of creating a new meeting, and may be used in other ways. According to an embodiment, at any time during or after an electronic meeting, an IWB appliance may, upon determining usage patterns for prior electronic meetings, suggest a new electronic meeting based upon the usage patterns for the prior electronic meetings. For example, upon determining a usage pattern that a particular electronic meeting using IWB appliance 1710 occurs on every Friday morning from 10-11 am and includes particular content items, such as a requirements specification, IWB appliance 1710 may display a message asking whether to automatically create a next occurrence of the electronic meeting for the next Friday at 10-11 am, and including the particular content items, i.e., the requirements specification. IWB appliance 1710 may include graphical user interface controls that allow a user to confirm or reject the proposed new electronic meeting, and may also include graphical user interface controls for automatically creating multiple recurring meetings every Friday from 10-11 am, with the particular content items.

The learning techniques described herein provide a novel and favorable user experience by providing default and/or suggested values for new electronic meetings using IWB appliances based upon prior electronic meetings conducted with the IWB appliances. The learning techniques also reduce the amount of computational and storage resources consumed by IWB appliances.

XII. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 23:
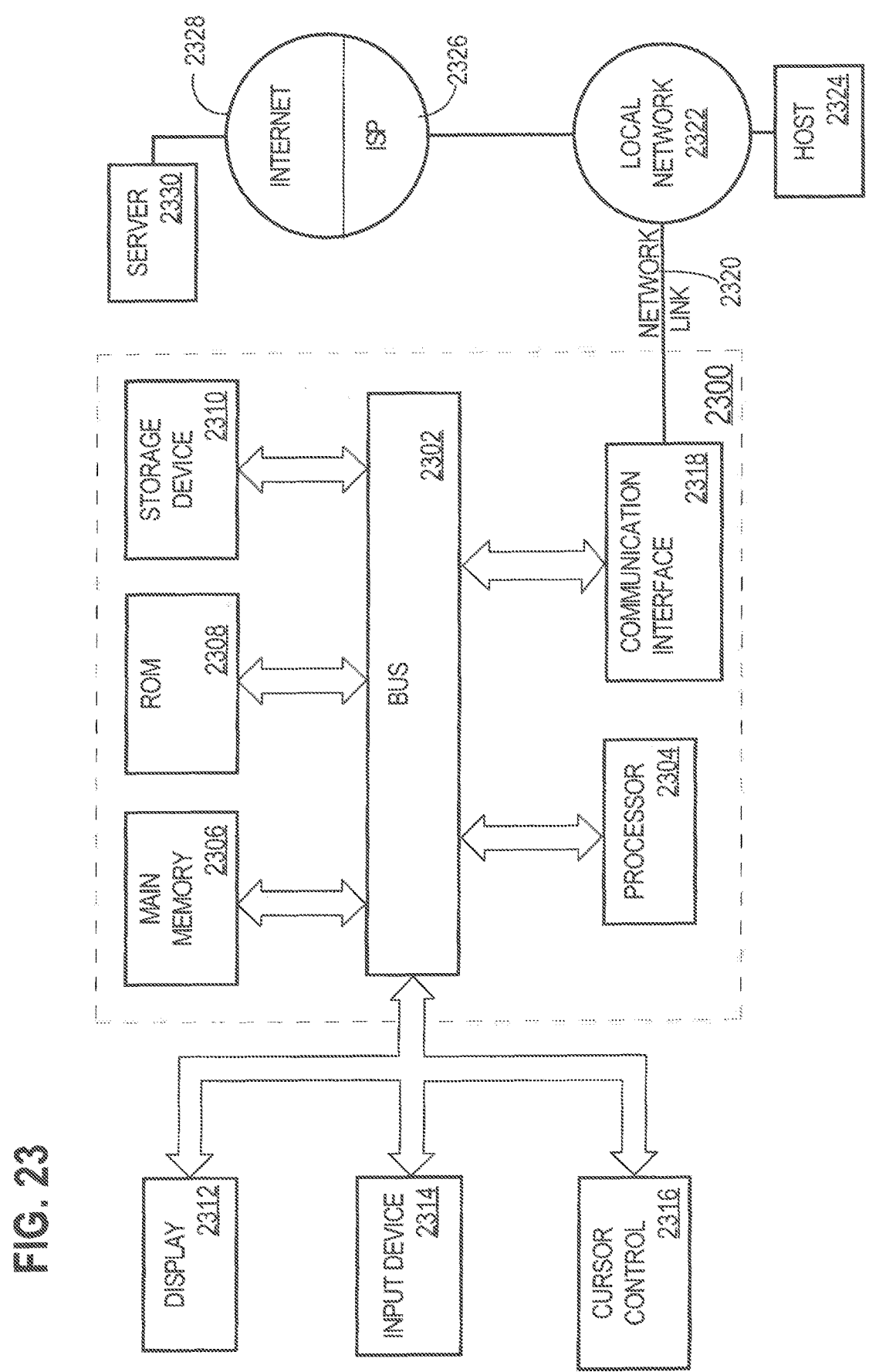
FIG. 23 is a block diagram that depicts an example computer system upon which embodiments may be implemented.

FIG. 23 is a block diagram that depicts an example computer system 2300 upon which embodiments may be implemented. Computer system 2300 includes a bus 2302 or other communication mechanism for communicating information, and a processor 2304 coupled with bus 2302 for processing information. Computer system 2300 also includes a main memory 2306, such as a random-access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. Although bus 2302 is illustrated as a single bus, bus 2302 may comprise one or more buses. For example, bus 2302 may include without limitation a control bus by which processor 2304 controls other devices within computer system 2300, an address bus by which processor 2304 specifies memory locations of instructions for execution, or any other type of bus for transferring data or signals between components of computer system 2300.

An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

Computer system 2300 may implement the techniques described herein using customized hard-wired logic, one or more ASICs or FPGAs, firmware and/or program logic or computer software which, in combination with the computer system, causes or programs computer system 2300 to be a special-purpose machine. According to one embodiment, those techniques are performed by computer system 2300 in response to processor 2304 processing instructions stored in main memory 2306. Such instructions may be read into main memory 2306 from another non-transitory computer-readable medium, such as storage device 2310. Processing of the instructions contained in main memory 2306 by processor 2304 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 2300, various computer-readable media are involved, for example, in providing instructions to processor 2304 for execution. Such media may take many forms, including but not limited to, non-volatile and volatile non-transitory media. Non-volatile non-transitory media includes, for example, optical or magnetic disks, such as storage device 2310. Volatile non-transitory media includes dynamic memory, such as main memory 2306. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 2304. For example, the instructions may initially be stored on a storage medium of a remote computer and transmitted to computer system 2300 via one or more communications links. Bus 2302 carries the data to main memory 2306, from which processor 2304 retrieves and processes the instructions. The instructions received by main memory 2306 may optionally be stored on storage device 2310 either before or after processing by processor 2304.

Computer system 2300 also includes a communication interface 2318 coupled to bus 2302. Communication interface 2318 provides a communications coupling to a network link 2320 that is connected to a local network 2322. For example, communication interface 2318 may be a modem to provide a data communication connection to a telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318. The received code may be processed by processor 2304 as it is received, and/or stored in storage device 2310, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    one or more processors; and
    one or more memories storing instructions which, when processed by the one or more processors, cause:
        receiving, over one or more communications networks from a requestor device, a request to generate a transcript of audio data for a meeting,
        in response to receiving, over one or more communications networks from a requestor device, the request to generate a transcript of audio data for a meeting, processing the audio data and generating a meeting transcript for the meeting in a first language, a first command transcript for the meeting in the first language, and a second command transcript for the meeting in a second language that is different than the first language by:
            providing the audio data for the meeting to two or more translation/transcription services selected from a plurality of translation/transcription services,
            receiving, from each translation/transcription service from the two or more selected translation/transcription services, transcription data that includes a plurality of units of speech and a plurality of confidence scores for the plurality of units of speech, determining whether the confidence scores from each translation/transcription service from the two or more selected translation/transcription services for a particular unit of speech for the first command transcript do not satisfy a specified threshold, in response to determining that the confidence scores from each translation/transcription service from the two or more selected translation/transcription services for a particular unit of speech for the first command transcript do not satisfy a specified threshold, including in one or more of the first command transcript or the meeting transcript, multiple versions of the particular unit of speech from each translation/transcription service from the two or more selected translation/transcription services, providing, over the one or more communications networks to the requestor device, the meeting transcript for the meeting in the first language, the first command transcript for the meeting in the first language and the second command transcript for the meeting in the second language that is different than the first language.

2. The apparatus of claim 1, wherein the meeting transcript in the first language includes non-command text that is not included in either the first command transcript for the meeting in the first language or the second command transcript for the meeting in the second language that is different than the first language.

3. The apparatus of claim 1, wherein the first command transcript and the second command transcript each include one or more specified commands that are recognizable by a command controller of a content collaboration system.

4. The apparatus of claim 1, wherein the processing the audio data and generating a meeting transcript for the meeting in a first language, a first command transcript for the meeting in the first language, and a second command transcript for the meeting in a second language that is different than the first language includes:

selecting, from a plurality of translation/transcription services based upon the first language, a first translation/transcription service to generate the meeting transcript and the first command transcript in the first language, selecting, from the plurality of translation/transcription services based upon the second language, a second translation/transcription service to generate the second command transcript in the second language, transmitting to the first translation/transcription service a request to process the audio data and generate the meeting transcript and the first command transcript in the first language, and transmitting to the second translation/transcription service a request to process the audio data and generate the second command transcript in the second language.

5. The apparatus of claim 4, wherein the one or more memories store additional instructions which, when processed by the one or more processors, cause:

determining that one or more confidence scores for results from the first translation/transcription service in generating at least a portion of the meeting transcript and the first command transcript in the first language do not satisfy one or more specified thresholds, and in response to determining that the one or more confidence scores for results from the first translation/transcription service in generating at least a portion of the meeting transcript and the first command transcript in the first language do not satisfy the one or more specified thresholds:

selecting, from a plurality of translation/transcription services based upon the first language, a third translation/transcription service to generate the meeting transcript and the first command transcript in the first language, wherein the third translation/transcription service is different than the first translation/transcription service, and transmitting to the third translation/transcription service a request to process the audio data and generate the meeting transcript and the first command transcript in the first language.

6. The apparatus of claim 1, wherein the processing the audio data and generating a meeting transcript for the meeting in a first language, a first command transcript for the meeting in the first language, and a second command transcript for the meeting in a second language that is different than the first language includes:

providing the audio data for the meeting to two or more translation/transcription services selected from a plurality of translation/transcription services, receiving, from each translation/transcription service from the two or more selected translation/transcription services, transcription data that includes a plurality of units of speech and a plurality of confidence scores for the plurality of units of speech, generating, based upon one or more selection criteria that include confidence scores, resulting transcription data that includes a plurality of units of speech selected from the transcription data received from the two or more selected translation/transcription services, and providing, over the one or more communications networks to the requestor device, the resulting transcription data.

7. The apparatus of claim 1, wherein a different translation/transcription service, from the two or more selected translation/transcription services, is used to generate the meeting transcript and the first command transcript.

8. The apparatus of claim 1, wherein the one or more memories store additional instructions which, when processed by the one or more processors, cause storing in the first command transcript, data that conspicuously identifies the versions of the particular unit of speech from each translation/transcription service from the two or more selected translation/transcription services.

9. One or more non-transitory computer-readable media storing instructions which, when processed by one or more processors, cause:

receiving, by an apparatus over one or more communications networks from a requestor device, a request to generate a transcript of audio data for a meeting, in response to receiving, over one or more communications networks from a requestor device, the request to generate a transcript of audio data for a meeting, processing the audio data and generating a meeting transcript for the meeting in a first language, a first command transcript for the meeting in the first language, and a second command transcript for the meeting in a second language that is different than the first language by:

providing the audio data for the meeting to two or more translation/transcription services selected from a plurality of translation/transcription services, receiving, from each translation/transcription service from the two or more selected translation/transcription services, transcription data that includes a plurality of units of speech and a plurality of confidence scores for the plurality of units of speech, determining whether the confidence scores from each translation/transcription service from the two or more selected translation/transcription services for a particular unit of speech for the first command transcript do not satisfy a specified threshold, in response to determining that the confidence scores from each translation/transcription service from the two or more selected translation/transcription services for a particular unit of speech for the first command transcript do not satisfy a specified threshold, including in one or more of the first command transcript or the meeting transcript, multiple versions of the particular unit of speech from each translation/transcription service from the two or more selected translation/transcription services, providing, over the one or more communications networks to the requestor device, the meeting transcript for the meeting in the first language, the first command transcript for the meeting in the first language and the second command transcript for the meeting in the second language that is different than the first language.

10. The one or more non-transitory computer-readable media of claim 9, wherein the meeting transcript in the first language includes non-command text that is not included in either the first command transcript for the meeting in the first language or the second command transcript for the meeting in the second language that is different than the first language.

11. The one or more non-transitory computer-readable media of claim 9, wherein the first command transcript and the second command transcript each include one or more specified commands that are recognizable by a command controller of a content collaboration system.

12. The one or more non-transitory computer-readable media of claim 9, wherein the processing the audio data and generating a meeting transcript for the meeting in a first language, a first command transcript for the meeting in the first language, and a second command transcript for the meeting in a second language that is different than the first language includes:

selecting, from a plurality of translation/transcription services based upon the first language, a first translation/transcription service to generate the meeting transcript and the first command transcript in the first language, selecting, from the plurality of translation/transcription services based upon the second language, a second translation/transcription service to generate the second command transcript in the second language, transmitting to the first translation/transcription service a request to process the audio data and generate the meeting transcript and the first command transcript in the first language, and transmitting to the second translation/transcription service a request to process the audio data and generate the second command transcript in the second language.

13. The one or more non-transitory computer-readable media of claim 12, further comprising additional instructions which, when processed by the one or more processors, cause:

determining that one or more confidence scores for results from the first translation/transcription service in generating at least a portion of the meeting transcript and the first command transcript in the first language do not satisfy one or more specified thresholds, and in response to determining that the one or more confidence scores for results from the first translation/transcription service in generating at least a portion of the meeting transcript and the first command transcript in the first language do not satisfy the one or more specified thresholds:

selecting, from a plurality of translation/transcription services based upon the first language, a third translation/transcription service to generate the meeting transcript and the first command transcript in the first language, wherein the third translation/transcription service is different than the first translation/transcription service, and transmitting to the third translation/transcription service a request to process the audio data and generate the meeting transcript and the first command transcript in the first language.

14. The one or more non-transitory computer-readable media of claim 9, wherein the processing the audio data and generating a meeting transcript for the meeting in a first language, a first command transcript for the meeting in the first language, and a second command transcript for the meeting in a second language that is different than the first language includes:

providing the audio data for the meeting to two or more translation/transcription services selected from a plurality of translation/transcription services, receiving, from each translation/transcription service from the two or more selected translation/transcription services, transcription data that includes a plurality of units of speech and a plurality of confidence scores for the plurality of units of speech, generating, based upon one or more selection criteria that include confidence scores, resulting transcription data that includes a plurality of units of speech selected from the transcription data received from the two or more selected translation/transcription services, and providing, over the one or more communications networks to the requestor device, the resulting transcription data.

15. The one or more non-transitory computer-readable media of claim 9, wherein a different translation/transcription service, from the two or more selected translation/transcription services, is used to generate the meeting transcript and the first command transcript.

16. The one or more non-transitory computer-readable media of claim 9, further comprising additional instructions which, when processed by the one or more processors, cause storing in the first command transcript, data that conspicuously identifies the versions of the particular unit of speech from each translation/transcription service from the two or more selected translation/transcription services.

17. A computer-implemented method comprising:
receiving, by an apparatus over one or more communications networks from a requestor device, a request to generate a transcript of audio data for a meeting, in response to receiving, over one or more communications networks from a requestor device, the request to generate a transcript of audio data for a meeting, processing the audio data and generating a meeting transcript for the meeting in a first language, a first command transcript for the meeting in the first language, and a second command transcript for the meeting in a second language that is different than the first language by:

providing the audio data for the meeting to two or more translation/transcription services selected from a plurality of translation/transcription services, receiving, from each translation/transcription service from the two or more selected translation/transcription services, transcription data that includes a plurality of units of speech and a plurality of confidence scores for the plurality of units of speech, determining whether the confidence scores from each translation/transcription service from the two or more selected translation/transcription services for a particular unit of speech for the first command transcript do not satisfy a specified threshold, in response to determining that the confidence scores from each translation/transcription service from the two or more selected translation/transcription services for a particular unit of speech for the first command transcript do not satisfy a specified threshold, including in one or more of the first command transcript or the meeting transcript, multiple versions of the particular unit of speech from each translation/transcription service from the two or more selected translation/transcription services, providing, over the one or more communications networks to the requestor device, the meeting transcript for the meeting in the first language, the first command transcript for the meeting in the first language and the second command transcript for the meeting in the second language that is different than the first language.

18. The computer-implemented method of claim 17, wherein the meeting transcript in the first language includes non-command text that is not included in either the first command transcript for the meeting in the first language or the second command transcript for the meeting in the second language that is different than the first language.

19. The computer-implemented method of claim 17, wherein the first command transcript and the second command transcript each include one or more specified commands that are recognizable by a command controller of a content collaboration system.

20. The computer-implemented method of claim 17, wherein the processing the audio data and generating a meeting transcript for the meeting in a first language, a first command transcript for the meeting in the first language, and a second command transcript for the meeting in a second language that is different than the first language includes:

selecting, from a plurality of translation/transcription services based upon the first language, a first translation/transcription service to generate the meeting transcript and the first command transcript in the first language, selecting, from the plurality of translation/transcription services based upon the second language, a second translation/transcription service to generate the second command transcript in the second language, transmitting to the first translation/transcription service a request to process the audio data and generate the meeting transcript and the first command transcript in the first language, and transmitting to the second translation/transcription service a request to process the audio data and generate the second command transcript in the second language.

* * * * *